United States Patent
Xie et al.

(10) Patent No.: US 12,153,765 B2
(45) Date of Patent: Nov. 26, 2024

(54) TOUCH STRUCTURE, DISPLAY PANEL, AND ELECTRONIC DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Hongkang Xie, Beijing (CN); Kemeng Tong, Beijing (CN); Fan He, Beijing (CN); Cong Fan, Beijing (CN); Xiangdan Dong, Beijing (CN)

(73) Assignees: Beijing BOE Technology Development Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 18/024,413

(22) PCT Filed: Aug. 19, 2021

(86) PCT No.: PCT/CN2021/113560
§ 371 (c)(1),
(2) Date: Mar. 2, 2023

(87) PCT Pub. No.: WO2022/052778
PCT Pub. Date: Mar. 17, 2022

(65) Prior Publication Data
US 2023/0315237 A1 Oct. 5, 2023

(30) Foreign Application Priority Data
Sep. 9, 2020 (CN) .......................... 202010941621.5

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05); *G06F 3/0448* (2019.05); *G06F 2203/04111* (2013.01)

(58) Field of Classification Search
None
See application file for complete search history.

(56) References Cited

U.S. PATENT DOCUMENTS 11,003,298 B2   5/2021   Li et al.
11,061,499 B2   7/2021   Zhao
(Continued)

FOREIGN PATENT DOCUMENTS

CN   109614007 A   4/2019
CN   110034168 A   7/2019
CN   110764636 A   2/2020

OTHER PUBLICATIONS

International Search Report in PCT/CN2021/113560 in Chinese dated Nov. 17, 2021 with English translation.
(Continued)

*Primary Examiner* — Nicholas J Lee
(74) *Attorney, Agent, or Firm* — Collard & Roe, P.C.

(57) ABSTRACT

A touch structure, a display panel, and an electronic device. In the touch structure, the first touch sub-electrodes and the first connecting electrodes are alternately arranged and sequentially connected to form a first touch electrode; the second touch sub-electrodes of the first grid layer and the first touch sub-electrodes are at intervals, and the two respectively include multiple first metal grids; the second connecting electrodes are connected to adjacent second touch sub-electrodes to form a second touch electrode extending in a second direction. A first grid row of each second connecting electrode includes multiple second metal grids arranged in a first direction, a second grid row thereof is adjacent to the first grid row and includes a second metal
(Continued)

grid; all the second metal wires of the second grid row close to the first grid row are second metal wires shared with the first grid row.

20 Claims, 26 Drawing Sheets

(56) References Cited

U.S. PATENT DOCUMENTS

| | | |
|---|---|---|
| 11,086,439 B2 | 8/2021 | Ding et al. |
| 2017/0147116 A1 | 5/2017 | Lee et al. |
| 2019/0361555 A1* | 11/2019 | Lee .................... G02F 1/133528 |
| 2020/0183538 A1* | 6/2020 | Li ......................... G06F 3/0448 |

OTHER PUBLICATIONS

Written Opinion of the International Searching Authority in PCT/CN2021/113560 in Chinese dated Nov. 17, 2021 with English translation.

* cited by examiner

TOUCH STRUCTURE, DISPLAY PANEL, AND ELECTRONIC DEVICE

CROSS REFERENCE TO RELATED APPLICATIONS

This application is the National Stage of PCT/CN2021/113560 filed on Aug. 19, 2021, which claims priority under 35 U.S.C. § 119 of Chinese Application No. 202010941621.5 filed on Sep. 9, 2020, the disclosure of which is incorporated by reference.

TECHNICAL FIELD

At least one embodiment of the present disclosure relates to a touch structure, a display panel and an electronic device.

BACKGROUND

The user interface with touch function is widely used in various electronic devices, for example, display devices. The touch structure used to realize the touch function includes a touch electrode structure, the arrangement of the touch electrode structure is an important factor affecting the user experiences.

SUMMARY

At least one embodiment of the present disclosure provides a touch structure, the touch structure includes a first metal grid layer and a second metal grid layer, an insulation layer is provided between the first metal grid layer and the second metal grid layer, the first metal grid layer includes a plurality of first metal grids defined by a plurality of first metal lines, and the second metal grid layer comprises a plurality of second metal grids defined by a plurality of second metal lines, shapes of each of the plurality of first metal grids and each of the second metal grids are both polygons; the first metal grid layer includes a plurality of first touch sub-electrodes and a plurality of first connection electrodes along a first direction, the plurality of first touch sub-electrodes and the plurality of first connection electrodes are alternately distributed one by one and are electrically connected in sequence to constitute a first touch electrode extending along the first direction; the first metal grid layer further includes a plurality of second touch sub-electrodes provided in sequence along a second direction and spaced apart from each other, and the first direction intersects the second direction; each of the plurality of first touch sub-electrodes and each of the second touch sub-electrodes are spaced apart from each other, and respectively include a plurality of first metal grids; the second metal grid layer includes a plurality of second connection electrodes spaced apart from each other, each of the plurality of second connection electrodes is electrically connected with adjacent second touch sub-electrodes through a plurality of vias in the insulation layer, so as to electrically connect the adjacent second touch sub-electrodes to form a second touch electrode extending in the second direction; each of the plurality of second connection electrodes includes a first metal grid row and a second metal grid row along the second direction. The first metal grid row includes a plurality of the second metal grids arranged along the first direction; the second metal grid row is adjacent to and connected with the first metal grid row, and comprises at least one second metal grid among the plurality of second metal grids arranged along the first direction; a count of the at least one second metal grid in the second metal grid row is less than or equal to a count of the second metal grids in the first metal grid row, and all the second metal lines of the at least one second metal grid in the second metal grid row close to the first metal grid row are sharing second metal lines shared with the second metal grid in the first metal grid row.

For example, in the touch structure provided by at least one embodiment of the present disclosure, the first metal grid row is electrically connected with the second touch sub-electrode adjacent to the first metal grid row, and orthographic projections of the sharing second metal lines shared with the second metal grid in the first metal grid row on the first metal grid layer overlap with the first metal lines.

For example, in the touch structure provided by at least one embodiment of the present disclosure, the count of the second metal grids in the first metal grid row is 2, and the count of the at least one second metal grid in the second metal grid row is 1.

For example, in the touch structure provided by at least one embodiment of the present disclosure, the plurality of vias comprise a first via, and the first metal grid row is electrically connected with one of two second touch sub-electrodes adjacent to the second connection electrode in which the first metal grid row is located through the first via.

For example, in the touch structure provided by at least one embodiment of the present disclosure, orthographic projections of a plurality of second metal lines of the second metal grids of the first metal grid row on the first metal grid layer respectively overlap with a plurality of first metal lines of the first metal grids of the second touch sub-electrode, so that the second metal grids has a plurality of vertices overlapped with the first metal grids, and the plurality of vertices comprise a plurality of connection vertices, the first via is correspondingly arranged at the plurality of connection vertices.

For example, in the touch structure provided by at least one embodiment of the present disclosure, the shapes of each of the plurality of first metal grids and each of the second metal grids are both hexagons; the plurality of second metal lines of the second metal grids of the first metal grid row respectively overlap with four first metal lines of an edge first metal grid of a second touch sub-electrode adjacent to the first metal grid row in a direction perpendicular to the second metal grid layer, so that the edge first metal grid has five vertices overlapped with the second metal grids; the four first metal lines sequentially connect the five vertices to be in a W shape, the four first metal lines respectively intersect both the first direction and the second direction, and at least one of the five vertices is the connection vertex.

For example, in the touch structure provided by at least one embodiment of the present disclosure, the plurality of the second metal grids of the first metal grid row are first edge second metal grids at a first edge of the second connection electrode, and are located at a first end of the second connection electrode in the second direction, and are electrically connected with the edge first metal grid of the second touch sub-electrode adjacent to the first metal grid row.

For example, in the touch structure provided by at least one embodiment of the present disclosure, each of the plurality of second connection electrodes along the second direction further comprises: a third metal grid row and a fourth metal grid row. The third metal grid row is on a side of the second metal grid row away from the first metal grid row, and comprising a plurality of the second metal grids arranged along the first direction; and the fourth metal grid row is on a side of the third metal grid row close to the second metal grid row, adjacent to and connected with the third metal grid row, and comprising at least one second metal grid among the plurality of second metal grids arranged along the first direction; a count of the at least one second metal grid in the fourth metal grid row is less than or equal to a count of the second metal grids in the third metal grid row, and all the second metal lines of the at least one second metal grid in the fourth metal grid row close to the third metal grid row are sharing second metal lines shared with the second metal grid in the third metal grid row, the second metal grid of the third metal grid row is a second edge metal grid of the second connection electrode at a second edge of the second connection electrode, is located at a second end of the second connection electrode in the second direction, and is electrically connected with the edge first metal grid of the second touch sub-electrode adjacent to the third metal grid row, and the second end is opposite to the first end in the second direction; the plurality of vias comprise a second via, and the third metal grid row is electrically connected with other one of the two second touch sub-electrodes adjacent to the second connection electrode in which the third metal grid row is located through the second via.

For example, in the touch structure provided by at least one embodiment of the present disclosure, orthographic projections of the sharing second metal lines shared with the second metal grid in the third metal grid row on the first metal grid layer do not overlap with the first metal lines, or the orthographic projections of the sharing second metal lines shared with the second metal grid in the third metal grid row on the first metal grid layer overlap with the first metal lines.

For example, in the touch structure provided by at least one embodiment of the present disclosure, the count of the second metal grids in the third metal grid row is 2, and the count of the at least one second metal grid in the fourth metal grid row is 1.

For example, in the touch structure provided by at least one embodiment of the present disclosure, the second connection electrode further comprises at least one intermediate metal grid row between the second metal grid row and the fourth metal grid row, each row of the at least one intermediate metal grid row comprises at least one second metal grid among the plurality of second metal grids.

For example, in the touch structure provided by at least one embodiment of the present disclosure, a count of the at least one second metal grid in each row of the at least one intermediate metal grid row is 1.

For example, in the touch structure provided by at least one embodiment of the present disclosure, each of the plurality of second connection electrodes along the second direction further comprises: a third metal grid row and a third metal grid row. The third metal grid row is on a side of the second metal grid row away from the first metal grid row, adjacent to the second metal grid row, and comprises plurality of the second metal grids arranged along the first direction; the count of the at least one second metal grid in the second metal grid row is less than or equal to a count of the second metal grids in the third metal grid row, and all second metal lines of the at least one second metal grid in the second metal grid row close to the third metal grid row are sharing second metal lines shared with the second metal grid in the third metal grid row, the second metal grids of the third metal grid row is a second edge metal grid of the second connection electrode at a second edge of the second connection electrode, is located at a second end of the second connection electrode in the second direction, and is electrically connected with an edge first metal grid of the second touch sub-electrode adjacent to the third metal grid row, and the second end is opposite to the first end in the second direction; the plurality of vias comprise a second via, and the third metal grid row is electrically connected with other one of the two second touch sub-electrodes adjacent to the second connection electrode in which the third metal grid row is located through the second via.

For example, in the touch structure provided by at least one embodiment of the present disclosure, a pattern of each of the plurality of second connection electrodes is symmetrical with respect to a symmetry axis extending along the first direction.

For example, in the touch structure provided by at least one embodiment of the present disclosure, each of the second metal grids comprises at least two vertical edges extending along the second direction, and orthographic projections of the at least two vertical edges on the first metal grid layer do not overlap with the first metal line.

For example, in the touch structure provided by at least one embodiment of the present disclosure, adjacent second touch sub-electrodes among the plurality of second touch sub-electrodes are electrically connected through two of the second connection electrodes, and the two of the second connection electrodes are spaced apart from each other; an orthographic projection of each of the plurality of first connection electrodes on the second metal grid layer is in a gap between the two of the second connection electrodes connecting the adjacent second touch sub-electrodes.

For example, in the touch structure provided by at least one embodiment of the present disclosure, each of the plurality of first touch sub-electrodes is electrically connected with an adjacent first connection electrode through at least one first connection line constituted by a plurality of first metal lines connected end to end in sequence; an orthographic projection of the first connection line on the second metal grid layer respectively overlaps with a plurality of second metal lines in the second connection electrode, and the first connection line at least partially overlaps with an orthographic projection of the sharing second metal line on the first metal grid layer.

For example, in the touch structure provided by at least one embodiment of the present disclosure, a plurality of the first metal lines located in a boundary region between adjacent first touch sub-electrode and the second touch sub-electrode respectively comprise a plurality of openings, each of the plurality of openings divides the first metal line into two first metal segments, one of the two first metal line segments belongs to the first touch sub-electrode and other one of the two first metal line segments belongs to the second touch sub-electrode, so that the adjacent first touch sub-electrode and the second touch sub-electrode are insulated from each other.

At least one embodiment of the present disclosure provides a touch structure, the touch structure includes a plurality of touch sub-electrodes spaced apart from each other and a dummy electrode. The dummy electrode is embedded in at least one touch sub-electrode of the plurality of touch sub-electrodes and spaced apart from the touch sub-electrode in which the dummy electrode is embedded to insulate each other; the at least one touch sub-electrode comprises a strip-shaped channel and a main body part surrounding the dummy electrode and the channel, and the strip-shaped channel passes through the dummy electrode, and two ends of the strip-shaped channel in an extension direction of the strip-shaped channel are connected with the main body part.

For example, in the touch structure provided by at least one embodiment of the present disclosure, the channel comprises at least one narrow part and at least one wide part which are alternately arranged and sequentially connected in the extension direction of the channel, and a width of each of the at least one narrow part in a direction perpendicular to the extension direction of the channel is less than a width of each of the at least one wide part in direction perpendicular to the extension direction of the channel.

For example, in the touch structure provided by at least one embodiment of the present disclosure, a ratio of a length of each of the at least one narrow part in the extension direction of the channel to the width of each of the at least one narrow part is greater than a ratio of a length of each of the at least one wide part in the extension direction of the channel to the width of each of the at least one wide part.

For example, in the touch structure provided by at least one embodiment of the present disclosure, a plurality of wide parts are arranged at equal intervals, and lengths of a plurality of narrow parts are equal to each other.

For example, in the touch structure provided by at least one embodiment of the present disclosure, the at least one touch sub-electrode comprises a plurality of the strip-shaped channels, and the plurality of strip-shaped channels comprise: a strip-shaped first channel and a strip-shaped second channel. The strip-shaped first channel extends substantially along a first extension direction; the strip-shaped second channel extends substantially along a second extension direction and intersecting the first channel; the dummy electrode comprises at least four parts separated from each other by the first channel and the second channel.

For example, in the touch structure provided by at least one embodiment of the present disclosure, the at least one touch sub-electrode comprises a plurality of the strip-shaped channels, and the plurality of strip-shaped channels comprise: a plurality of strip-shaped first channels and a plurality of strip-shaped second channels. The plurality of strip-shaped first channels respectively extends substantially along a first extension direction and spaced apart from each other; the plurality of strip-shaped second channels respectively extends substantially along a second extension direction and spaced apart from each other; each of the strip-shaped second channels intersects each of the plurality of strip-shaped first channels, and the dummy electrode comprises a plurality of parts separated from each other by the plurality of strip-shaped first channels and the plurality of strip-shaped second channels.

For example, in the touch structure provided by at least one embodiment of the present disclosure, the first extension direction is perpendicular to the second extension direction.

For example, in the touch structure provided by at least one embodiment of the present disclosure, the plurality of strip-shaped first channels comprise two first channels, the plurality of strip-shaped second channels comprise two second channels, and the dummy electrode comprises at least nine parts separated from each other by the two first channels and the two second channels.

For example, in the touch structure provided by at least one embodiment of the present disclosure, the at least one touch sub-electrode comprises a communication part, the plurality of strip-shaped channels are electrically connected with each other through the communication part, and the plurality of parts of the dummy electrode surround the communication part.

For example, in the touch structure provided by at least one embodiment of the present disclosure, each of the plurality of channels comprises a plurality of narrow parts and a plurality of wide part alternately arranged and sequentially connected in an extension direction of the each of the plurality of channels, and a width of each of the plurality of narrow parts in a direction perpendicular to the extension direction of the channel is less than a width of each of the plurality of wide parts in the direction perpendicular to the extension direction of the channel, the narrow part of the first channel intersects the narrow part of the second channel.

For example, in the touch structure provided by at least one embodiment of the present disclosure, the narrow part of the first channel has an intersection point with the narrow part of the second channel, the first channel comprises a first wide part and a second wide part that are respectively on two sides of the intersection point and adjacent to the intersection point, and the second channel comprises a third wide part and a fourth wide part that are respectively on two sides of the intersection point and adjacent to the intersection point; distances from the first wide part, the second wide part, the third wide part and the fourth wide part to the intersection point are equal.

For example, in the touch structure provided by at least one embodiment of the present disclosure, a shape of an outer contour of an overall structure constituted by the dummy electrode and the strip-shaped channel is a first polygon; the two ends of the channel are respectively close to two adjacent edges of the first polygon, or the two ends of the channel are respectively close to two opposite edges of the first polygon, or the two ends of the channel are respectively close to two non-adjacent vertices of the first polygon.

For example, in the touch structure provided by at least one embodiment of the present disclosure, a shape of an outer contour of the main body part is a second polygon, and the second polygon and the first polygon are similar polygons.

For example, in the touch structure provided by at least one embodiment of the present disclosure, the strip-shaped channel is in a straight strip substantially; a shape of an outer contour of an overall structure constituted by the dummy electrode and the channel is substantially a first polygon, the channel is parallel to at least one edge of the first polygon, or the channel is not parallel to any edge of the first polygon.

For example, in the touch structure provided by at least one embodiment of the present disclosure, the strip-shaped channel is in a curved strip shape or in a fold line shape.

For example, in the touch structure provided by at least one embodiment of the present disclosure, at least one strip-shaped channel comprises a first segment and a second segment that are arranged along the extension direction of the at least one strip-shaped channel, the first segment and the second segment are substantially parallel to each other, and the first segment and the second segment are electrically connected through a metal connection line.

For example, in the touch structure provided by at least one embodiment of the present disclosure, a ratio of a maximum size of a region crossed by an entirety of the dummy electrode to a maximum size of the touch sub-electrode in which the dummy electrode is located in a same direction is greater than or equal to 0.4 and less than or equal to 0.6; a ratio of a minimum width of the channel to the maximum size of the region crossed by the entirety of the dummy electrode is greater than or equal to 0.03 and less than or equal to 0.1.

For example, in the touch structure provided by at least one embodiment of the present disclosure, the at least one touch sub-electrode further comprises a plurality of interdigital structures connected with the main body part, and the plurality of interdigital structures are distributed around the main body part and protrude from the main body part in a direction away from the main body part; the extension direction of the channel is parallel to an extension direction of at least a part of the interdigital structures in the plurality of interdigital structures, or the extension direction of the channel of the touch sub-electrode is not parallel to the extension direction of at least a part of the interdigital structures in the plurality of interdigital structures; the at least a part of the interdigital structure protrudes from an edge of an outer contour of the main body part close to two ends of the channel.

For example, in the touch structure provided by at least one embodiment of the present disclosure, in the extension direction of the channel, the two ends of the strip-shaped channel at least partially overlap with the interdigital structure protruding from the edge of the main body close to the two ends of the channel, and at least a part of an edge of the channel along the extension direction of the channel is parallel to a part of an edge of the interdigital structure.

For example, in the touch structure provided by at least one embodiment of the present disclosure, the touch structure comprises a first electrode layer and a second electrode layer, and an insulation layer is provided between the first electrode layer and the second electrode layer; the plurality of touch sub-electrodes comprise a plurality of first touch sub-electrodes and a plurality of second touch sub-electrodes, and the touch structure further comprises a plurality of first connection electrodes and a plurality of second connection electrodes; the plurality of first touch sub-electrodes and the plurality of first connection electrodes are all in the first electrode layer and arranged along a first direction, the plurality of first touch sub-electrodes and the plurality of first connection electrodes are alternately distributed one by one and electrically connected in sequence to constitute a first touch electrode extending along the first direction; the plurality of second touch sub-electrodes are in the first electrode layer, and are arranged in sequence along a second direction and spaced apart from each other, the first direction intersects the second direction, and each of the plurality of first touch sub-electrodes and each of the second touch sub-electrodes are spaced apart from each other; the plurality of second connection electrodes are in the second electrode layer and are spaced apart from each other, and each of the plurality of second connection electrodes is electrically connected with adjacent second touch sub-electrodes through vias in the insulation layer, so as to electrically connect the adjacent second touch sub-electrodes to constitute a second touch electrode extending in the second direction; the dummy electrode is embedded in the first touch sub-electrode and/or embedded in the second touch sub-electrode.

For example, in the touch structure provided by at least one embodiment of the present disclosure, a shape of an outer contour of an overall structure constituted by the dummy electrode and the channel is an irregular polygon; a first end of the outer contour of the dummy electrode and a second end of the outer contour of the dummy electrode that are opposite to each other in the second direction are respectively right opposite to second connection electrodes adjacent in the second direction, and respectively have a first groove and a second groove; the first groove is recessed toward the second end of the outer contour of the dummy electrode, and the second groove is recessed toward the first end of the outer contour of the dummy electrode; a third end of the outer contour of the dummy electrode and a fourth end of the outer contour of the dummy electrode that are opposite to each other in the first direction are respectively opposite to the first connection electrode, and respectively have a third groove and a fourth groove; the third groove is recessed toward the fourth end, and the fourth groove is recessed toward the third end.

For example, in the touch structure provided by at least one embodiment of the present disclosure, the outer contour of the dummy electrode comprises a first protrusion in the first groove and a second protrusion in the second groove; the first protrusion protrudes in a direction away from the second end of the outer contour of the dummy electrode, and the second protrusion protrudes in a direction away from the first end of the outer contour of the dummy electrode.

For example, in the touch structure provided by at least one embodiment of the present disclosure, the plurality of touch sub-electrodes and the dummy electrode are in a same metal grid layer, the metal grid layer comprises a plurality of metal grids defined by a plurality of metal lines, and each selected from a group consisting of the main body part, the channel and the dummy electrode respectively comprises a plurality of the metal grids.

For example, in the touch structure provided by at least one embodiment of the present disclosure, the plurality of touch sub-electrodes and the dummy electrode are in a same metal grid layer, the metal grid layer comprises a plurality of metal grids defined by a plurality of metal lines, and the communication part comprises a plurality of the metal grids.

For example, in the touch structure provided by at least one embodiment of the present disclosure, in the at least one touch sub-electrode embedded with the dummy electrode, each part of the dummy electrode has a boundary region with the touch sub-electrode, a plurality of the metal lines in the boundary region respectively comprise a plurality of openings, each of the plurality of openings separates the metal line, in which the each of the plurality of openings is located, into two metal segments, and one of the two metal segments belongs to the touch sub-electrode, and other one of the two metal segments belongs to the dummy electrode, so that the dummy electrode is insulated from the touch sub-electrode.

For example, in the touch structure provided by at least one embodiment of the present disclosure, the channel comprises at least two conductor lines composed of a plurality of the metal lines connected with each other, the conductor lines pass through the dummy electrode and two ends of each of the conductor lines in extension direction of each of the conductor line are respectively connected with the main body.

For example, in the touch structure provided by at least one embodiment of the present disclosure, at least part of each channel comprises at least one metal grid arranged in a width direction of the each channel, and the width direction is perpendicular to the extension direction of the each channel.

For example, in the touch structure provided by at least one embodiment of the present disclosure, each channel comprises a plurality of the metal grids arranged in series along the extension direction of the each channel; or, each channel comprises a plurality of the metal grids arranged along the extension direction of the each channel and a metal connection line connecting at least two adjacent metal grids of the plurality of the metal grids.

For example, in the touch structure provided by at least one embodiment of the present disclosure, in a case that the touch structure comprises a first electrode layer and a second electrode layer, the first electrode layer is a first metal grid layer, and the second electrode layer is a second metal grid layer; the first metal grid layer comprises a plurality of first metal grids defined by a plurality of first metal lines, the second metal grid layer comprises a plurality of second metal grids defined by a plurality of second metal lines, both a shape of each of the plurality of first metal grids and a shape of each of the second metal grids are polygons; each selected from the group consisting of the main body part, the channel and the dummy electrode respectively comprises a plurality of the first metal grids; each of the plurality of second connection electrodes comprises a plurality of the second metal grids.

At least an embodiment of the present disclosure further provides a touch display panel, and the touch display panel comprises a base substrate, a display structure and any one of the touch structures provided by the embodiments of the present disclosure that are stacked on the base substrate.

At least an embodiment of the present disclosure further provides an electronic device, and the electronic device comprises any one of the touch structures provided by the embodiments of the present disclosure or any one of the touch display panels provided by the embodiments of the present disclosure.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1:
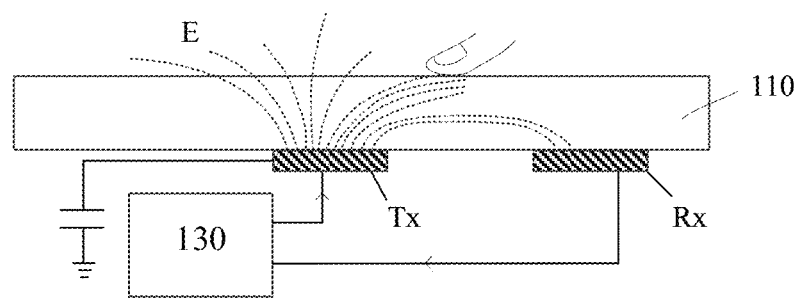
FIG. 1 is a schematic diagram of the working principle of a touch structure.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "inside," "outside," "on," "under," or the like are only used to indicate relative position relationship, and when the position of the object which is described is changed, the relative position relationship may be changed accordingly.

The drawings in the present disclosure are not drawn strictly according to the actual scale. The number of the first touch electrode, the second touch electrode, the first touch sub-electrode, the second touch sub-electrode, the first metal grid and the second metal grid in the touch structure is not limited to the number shown in the figure. The specific size and the number of each structure can be determined according to actual needs. The drawings described in the present disclosure are only structural diagrams.

Organic light emitting diode (OLED) display panel has characteristics of self-illumination, high contrast, low energy consumption, wide viewing angle, fast response, flexible panel, wide temperature range, simple manufacturing and so on, and therefore has broad development prospects. In order to meet diverse needs of users, it is of great significance to integrate a variety of functions in the display panel, such as touch function, fingerprint recognition function and so on. For example, forming an on-cell touch structure in an OLED display panel is an implementation method, which realizes the touch function of the display panel by forming the touch structure on an encapsulation film of the OLED display panel.

For example, a mutual capacitive touch structure includes a plurality of touch electrodes, the plurality of touch electrodes include a touch driving electrode and a touch sensing electrode extending in different directions. The touch driving electrode Tx and touch sensing electrode Rx form mutual capacitance for touch sensing at the intersection of the touch driving electrode Tx and the touch sensing electrode Rx. The touch driving electrode Tx is used to input an excitation signal (touch driving signal), and the touch sensing electrode Rx is used to output a touch sensing signal. By inputting an excitation signal to, for example, a touch driving electrode extending longitudinally, and receiving a touch sensing signal from, for example, a touch sensing electrode extending laterally, a detection signal reflecting the capacitance value of the coupling point (for example, the intersection) of the lateral and longitudinal electrodes can be obtained. When a finger touches the touch screen (such as the cover glass), it affects the coupling between the touch driving electrode and the touch sensing electrode near the touch point, thus changing the mutual capacitance between the two electrodes at the intersection point, resulting in the change of the touch sensing signal. According to the data of the two-dimensional capacitance change of the touch screen based on the touch sensing signal, coordinates of the touch point can be calculated.

FIG. 1 shows a schematic diagram of the working principle of a mutual capacitive touch structure. As shown in FIG. 1, driven by the touch driving circuit 130, the touch driving electrode Tx is applied with a touch driving signal, thereby generating an electric field line E, the electric field line E is received by the touch sensing electrode Rx to form a reference capacitance. When a finger touches the touch screen 110, because the human body is a conductor, part of the electric field line E generated by the touch driving electrode Tx is guided to the finger to form a finger capacitance, which reduces the electric field line E received by the touch sensing electrode Rx. Therefore, the capacitance value between the touch driving electrode Tx and the touch sensing electrode Rx decreases. The touch driving circuit 130 obtains the above capacitance value through the touch sensing electrode Rx, and compares the above capacitance value with the reference capacitance to obtain the capacitance value change. According to the data of the capacitance value change and in combination with the position coordinates of each touch capacitance, the coordinates of the touch point can be calculated.

In some touch structures, the touch driving electrode Tx includes a plurality of sub-electrodes electrically connected through bridges. There is an insulation layer between the bridges and the touch sensing electrode Rx, and there is an overlapping part between each bridge and the touch sensing electrode Rx in the direction perpendicular to the base substrate. The larger area of the overlapping part can increase the probability of short circuit between the touch driving electrode Tx and the touch sensing electrode Rx because of the electrical connection between the touch driving electrode Tx and the touch sensing electrode Rx, and it will cause poor touch effect, such as increasing the probability of false alarm points and false touch, and at the same time, it will increase the power consumption of the touch circuit.

At least one embodiment of the present disclosure provides a touch structure, the touch structure includes a first metal grid layer and a second metal grid layer, an insulation layer is provided between the first metal grid layer and the second metal grid layer, the first metal grid layer includes a plurality of first metal grids defined by a plurality of first metal lines, and the second metal grid layer comprises a plurality of second metal grids defined by a plurality of second metal lines, shapes of each of the plurality of first metal grids and each of the second metal grids are both polygons; the first metal grid layer includes a plurality of first touch sub-electrodes and a plurality of first connection electrodes along a first direction, the plurality of first touch sub-electrodes and the plurality of first connection electrodes are alternately distributed one by one and are electrically connected in sequence to constitute a first touch electrode extending along the first direction; the first metal grid layer further includes a plurality of second touch sub-electrodes provided in sequence along a second direction and spaced apart from each other, and the first direction intersects the second direction; each of the plurality of first touch sub-electrodes and each of the second touch sub-electrodes are spaced apart from each other, and respectively include a plurality of first metal grids; the second metal grid layer includes a plurality of second connection electrodes spaced apart from each other, each of the plurality of second connection electrodes is electrically connected with adjacent second touch sub-electrodes through a plurality of vias in the insulation layer, so as to electrically connect the adjacent second touch sub-electrodes to form a second touch electrode extending in the second direction; each of the plurality of second connection electrodes includes a first metal grid row and a second metal grid row along the second direction. The first metal grid row includes a plurality of the second metal grids arranged along the first direction; the second metal grid row is adjacent to and connected with the first metal grid row, and comprises at least one second metal grid among the plurality of second metal grids arranged along the first direction; a count of the at least one second metal grid in the second metal grid row is less than or equal to a count of the second metal grids in the first metal grid row, and all the second metal lines of the at least one second metal grid in the second metal grid row close to the first metal grid row are sharing second metal lines shared with the second metal grid in the first metal grid row.

In the touch structure provided by the embodiments of the present disclosure, both the overlapping area of the first metal line and the second metal line, and the overlapping area of the first touch electrode and the second touch electrode can be reduced through the sharing second metal line, so as to reduce the mutual capacitance between the first touch electrode and the second touch electrode, reduce the power consumption of the touch circuit, and reduce the risk of connection between the first metal line and the second metal line, and reduce the probability of short circuit between the first metal line and the second metal line.

Figure 2:
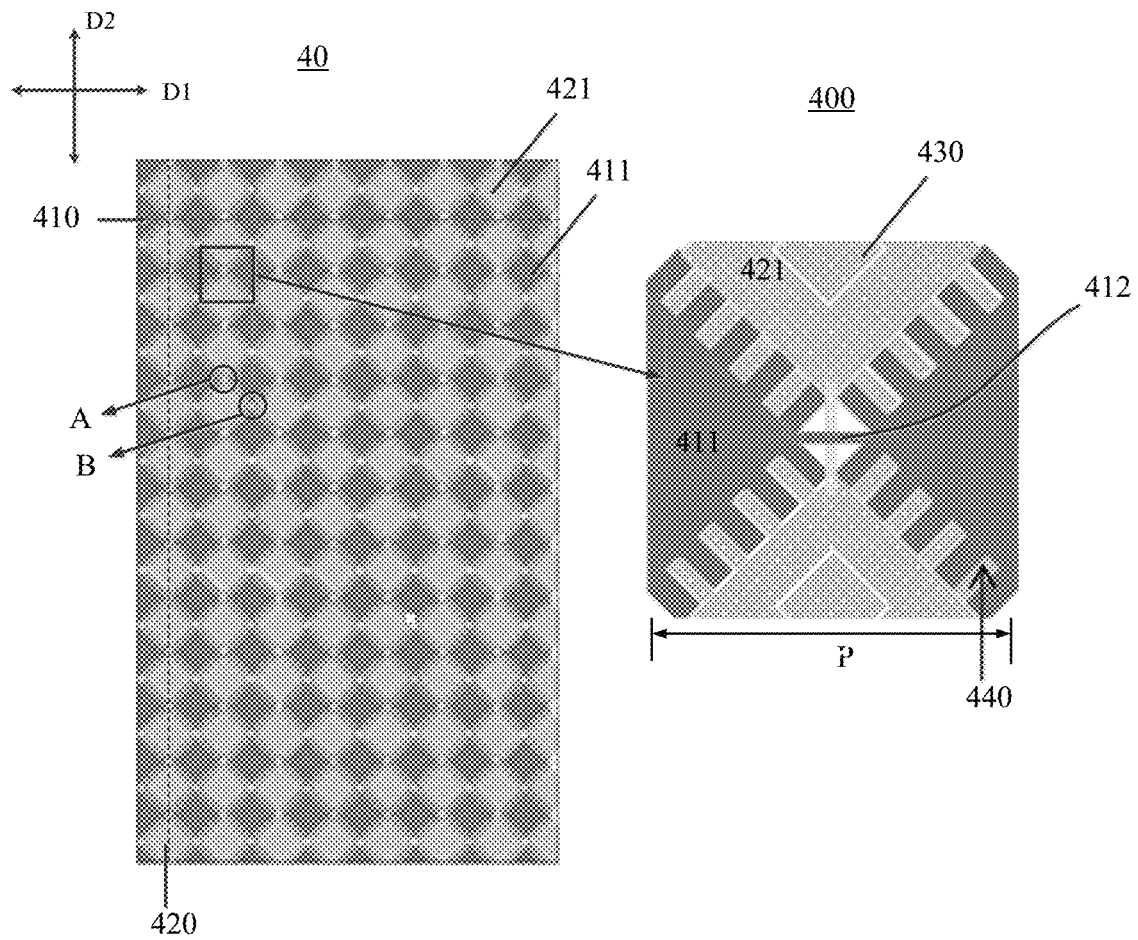
FIG. 2 is a schematic diagram of a touch structure provided by an embodiment of the present disclosure.

Exemplarily, FIG. 2 is a schematic diagram of a touch structure 40 provided by an embodiment of the present disclosure. As shown in FIG. 2, the touch electrode structure 40 includes a plurality of first touch electrodes 410 extending along the first direction D1 (one first touch electrode 410 is shown at the position indicated by the corresponding dotted line in FIG. 2) and a plurality of second touch electrodes 420 extending along the second direction D2 (one second touch electrode 420 is shown at the position indicated by the corresponding dotted line in FIG. 2). For example, the first touch electrode 410 is a touch sensing electrode Rx, and the second touch electrode 420 is a touch driving electrode Tx. However, the embodiments of the present disclosure do not limit this. In other examples, the first touch electrode 410 may be a touch driving electrode Tx, and the second touch electrode 420 may be a touch sensing electrode Rx.

Figure 3:
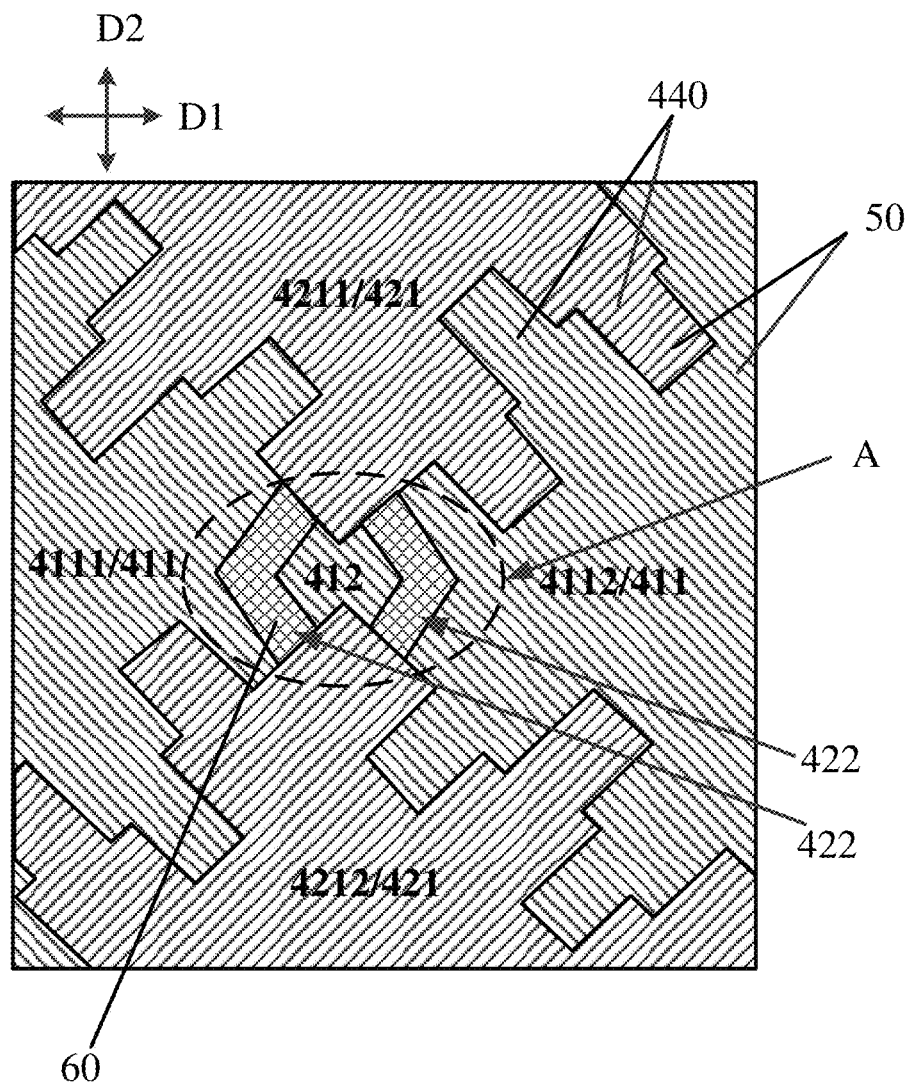
FIG. 3 is an enlarged schematic diagram of a part in the frame in FIG. 2.

Each first touch electrode 410 includes a plurality of first touch sub-electrodes 411 sequentially arranged along the first direction D1 and connected with each other, and each second touch electrode 420 includes a plurality of second touch sub-electrodes 421 sequentially arranged along the second direction D2 and connected with each other. As shown in FIG. 3, both the main body contour of each first touch sub-electrode 411 and the main body contour of each the second touch sub-electrode 421 are in diamond shapes. In other examples, the first touch sub-electrode 411 and the second touch sub-electrode 421 may in other shapes, such as triangle, strip, etc.

The first touch sub-electrodes 411 adjacent in the first direction D1 are electrically connected with each other through a first connection electrode 412 to form the first touch electrode 410, and the second touch sub-electrodes 421 adjacent in the second direction D2 are electrically connected with each other through a second connection electrode (not shown) to form the second touch electrode 420.

Each first touch electrode 410 and each second touch electrode 420 are insulated from each other and intersect each other to form a plurality of touch units 400 at the intersection position, each touch unit includes one part of each of the two first touch electrodes connected with each other at the intersection position and at least one part of each of the two second touch electrodes connected with each other at the intersection position. The right side of FIG. 2 shows an enlarged schematic diagram of a touch unit 400. As shown in the figure, each touch unit 400 includes a half region of each of the two first touch sub-electrodes 411 adjacent to each other and a half region of each of the two second touch sub-electrodes 421 adjacent to each other, that is, on average, each touch unit 400 includes a region of one first touch sub-electrode 411 and a region of one second touch sub-electrode 421, and the intersection point of the first touch sub-electrode 411 and the second touch sub-electrode 421 in each touch unit 400 (that is, the intersection of the first connection electrode and the second connection electrode) constitutes a reference point for calculating coordinates. When a finger touches the capacitive screen, the coupling between the first touch electrode and the second touch electrode near the touch point is affected, thereby changing the mutual capacitance between the two electrodes. The touch sensing signal changes according to the capacitance change of the touch screen, so that the coordinates of each touch point can be calculated based on the reference point. For example, the area of each touch unit 400 is equivalent to the area where a person's finger contacts the touch panel. If the area of the touch unit is too large, it may cause a touch blind spot on the panel, and if the area of the touch unit is too small, it may cause a false touch signal.

The average length of edges of each touch unit 400 is P, which is called a pitch of the touch structure. For example, the size range of the pitch P is 3.7 mm-5 mm, for example, about 4 mm; this is because the diameter of a human finger contacting the touch panel is about 4 mm. For example, the size of the pitch is the same as the average length of edges of each first touch sub-electrode 411 and the average length of edges of each second touch sub-electrode 421, and is also the same as the distance between the centers of two adjacent first touch sub-electrodes 411 and the distance between the centers of two adjacent second touch sub-electrodes 421.

As shown in FIG. 2, the first touch sub-electrode 411 and the second touch sub-electrode 421 respectively include a main body part and a plurality of interdigital structures 440 extending from the main body part. The first touch sub-electrode 411 and the adjacent second touch sub-electrode 421 are nested with each other in the first metal grid 50 through the interdigital structure 440 to form mutual capacitance. The interdigital structure can increase the perimeter of one touch sub-electrode under the same area of one touch sub-electrode, so it can effectively improve the mutual capacitance without increasing the self-capacitance (capacitive load) of the touch sub-electrode, so as to improve the touch sensitivity. For example, the shape of the main body part may be circular or rectangular, and the shape of the interdigital structure includes at least one of the following shapes: parallelogram (for example, rectangle), triangle, trapezoid and hexagon.

For example, a plurality of interdigital structures 440 are distributed at the periphery of the main body part of the touch sub-electrode. For example, the planar shape of the main body part is rectangular, and the number of second interdigital structures 112 corresponding to each edge of the main body part is in a range of 3-10, for example, 6-10. In other examples, the planar shape of the main body part may be circular, and the plurality of interdigital structures 440 are uniformly distributed on the circumference of the circle.

FIG. 2 shows an enlarged schematic diagram of a touch unit 400 on the right. As shown in FIG. 2, the first touch sub-electrodes 411 adjacent in the first direction D1 are connected through the first connection electrode 412 to form the first touch electrode 410 extending along the first direction D1, and the second touch sub-electrodes 421 adjacent in the second direction D2 are connected through the second connection electrode (not showing reference number in FIG. 2) to form the second touch electrode 420 extending along the second direction D2.

FIG. 3 is an enlarged schematic diagram of a part in the frame in FIG. 2. The touch structure 40 includes a first metal grid layer 50 and a second metal grid layer 60. An insulation layer is arranged between the first metal grid layer 50 and the second metal grid layer 60. In combination with FIG. 2 and FIG. 3, the first metal grid layer 50 includes a plurality of first touch sub-electrodes 411 and a plurality of first connection electrodes 412 arranged along the first direction D1, the plurality of first touch sub-electrodes 411 and the plurality of first connection electrodes 412 are alternately distributed one by one and electrically connected in sequence, to form a first touch electrode 410 extending along the first direction D1, that is, along the first direction D1, the adjacent first touch sub-electrodes 4111 and 4112 are electrically connected to each other through the first connection electrode 412 to form the first touch electrode 410 located in the first metal grid layer 50 as shown in FIG. 2. The first metal grid layer 50 further includes a plurality of second touch sub-electrodes 421 that are sequentially arranged along the second direction D2 and spaced apart from each other, and the first direction D1 intersects the second direction D2. Each of the plurality of first touch sub-electrodes 411 and each of the second touch sub-electrodes 421 are spaced apart from each other, and respectively include a plurality of first metal grids. The second metal grid layer 60 includes a plurality of second connection electrodes 422 spaced apart from each other. Each of the plurality of second connection electrodes 422 is electrically connected with adjacent second touch sub-electrodes 4211 and 4212 through a plurality of vias in the insulation layer, thereby electrically connecting the adjacent second touch sub-electrodes 4211 and 4212, and forming the second touch electrode 420 extending in the second direction D2 as shown in FIG. 2. As shown in FIG. 3, the first touch sub-electrode 411 and the second touch sub-electrode 421 are nested and isolated from each other in the first metal grid layer 50 through the interdigital structures 440 of the first touch sub-electrode 411 and the interdigital structures 440 of the second touch sub-electrode 421. As shown in FIG. 4B, the boundary line between the first touch sub-electrode 411 and the second touch sub-electrode 421 is serrated due to the existence of the interdigital structure.

Figure 4A:
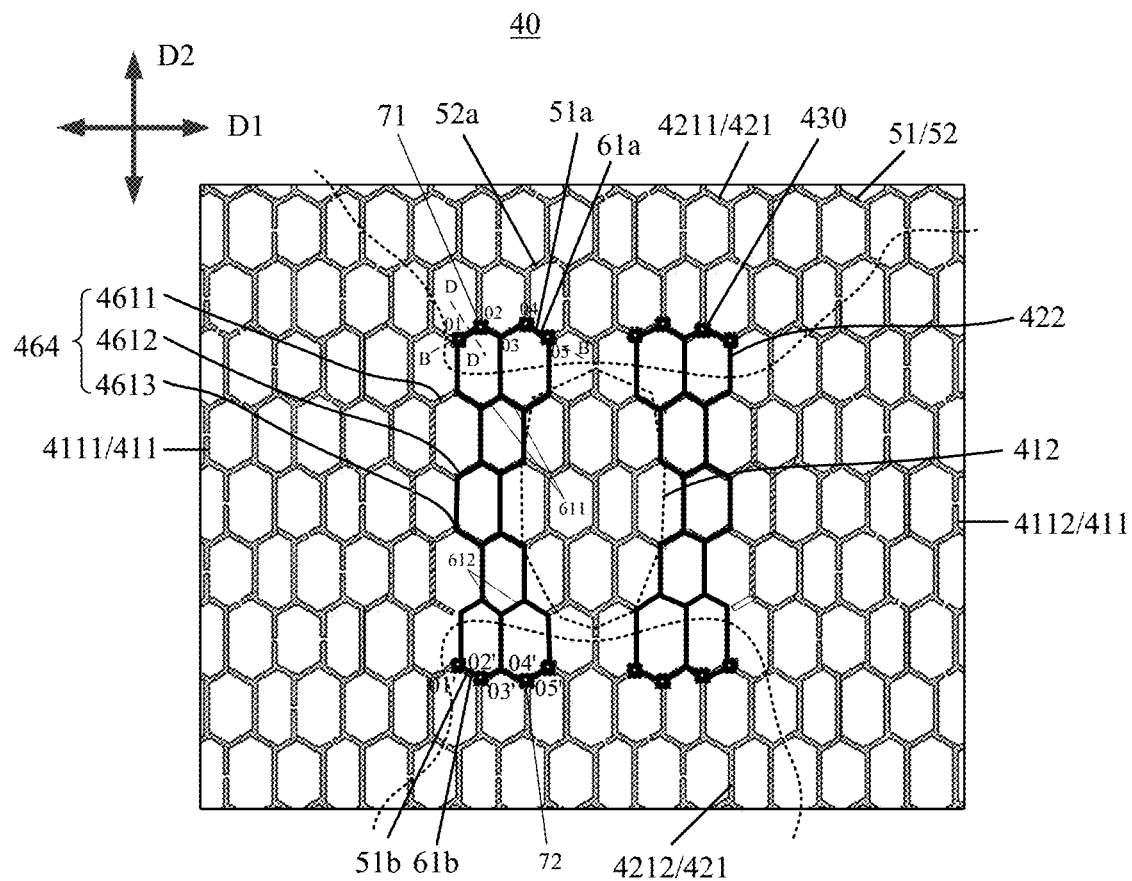
FIG. 4A is an enlarged schematic diagram of a region A in FIG. 3.
Figure 4B:
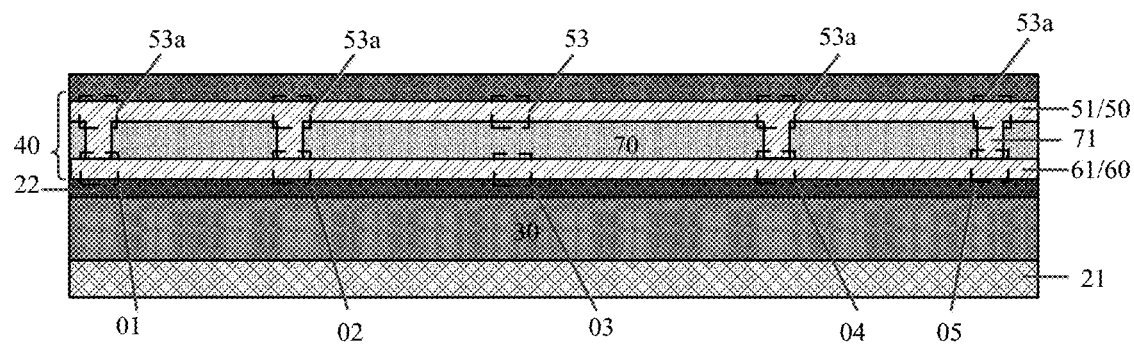
FIG. 4B is a cross-sectional diagram of FIG. 4A taken along the section line B-B'.

FIG. 4A shows an enlarged schematic diagram of a region A in FIG. 2 and FIG. 3, the region A is the intersection point (intersection region) of the first touch sub-electrode 411 and the second touch sub-electrode 421, that is, a bridging region. The light grid in FIG. 4A illustrates the first metal grid 52 in the first metal grid layer 50. The first metal grid layer 50 includes the first touch electrode 410 (including the first touch sub-electrode 411 and the first connection electrode 412) and the second touch sub-electrode 421. The first touch sub-electrode 411, the first connection electrode 412 and the second touch sub-electrode 421 respectively include a plurality of first metal grids 52 connected with each other; the dark grid in FIG. 4A illustrates the second metal grid 62 in the second metal grid layer 60, the second metal grid layer 60 includes a second connection electrode 422, and the second connection electrode 422 includes a plurality of second metal grids 62 connected with each other.

Figure 5:
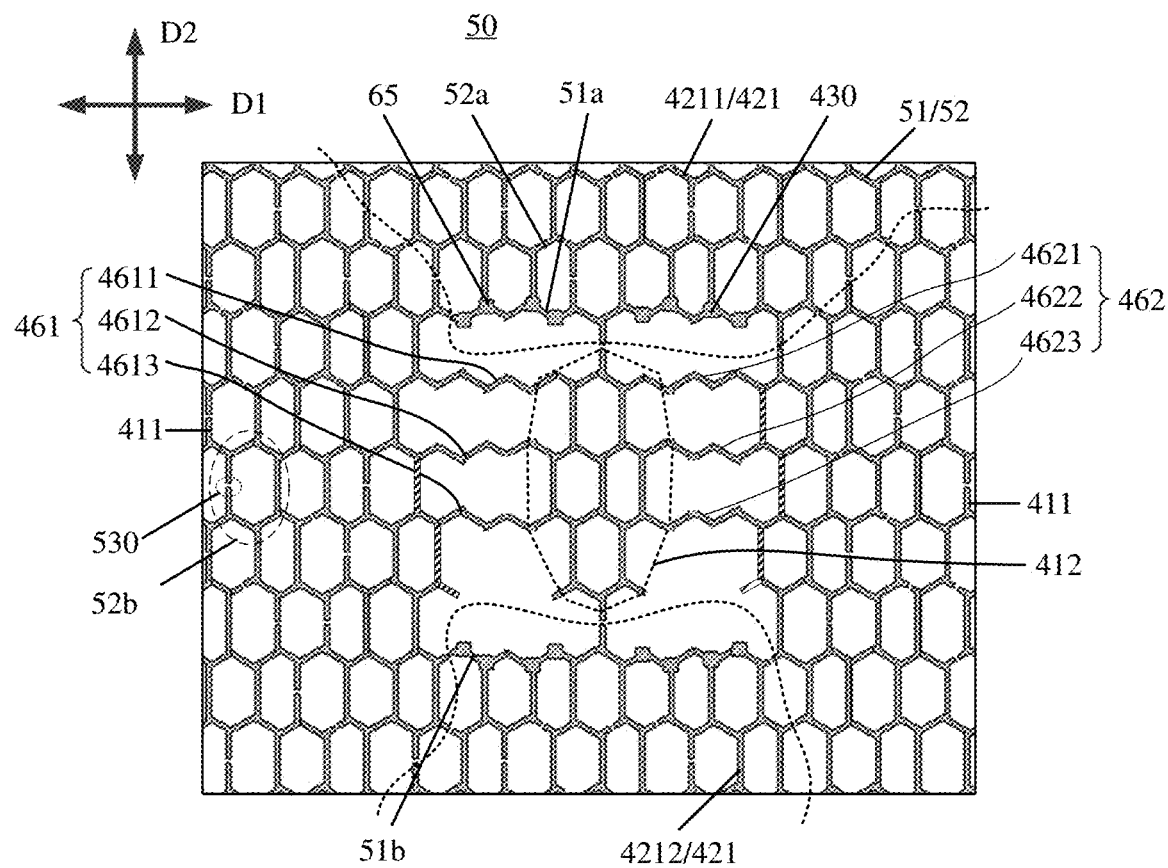
FIG. 5 shows a first touch electrode layer in FIG. 4A.
Figure 6A:
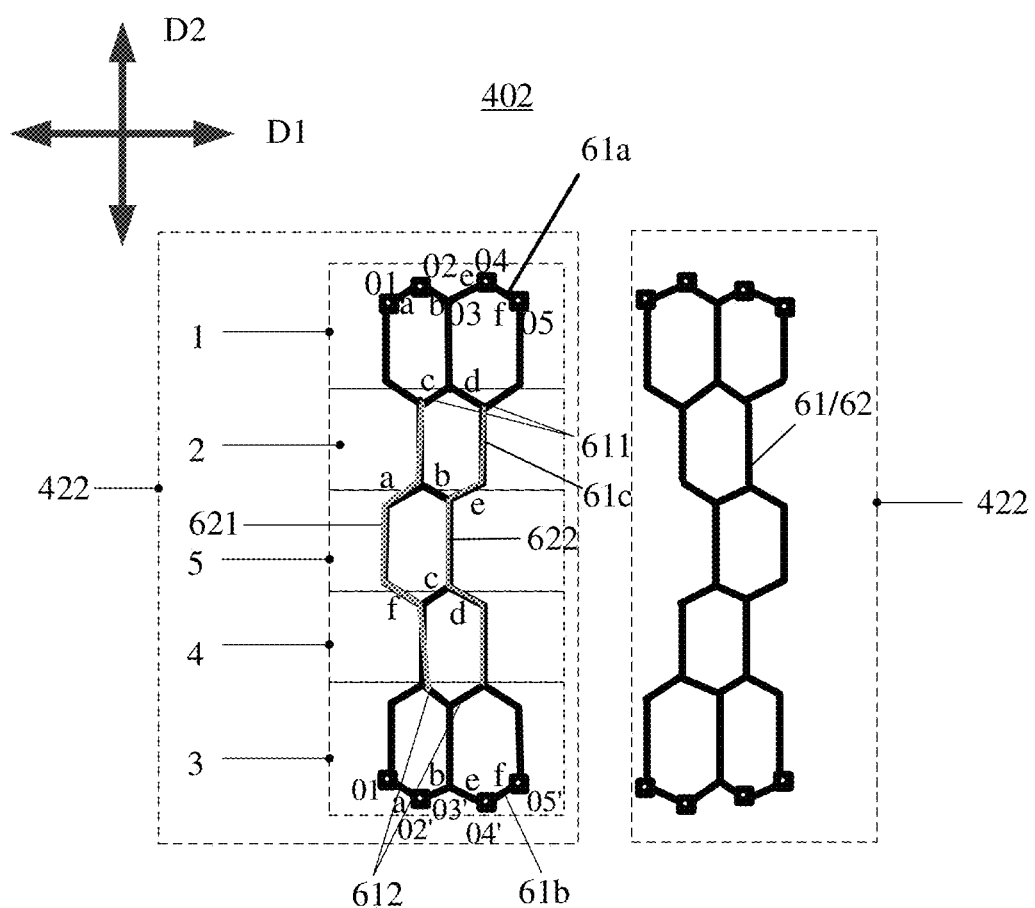
FIG. 6A shows a second touch electrode layer in FIG. 4A.

FIG. 4B is a cross-sectional diagram of FIG. 4A taken along a section line B-B', FIG. 5 shows the first touch electrode layer in FIG. 4A, and FIG. 6A shows the second touch electrode layer in FIG. 4A. In combination with FIGS. 4A-4B, 5 and 6A, the touch structure 40 includes the first metal grid layer 50 and the second metal grid layer 60, and the insulation layer 70 is arranged between the first metal grid layer 50 and the second metal grid layer 60. The first metal grid layer 50 includes a plurality of first metal grids 52 defined by a plurality of first metal lines 51, the second metal grid layer 60 includes a plurality of second metal grids 62 defined by a plurality of second metal lines 61, and planar shapes of each of the plurality of first metal grids 52 and each of the plurality of second metal grids 62 are both polygons. For example, the planar shapes of each of the plurality of first metal grids 52 and each of the second metal grids 62 shown in the above figure are hexagons. Of course, in other embodiments, their shapes may also be other polygons, such as quadrilateral, pentagon, triangle, etc., which can be specifically designed according to needs. The embodiments of the present disclosure do not limit the shape of each first metal grid 52 and the shape of each second metal grid 62, as long as the corresponding features in claims are satisfied.

As shown in FIG. 4A and FIG. 6A, each of the plurality of second connection electrodes 422 includes a first metal grid row 1 and a second metal grid row 2 that are arranged along the second direction. The first metal grid row 1 includes a plurality of second metal grids 62 arranged along the first direction D1. The second metal grid row 2 is adjacent to and connected with the first metal grid row 1, and includes at least one second metal grid 62 arranged along the first direction D1. The number of the second metal grids 62 in the second metal grid row 2 is less than the number of the least one second metal grid 62 in the first metal grid row 1, and all the second metal lines 61 of the second metal grid 62 in the second metal grid row 2 close to the first metal grid row 1 are sharing second metal lines 611 shared with the second metal grid 62 in the first metal grid row 1.

Figure 6B:
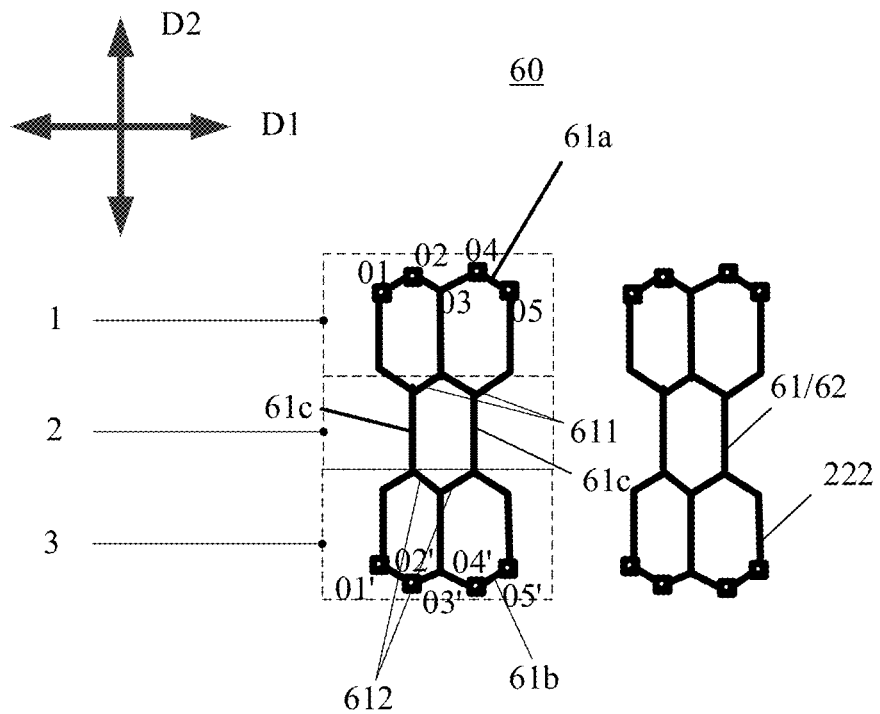
FIG. 6B is a schematic diagram of another second touch electrode layer provided by an embodiment of the present disclosure.
Figure 6C:
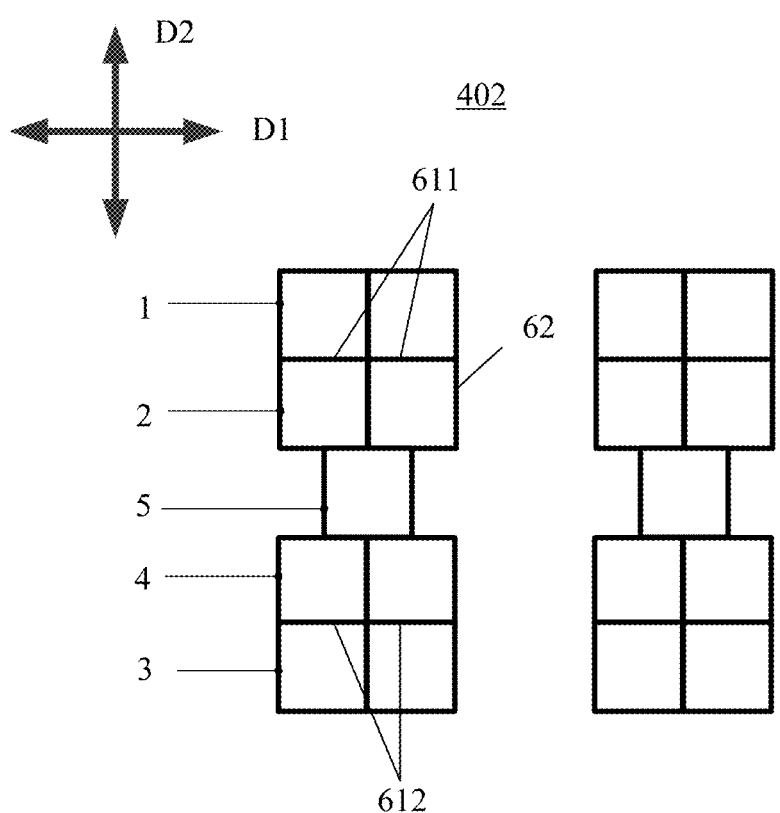
FIG. 6C is a schematic diagram of further another second touch electrode layer provided by an embodiment of the present disclosure.

In other embodiments, for example, as shown in FIG. 6C, the number of the least one second metal grid 62 in the second metal grid row 2 is equal to the number of the second metal grids 62 in the first metal grid row 1, and all the second metal lines 61 of the second metal grid 62 in the second metal grid row 2 close to the first metal grid row 1 are sharing second metal lines 611 shared with the second metal grid 62 in the first metal grid row 1.

In the touch structure 40 provided by the embodiments of the present disclosure, because all the second metal lines 61 of the second metal grid 62 in the second metal grid row 2 close to the first metal grid row 1 are sharing second metal lines 611 shared with the second metal grid 62 in the first metal grid row 1, except the second metal lines 61 shared with the first metal grid row 1, there is no additional second metal line that overlaps with the first metal line 51 among the second metal lines, close to the first metal grid row 1, of the second metal grid row 2, so that the overlapping area of the first metal line 51 and the second metal line 61 is reduced, and the overlapping area of the first touch electrode 410 and the second touch electrode 420 is reduced, which reduces the mutual capacitance between the first touch electrode 410 and the second touch electrode 420, improves the touch performance, and reduces the occurrence of false alarm and false touch and reduces the power consumption of touch circuit; at the same time, although there is an insulation layer between the first metal layer and the second metal layer, there is still the possibility that the insulation layer is missing at some positions in the manufacturing process of the touch structure. Therefore, reducing the overlapping area of the first metal line 51 and the second metal line 61 can also reduce the risk of connection between the first metal line 51 and the second metal line 62, and reduce the probability of short circuit between the first metal line 51 and the second metal line 61, which is conducive to the stability of the touch function of the entire touch structure, and solves the problems of poor touch performance, false alarm, false touch, and excessive power consumption of the touch circuit caused by the large overlapping area of the first metal line 51 and the second metal line 61; at the same time, it can solve the problem of short circuit caused by the missing of insulation layer during the manufacturing process of the touch structure.

For example, the first metal grid row 1 and the second touch sub-electrode 4211 adjacent to the first metal grid row 1 are electrically connected, and the orthographic projection of the sharing second metal line 611 shared with the second metal grid 62 in the first metal grid row 1 on the first metal grid layer 50 overlaps with the first metal line 51, so that on the basis of minimizing the overlapping area of the first metal line 51 and the second metal line 62, the display panel or display device adopting the touch structure 40 has a high opening ratio.

For example, in this embodiment, the number of the second metal grids 62 in the first metal grid row 1 is 2, and the number of the at least one second metal grid in the second metal grid row 2 is 1, so that the second connection electrode 422 includes as few second metal grid as possible, and the overlapping area between the first metal line 51 and the second metal line 62 is minimized, provided that the second grid row 2 provides at least two electrical signal transmission channels along the second direction D2. The at least two electrical signal transmission channels are, for example, the first channel 621 and the second channel 622 represented by the gray line in FIG. 6A.

In combination with FIG. 4A and FIG. 4B, the plurality of vias includes a first via 71, and the first metal grid row 1 is electrically connected with one second touch sub-electrode 4211 of the two second touch sub-electrodes 4211/4212 adjacent to the second connection electrode 422 in which first metal grid row 1 is located through the first via 71.

For example, as shown in FIG. 4A and FIG. 4B, the orthographic projections of the plurality of second metal lines 61 of the second metal grids 62 (for example, at least two metal grids 62) of the first metal grid row 1 on the first metal grid layer 50 respectively overlap with the plurality of first metal lines 51 of the first metal grid 52 of the second touch sub-electrode 421, so that the second metal grid 62 has a plurality of vertices overlapped with the first metal grid 52. For example, in this embodiment, the number of the plurality of vertices is 5, which are respectively a first vertex 01, a second vertex 02, a third vertex 03, a fourth vertex 04 and a fifth vertex 05. The plurality of vertices include a plurality of first connection vertices, the first vias 71 are correspondingly arranged at the plurality of first connection vertices, that is, the plurality of vias 71 are arranged in one-to-one correspondence with the plurality of connection vertices, and the vertex of the second metal grid 62 provided with the first via 71 is called the first connection vertex.

It should be noted that the first metal line and second metal line in the present disclosure respectively refers to the metal line connected between two adjacent vertices of the first metal grid and the metal line connected between two adjacent vertices of the second metal grid, that is, each first metal line and each second metal line respectively serve as an edge of the first metal grid and an edge of the second metal grid.

For example, as shown in FIG. 4A, the planar shapes of each of the plurality of first metal grids 52 and each of the second metal grids 62 are both hexagons. A plurality of second metal lines 61a (for example, four second metal lines 61a) of the second metal grid 62 of the first metal grid row 1 respectively overlap with four first metal lines 51A of an edge first metal grid 52 (the first metal grid of the second touch sub-electrode 4211 close to the edge of the second connection electrode 422) in the adjacent second touch sub-electrode 4211 in a direction perpendicular to the second metal grid layer 60, so that the edge first metal grid 52 has the above five vertices overlapped with the second metal grid 62; the four first metal lines 51 connect the five vertices in sequence to be in a W shape; each first metal line of the four first metal lines 51 intersect both the first direction D1 and the second direction D2, and at least one of the five vertices is the connection vertex. For example, in this embodiment, the first vertex 01, the second vertex 02, the fourth vertex 04 and the fifth vertex 05 are the connection vertices; in other embodiments, the first vertex 01, the second vertex 02, the third vertex 03, the fourth vertex 04 and the fifth vertex 05 may all be the connection vertices; alternatively, in some embodiments, non-adjacent vertices are the connection vertices, for example, the first vertex 01, the third vertex 03, and the fifth vertex 05 are connection vertices.

For example, the plurality of second metal grids 62 in the first metal grid row 1 are first edge second metal grids at a first edge of the second connection electrode, and are located at the first end of the second connection electrode 422 in the second direction D2, and are electrically connected with the edge first metal grids of the adjacent second touch sub-electrodes 4211. That is, the edge second metal line 61a of the second metal grid 62 of the first metal grid row 1 is connected with the edge first metal line 51a, closest to the first metal grid row 1, of the second touch sub-electrode 4211 adjacent to the edge second metal line 61a of the second metal grid 62 of the first metal grid row 1. This arrangement can minimize the overlap between the second touch sub-electrode 4211 and the second connection electrode 422, thereby reducing the capacitive load on the touch sub-electrode and improving the touch sensitivity.

It should be noted that, in FIG. 4A, the first metal grid layer 50 is closer to the viewer in a direction perpendicular to the base substrate 21, so as to avoid the problem that more first metal grids being close to pixel structures of the display structure affects the operation of the pixel structures. Therefore, the edge second metal line 61a is shielded by the edge first metal line Ma, and the edge second metal line 61a and the edge first metal line 51a can be distinguished in combination with FIG. 5 and FIG. 6A.

Figure 4C:
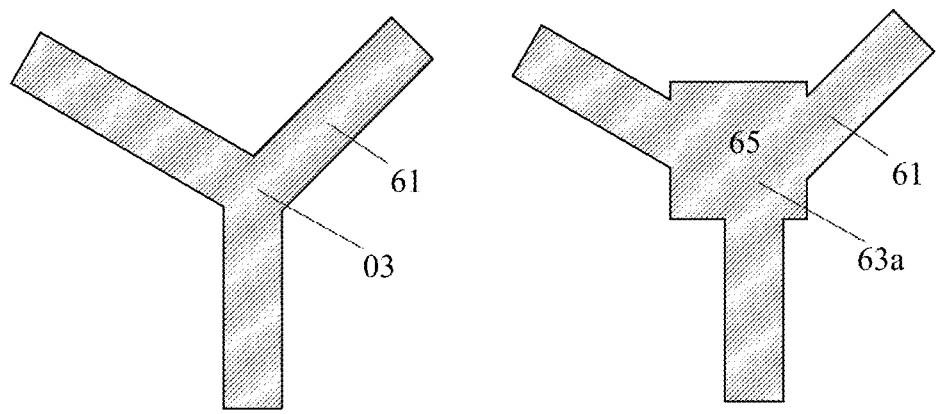
FIG. 4C is a schematic diagram of a vertex of a second metal grid not provided with a via and a vertex provided with a via.
Figure 4D:
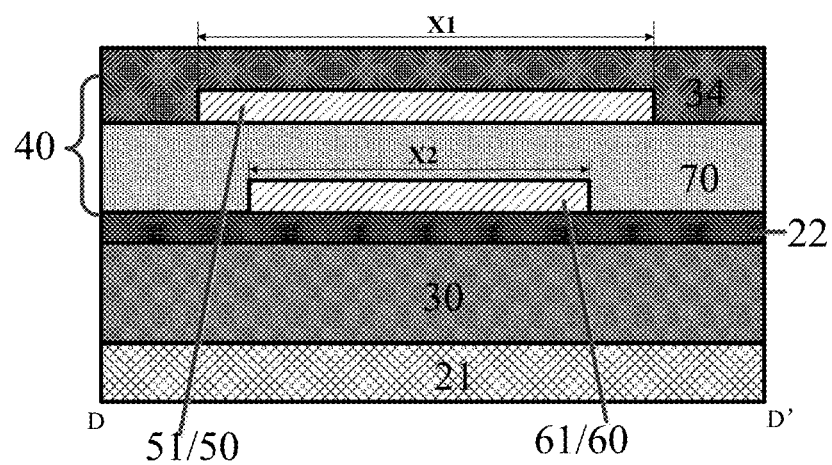
FIG. 4D is a cross-sectional diagram of FIG. 4A taken along the section line D-D'.

FIG. 4C is a schematic diagram of a vertex of the second metal grid without a via and a vertex of the second metal grid with a via, FIG. 4D is a cross-sectional view of FIG. 4A taken along a section line D-D', and specific details of the display structure are omitted in FIG. 4C and FIG. 4D.

For example, the left region of FIG. 4C shows an example of the vertex 03 (corresponding to the vertex 53 of the first grid layer) of the second metal grid 62 without a via, and the right region shows an example of the vertex 63a (corresponding to the vertex 53a of the first grid layer) of the second metal grid 62 with a via 71. As shown in FIG. 4C, in order to enable the second metal line 61 to form good contact with the first metal line 51 through the via 71 at the connection vertex 01, a metal contact pad 65 with a large area at at least one of the vertexes 01/02/04/05 is formed in the second metal grid layer 60, resulting in the occupied area of the vertex being larger than the occupied area of the original vertex 03. Similarly, the first metal grid layer 50 also forms a metal contact pad with a large area at the vertex 53a. For example, the shape of the metal contact pad is rectangular or circular, and the size (average length of edges or diameter) of the metal contact pad is more than twice that of the first metal line 51 or the second metal line 61. Therefore, the arrangement of the via 71 causes the overlapping area of the first metal line 51 and the second metal line 62 to become larger.

Through the above arrangements, each connection vertex can generate an effective electrical signal transmission channel, so as to minimize the arrangement of the metal contact pad and reduce the area of the metal layer. In this way, on the one hand, the self-capacitance of the second connection electrode 422 can be reduced, and on the other hand, the overlapping area of the first metal line 51 and the second metal line 52 can be reduced, so that at least from these two aspects, the capacitive load of the touch sub-electrode can be reduced, and therefore the touch sensitivity can be improved.

The effective channel can be understood as a necessary first metal line 51 that is directly connected to the vertex 53$a$ and enables the via 71 corresponding to the vertex 53$a$ to transmit the touch signal on the second touch sub-electrode 421 to the second connection electrode 422. Therefore, the first metal line 51 connected between two adjacent vertices 53$a$ is not an effective channel, because the touch signal can be transmitted to the second connection electrode 422 through the via 71 corresponding to the vertex 53$a$ when the touch signal reaches any vertex 53$a$, without passing through the first metal line 51 that does not have to pass through.

For example, for each second connection electrode 422, the number of the vertex of the second metal grid of the first metal grid row 1 overlapped with the edge first metal grid 52$a$ is not less than 5, and the number of the connection vertex is not less than 3.

For example, the first metal line 51 directly connected to the vertex of the first metal line 51 corresponding to each connection vertex is complete, that is, the above first metal line 51 connected between the two vertices of the first metal grid 52 does not have a space or an opening in the middle. For example, the first metal grid 52 where the vertex of the first metal line 51 corresponding to each connection vertex is located is complete, that is, all the first metal lines 51 in the first metal grid 52 are complete, that is, all the first metal lines 51 in the first metal grid 52 does not have a space or an opening. This arrangement can improve the transmission efficiency and effectiveness of the touch signal input from the second touch sub-electrode 421 to the second connection electrode 422.

For example, as shown in FIG. 4D, the average line width X1 of the first metal line 51 is larger than the average line width X2 of the second metal line 61. For example, in the width direction of the metal line, the orthographic projection of the second metal line 61 on the base substrate 21 is located within the orthographic projection of the first metal line 51 on the base substrate 21, which can effectively improve the opening ratio of the display substrate.

For example, as shown in FIG. 4A, FIG. 5 and FIG. 6A, each of the plurality of second connection electrodes 422 further includes a third metal grid row 3 and a fourth metal grid row 4 that are arranged in the second direction D2. The third metal grid row 3 is located on the side of the second metal grid row 4 away from the first metal grid row 1, and includes a plurality of second metal grids 62 arranged along the first direction D1; the fourth metal grid row 4 is located on the side of the third metal grid row 3 close to the second metal grid row 2 and adjacent to and connected with the third metal grid row 3, the fourth metal grid row 4 includes at least one second metal grid 62 arranged along the first direction D1. The number of the second metal grid 62 in the fourth metal grid row 4 is less than the number of the second metal grid in the third metal grid row 3, and all the second metal lines 612 of the second metal grid 62 in the fourth metal grid row 4 close to the third metal grid row 3 are sharing second metal lines 612 shared with the second metal grid 62 in the third metal grid row 3.

For example, in some other embodiments, for example, as shown in FIG. 6C, the number of the second metal grid 62 in the fourth metal grid row 4 is equal to the number of the second metal grid in the third metal grid row 3, and all the second metal lines 612 of the second metal grid 62 in the fourth metal grid row 4 close to the third metal grid row 3 are sharing second metal lines 612 shared with the second metal grid 62 in the third metal grid row 3. The pattern of the first metal grid is designed corresponding to the second metal grid shown in FIG. 6C, as long as the same conditions in the previous embodiment are met.

In the touch structure 40 provided by the embodiments of the present disclosure, because all the second metal lines 61 of the second metal grid 62 in the fourth metal grid row 4 close to the third metal grid row 3 are sharing second metal lines 612 shared with the second metal grid 62 in the third metal grid row 3, in addition to the sharing second metal lines 61 shared with the third metal grid row 3, there is no additional second metal line overlapping with the first metal line 51 in the second metal lines of the fourth metal grid row 4 close to the first metal grid row 1. Therefore, the overlapping area of the first metal line 51 and the second metal line 61 is reduced, and the overlapping area of the first touch electrode 410 and the second touch electrode 420 is reduced, so as to further achieve the technical effect of reducing the mutual capacitance value between the first touch electrode 410 and the second touch electrode 420, reducing the power consumption of the touch circuit and reducing the probability of short circuit between the first metal line 51 and the second metal line 61.

For example, the second metal grid 62 of the third metal grid row 3 is a second edge second metal grid of the second connection electrode 422 at a second edge of the second connection electrode 422, which is located at the second end of the second connection electrode 422 in the second direction and is electrically connected with the edge first metal grid of the second touch sub-electrode 4212 adjacent to the third metal grid row 3, and the second end is opposite to the first end in the second direction D2. That is, the edge second metal line 61$b$ of the second metal grid 62 of the third metal grid row 3 is connected with the edge first metal line 51$b$, closest to the third metal grid row 3, of the second touch sub-electrode 4212 adjacent to the third metal grid row 3. This arrangement can minimize the overlapping area between the second touch sub-electrode 4212 and the second connection electrode 422, thereby reducing the capacitive load on the touch sub-electrode and improving the touch sensitivity.

For example, as shown in FIG. 4A, the plurality of vias further include a second via 72, and the third metal grid row 3 is electrically connected with the other electrode 4212 of the two second touch sub-electrodes adjacent to the second connection electrode 422 where the third metal grid row 3 is located through the second via.

For example, as shown in FIG. 4A, the orthographic projections of the plurality of second metal lines 61 of the second metal grid 62 of the third metal grid row 3 on the first metal grid layer 50 respectively overlap with the plurality of first metal lines 51 of the first metal grid 52 of the second touch sub-electrode 421, so that the second metal grid 62 has a plurality of vertices overlapped with the first metal grid 52. For example, in this embodiment, the number of the plurality of vertices in the third metal grid row 3 is 5, which are respectively a sixth vertex 01', a seventh vertex 02', an eighth vertex 03', a ninth vertex 04' and a tenth vertex 05'. The plurality of vertices include a plurality of second connection vertices, the second vias 72 are correspondingly arranged at the plurality of connection vertices, that is, the plurality of second vias 72 and the plurality of second connection vertices are arranged in one-to-one correspondence. The vertices of the second metal grid 62 provided with the second vias 72 are called the second connection vertices.

The setting mode of the second via 72 is similar to the setting mode of the first via 71, please refer to the descriptions of the relevant features of the first via 71.

Combined with FIG. 4A and FIG. 5, for example, the orthographic projection of the sharing second metal line 612 shared with the second metal grid 62 in the third metal grid row 3 on the first metal grid layer 50 does not overlap with the first metal line 51, that is, the first metal line 51 is not provided at the position of the first metal layer 50 corresponding to the sharing second metal line 612, so as to minimize the overlapping area of the first metal line 51 and the second metal line 62 and avoid the problem caused by the large overlapping area of the two.

Of course, in other embodiments, the orthographic projection of the sharing second metal line 612 on the first metal grid layer 50 may also overlap with the first metal line 51, so that the display panel or display device using the touch structure 40 has a high opening ratio on the basis of minimizing the overlapping area of the first metal line 51 and the second metal line 62.

The number of the second metal grid in the third metal grid row is 2, and the number of the second metal grid in the fourth metal grid row is 1, so as to minimize the overlapping area between the first metal line 51 and the second metal line 62 on the basis of ensuring that the signal can be transmitted through the second connection electrode 422. In this case, each second electrode 422 includes at least two electrical signal transmission channels along the second direction D2.

For example, the second connection electrode 422 further includes at least one intermediate metal grid row located between the second metal grid row 2 and the fourth metal grid row 4, and each row of the at least one intermediate metal grid row includes at least one second metal grid 62. For example, in this embodiment, the number of the at least one intermediate metal grid row is 1, that is, the fifth grid row 5. The fifth grid row 5 is adjacent to and connected with both the second metal grid row 2 and the fourth metal grid row 4.

For example, the number of the second metal grid in each row of the at least one intermediate metal grid row is 1. For example, the fifth grid row 5 has only one second metal grid, so that the second connection electrode 422 includes as few second metal grids as possible, while ensuring that the fifth grid row 5 provides the at least two electrical signal transmission channels along the second direction D2, and therefore the overlapping area between the first metal line 51 and the second metal line 62 is minimized.

For example, the pattern of each of the plurality of second connection electrodes 422 is symmetrical with respect to the symmetry axis along the first direction D1, so as to facilitate the uniformity of touch signal transmission conducted through the second connection electrode 422.

For example, each second metal grid 62 includes at least two vertical edges 61c along the second direction D2, so as to ensure that each row of the second metal grid can provide at least two electrical signal transmission channels along the second direction D2. In this way, when a certain vertical edge 61c has the risk of disconnection, the occurrence of bad touch points can be prevented, thereby ensuring the reliability of the touch function. For example, the orthographic projections of the at least two vertical edges 61c on the first metal grid layer 50 do not overlap with the first metal line 51, so as to minimize the overlapping amount between the first metal line 51 and the second metal line 62.

For example, as shown in FIG. 4A and FIG. 6A, the adjacent second touch sub-electrodes 4211 and 4212 are electrically connected through two second connection electrodes 422, that is, a second connection electrode 422 on the left and a second connection electrode 422 on the right in FIG. 6A. The two second connection electrodes 422 are spaced apart from each other. In combination with FIG. 4A and FIG. 5, the orthographic projection of each of the plurality of first connection electrodes 412 on the second metal grid layer 60 is located in the gap between two second connection electrodes 422 connecting the adjacent two second touch sub-electrodes 4211 and 4212.

In combination with FIG. 4A and FIG. 5, for example, each of the plurality of first touch sub-electrodes 421 is electrically connected with the adjacent first connection electrode 412 through at least one first connection line 464 constituted by a plurality of first metal lines 51 that are connected head to tail in sequence. The orthographic projection of the first connection line 461 on the second metal grid layer 60 overlaps with a plurality of second metal lines of the second connection electrode 422 respectively, and at least partially overlaps with the orthographic projection of the sharing second metal line 611 on the first metal grid layer 50. For example, in the embodiments shown in FIG. 4A, FIG. 5 and FIG. 6A, the first touch sub-electrode 411 on the left in the FIG. 5 is electrically connected with the first connection electrode 412 through three first connection lines 4611, 4612 and 4613, and a part of the orthographic projection of the first connection line 4611 on the second metal grid layer 60 overlaps with the sharing second metal line 611 shared by the first metal grid row 1 and the second metal grid row 2 of the second connection electrode 422 on the left in the FIG. 4A, so as to reduce the overlapping area of the first metal line 51 and the second metal line 62 as much as possible and avoid the problem caused by the large overlapping area of the two. The first touch sub-electrode 411 on the right in the FIG. 5 is electrically connected with the first connection electrode 412 through a plurality of second connection lines 462. Each second connection line is constituted by a plurality of first metal line 51 connected from head to tail in sequence, similar to each first connection line. For example, the first touch sub-electrode 411 on the right in the FIG. 5 is electrically connected with the first connection electrode 412 through three second connection lines 4621, 4622 and 4623, and a part of the orthographic projection of the second connection line 4621 on the second metal grid layer 60 overlaps with the sharing second metal line 611 shared by the first metal grid row 1 and the second metal grid row 2 of the second connection electrode 422 on the right in the FIG. 4A, so as to reduce the overlapping area of the first metal line 51 and the second metal line 62 as much as possible, and avoid the problem caused by the large overlapping area of the two.

For example, in the embodiment, at the position of the first metal layer 50 corresponding to the sharing second metal line 612 of the third metal grid row 3 of the second connection electrode 422, there is no first connection line and the second connection line 612 that overlap with the sharing second metal line 612, so as to minimize the overlapping amount between the first metal line 51 and the second metal line 62. Of course, in other embodiments, the first connection line and the second connection line may at least partially overlap with the orthographic projection of the sharing second metal line 612 on the first metal layer 50.

For example, as shown in FIG. 6A, a, b, c, d, e, and f respectively represent a plurality of edges of different second metal grids 62. For example, the length relationship of these edges is: a<e<c, f<d<b. For example, the second grid lines of the second metal grid layer 402 in FIG. 6A that overlap with the first metal line are respectively the grid lines a, b, c, d, e, f marked in the FIG. 6A. In the case that the number of second metal lines 61 overlapping with the first metal line 51 is equal, the sum of the lengths of these second grid lines overlapping with the first metal line in the embodiment of the present disclosure is the smallest. According to the length of each edge of the second metal grid 62 and each edge of the first metal grid 52, the position of the second metal grid 62 is designed in a way that the overlapping length is the smallest, so that the sum of the length of the second grid line overlapping with the first metal line is the smallest on the basis of satisfying the conditions described above. Of course, in other embodiments, the position of the second grid line overlapping with the first metal line may be different from that in FIG. 4A, but the sum of the length of the second grid line overlapping with the first metal line may still be minimized by design.

For example, the plurality of first metal lines located in the boundary region between the adjacent first touch sub-electrode and the second touch sub-electrode respectively include a plurality of openings. Each of the plurality of openings divides the first metal line into two first metal segments. One of the two first metal segments belongs to the first touch sub-electrode and the other belongs to the second touch sub-electrode, so that the adjacent first touch sub-electrode and the second touch sub-electrode are insulated.

Figure 7A:
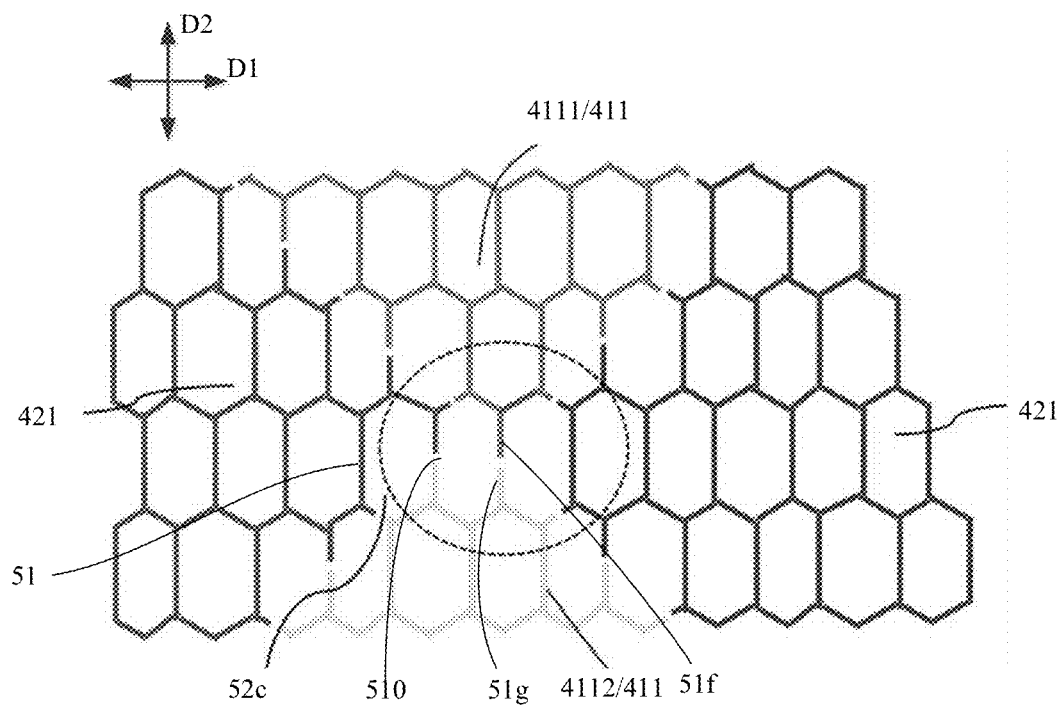
FIG. 7A and FIG. 7B respectively show two examples of enlarged schematic diagrams of a region B in FIG. 2.
Figure 7B:
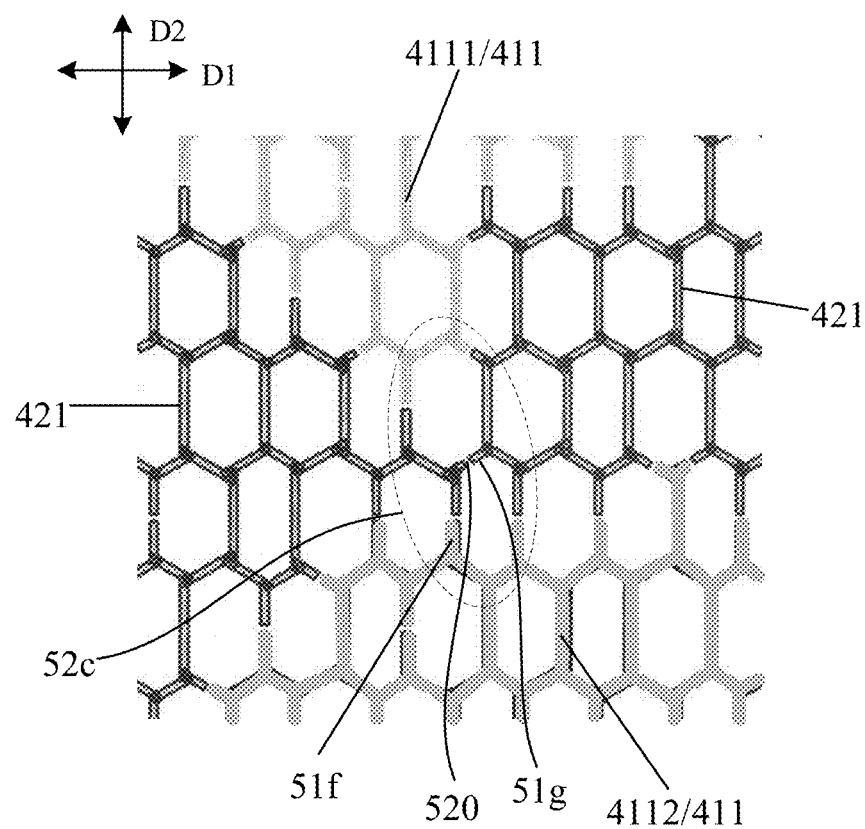

For example, FIG. 7A and FIG. 7B respectively show two examples of the enlarged schematic diagram of a region B in FIG. 2. The region B involves two first touch sub-electrodes 411 adjacent and insulated in the second direction D2 and two second touch sub-electrodes 421 adjacent and insulated in the first direction D1. The region B is the isolation region of the four touch sub-electrodes.

The metal grids shown in FIG. 7A are all located in the first metal grid layer, that is, they are all the first metal grids, in which the light grid represents the first metal grid in the two adjacent first touch sub-electrodes 411, and the dark grid represents the first metal grid in the two adjacent second touch sub-electrodes 421.

As shown in FIG. 7A, the first touch sub-electrode 411 and the second touch sub-electrode 421 are adjacent to each other. The plurality of first metal lines 51 located in the boundary region between the two include a plurality of openings 510. For example, each space 510 is located in the middle of the first metal line 51, that is, each space 510 is located in the middle of one edge of the first metal grid 52, and separates the first metal line 51 into two first metal line segments 51f, one of the two first metal segments 51f belongs to the first touch sub-electrode 411 and the other belongs to the second touch sub-electrode 421, so that the adjacent first touch sub-electrode 411 and the second touch sub-electrode 421 are insulated.

It should be noted that, in the embodiments of the present disclosure, the first metal segment belonging to the touch sub-electrode means that there is an electrical connection between the first metal segment and the touch sub-electrode.

In the touch structure provided by at least one embodiment of the present disclosure, the adjacent and insulated touch sub-electrodes (for example, between the adjacent first touch sub-electrode and the second touch sub-electrode, between the two adjacent second touch sub-electrodes in the first direction, and between the two adjacent first touch sub-electrodes in the second direction) are insulated from each other through the space formed by the disconnected metal line; compared with realizing insulation by setting dummy electrodes, this arrangement can maximize the arrangement area of the touch electrode, improve the density of the touch electrode, and thus improve the touch sensitivity.

For example, as shown in FIG. 7A, the edge metal grid of each touch sub-electrode is incomplete, that is, the edge metal grid of each touch sub-electrode includes a part of the first metal grid, and the edge metal grids in adjacent touch sub-electrodes match each other to define the first metal grid.

For example, at least one first metal grid includes three first metal grid parts insulated from each other, the three first metal grid parts respectively belong to one first touch sub-electrode and two adjacent second touch sub-electrodes in the first direction D1. For example, the shape of the first metal grid is hexagonal, and at least two first metal grids include the above-mentioned three first metal grid parts that are insulated from each other.

As shown in FIG. 7A and FIG. 7B, in FIG. 7A and FIG. 7B, each of the two first metal grids 52c in the dotted circle includes three first metal grid parts insulated from each other, the three first metal grid parts respectively belong to three touch sub-electrodes insulated from each other, the three touch sub-electrodes include two adjacent first touch sub-electrodes 411 adjacent to each other in the second direction D2 and a second touch sub-electrode 421 (as shown in FIG. 7A) located between the two adjacent first touch sub-electrodes, or the three touch sub-electrodes include two adjacent second touch sub-electrodes 421 adjacent to each other in the first direction D1 and a first touch sub-electrode 411 located between the two adjacent second touch sub-electrodes 421 (as shown in FIG. 7B). This design makes the arrangement of touch sub-electrodes more compact while being effectively insulated, thus improving the touch sensitivity.

For example, as shown in FIG. 7A and FIG. 7B, there is an opening 510 on each edge of three edges of each metal grid 52c, so that the metal grid is divided into three parts that are insulated from each other.

For example, as shown in FIG. 7A and FIG. 7B, the shape of the first metal grid 52c is a polygon, such as a hexagon, the hexagon includes two edges parallel to the second direction D2 and opposite to each other. The first metal line 51 on at least one edge of the first metal grid 52c has an opening which separates the first metal line into two first metal line segments 51f. For example, as shown in FIG. 7A, the two first metal segments 51f respectively belong to two first touch sub-electrodes 411 adjacent to each other in the second direction D2. For another example, as shown in FIG. 7B, the two first metal segments 51f respectively belong to the adjacent first touch sub-electrode 411 and the second touch sub-electrode 421.

For example, as shown in FIG. 7A and FIG. 7B, the polygons of two first metal grides 52c share one edge, that is, the two first metal grids 52c share one first metal line 51g, and there is an opening 520 on the first metal line 51g, the opening 520 separates the first metal line 51g into two first metal segments that are spaced apart from each other.

For example, as shown in FIG. 7A, the two first metal grids 52c are arranged along the first direction D1, and the first metal line 51g shared by the two first metal grids 52c is parallel to the second direction D2. The two first metal segments of the shared first metal line 51g respectively belong to two first touch sub-electrodes 411 adjacent to each other in the second direction D2; that is, the two adjacent first touch sub-electrodes 411 in the second direction D2 are directly adjacent and separated from each other through the opening. For example, the two adjacent second touch sub-electrodes 421 adjacent to each other in the first direction D1 are separated from each other by a part of the two adjacent first touch sub-electrodes 411 adjacent to each other in the second direction D2.

For example, as shown in FIG. 7B, the arrangement direction of the two first metal grids 52c is neither parallel nor perpendicular to the second direction D2, and the first metal line 51g shared by the two first metal grids is neither parallel nor perpendicular to the second direction D2. The two first metal segments in the first metal line 51g shared by the two first metal grids respectively belong to two adjacent second touch sub-electrodes 421 adjacent to each other in the first direction D1; that is, the two adjacent second touch sub-electrodes 421 adjacent to each other in the first direction D1 are directly adjacent and are separated from each other through the opening. For example, the two adjacent first touch sub-electrodes 411 adjacent to each other in the second direction D2 are separated from each other by a part of the two adjacent second touch sub-electrodes 421 adjacent to each other in the first direction D1.

For example, as shown in FIG. 7A and FIG. 7B, each of the three first metal line parts of one of the two first metal grids 52c includes a complete first metal line 51 which has no opening; and the number of the first metal lines included in the three first metal grid parts of the other one of the two first metal grids 52c is different from each other, for example, the number is 0, 1, and 2, respectively.

As shown in FIG. 7A and FIG. 7B, each first metal grid part includes two first metal segments 51f, or includes only two first metal segments 51f, or includes a complete first metal line 51 and two first metal segments 51f, and the first metal line 51 is connected between the two first metal segments, or may include two complete first metal lines 51 and two first metal segments 51f, the two first metal lines 51 are connected between the two first metal segments 51f.

Figure 7C:
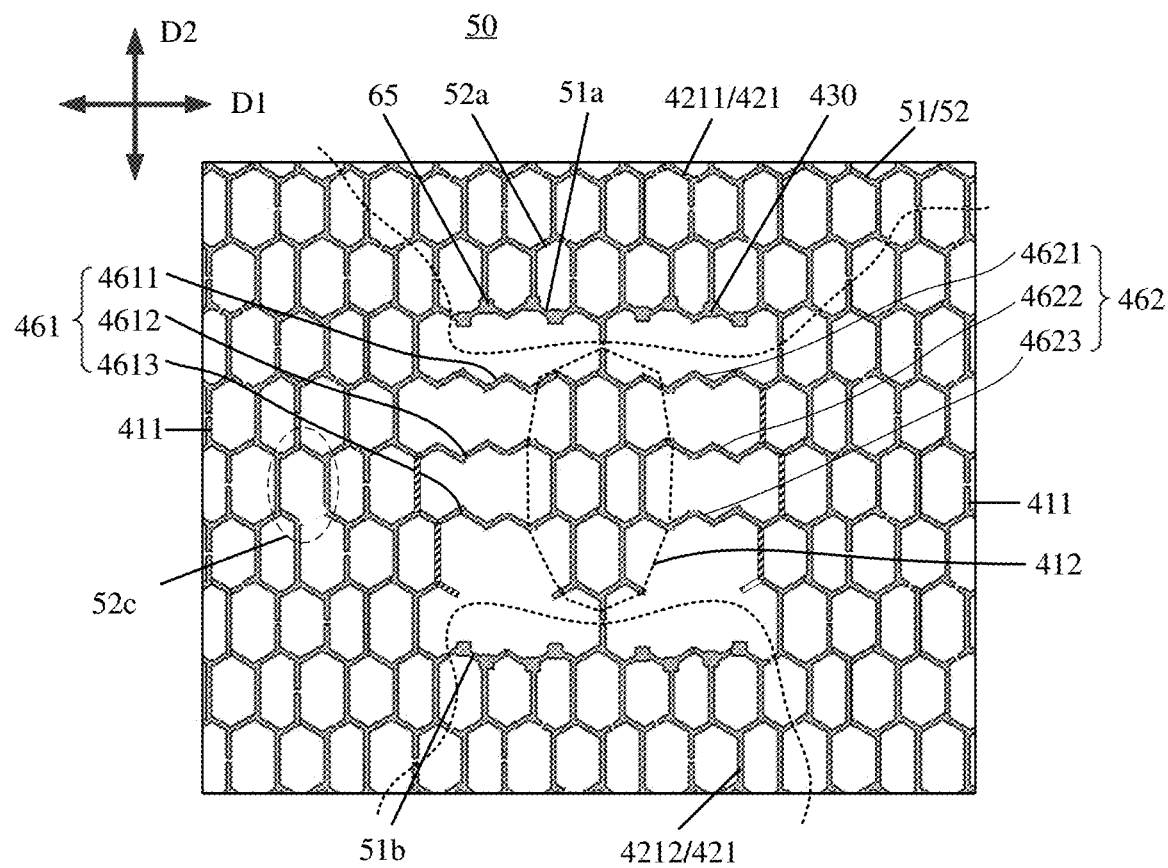
FIG. 7C is a schematic diagram of another first touch electrode layer provided by an embodiment of the present disclosure.

In addition, in one first touch sub-electrode, one first metal grid is not necessarily in a complete closed shape. For example, as shown in FIG. 5, in at least one first touch sub-electrode 411, one edge of a part of the first metal grids 52b has an opening 530. Alternatively, as shown in FIG. 7C, in at least one first touch sub-electrode 411, one edge of a part of the first metal grids 52C is missing.

Figure 7D:
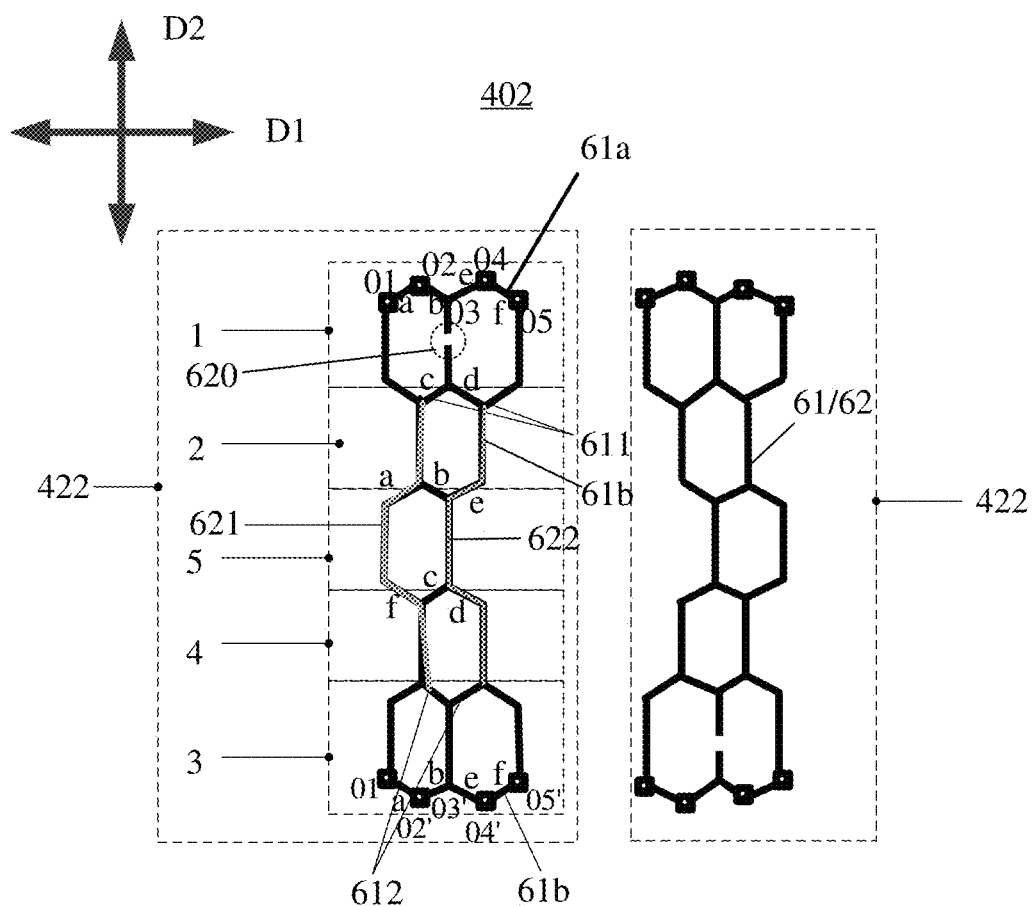
FIG. 7D is a schematic diagram of further another first touch electrode layer provided by an embodiment of the present disclosure.

Similarly, in one second touch sub-electrode, one second metal grid is not necessarily in a complete closed shape. For example, as shown in FIG. 7D, in one second touch sub-electrode 421, one edge of a part of the second metal grids 62 has an opening 620. Alternatively, in some embodiments, one edge of a part of the second metal grids 62 is missing. As long as the function of the second touch sub-electrode is not affected, and in some embodiments, the second grid row 2 is guaranteed to provide at least two electrical signal transmission channels along the second direction D2, for example, the at least two electrical signal transmission channels are respectively a first channel 621 and a second channel 622 represented by the gray lines in FIG. 7D. Of course, the at least two electrical signal transmission channels are not unique, and are not limited to the case shown in FIG. 7D.

FIG. 6B is a schematic diagram of another second touch electrode layer provided by an embodiment of the present disclosure. The second connection electrode shown in FIG. 6B has the following differences from those in FIG. 4A and FIG. 6A. Each of the plurality of second connection electrodes further includes a third metal grid row 3 arranged in the second direction with the first metal grid row, the third metal grid row 33 is located on the side of the second metal grid row 2 away from the first metal grid row 1 and adjacent to the second metal grid row 2, and includes a plurality of second metal grids 62 arranged along the first direction D1; the number of the second metal grid 62 in the second metal grid row 2 is less than the number of the second metal grid 62 in the third metal grid row 3, and all the second metal lines 612 of the second metal grid 62 in the second metal grid row 2 close to the third metal grid row 3 are sharing second metal lines 612 shared with the second metal grid 62 in the third metal grid row 3; the second metal grid 62 of the third metal grid row 3 is the second edge second metal grid of the second connection electrode 422 at a second edge of the second connection electrode 422, which is located at the second end of the second connection electrode 422 in the second direction D2, and is electrically connected with the edge first metal grid of the second touch sub-electrode 412 adjacent to the third metal grid row 3, and the second end is opposite to the first end in the second direction D2; the plurality of vias include a second via, and the third metal grid row 3 is electrically connected with the other one of the two second touch sub-electrodes 421 adjacent to the second connection electrode 422 through the second via. Other features of the second connection electrode shown in FIG. 6B, such as the features and corresponding technical effects of the first metal grid row and the second metal grid row, are the same as those in the embodiments shown in FIG. 4A and FIG. 6A, and the previous descriptions can be referred to. In the case that the second metal grid layer 60 adopts the second connection electrode shown in FIG. 6B, the pattern of the first metal grid layer 50 may be changed accordingly.

At least one embodiment of the present disclosure provides a touch structure, the touch structure includes a plurality of touch sub-electrodes spaced apart from each other, and a dummy electrode. The dummy electrode is embedded in at least one touch sub-electrode of the plurality of touch sub-electrodes and spaced apart from the touch sub-electrode in which the dummy electrode is embedded to insulate each other; the at least one touch sub-electrode comprises a strip-shaped channel and a main body part surrounding the dummy electrode and the channel, and the strip-shaped channel passes through the dummy electrode, and both two ends of the strip-shaped channel in an extension direction of the strip-shaped channel are connected with the main body part.

Figure 8A:
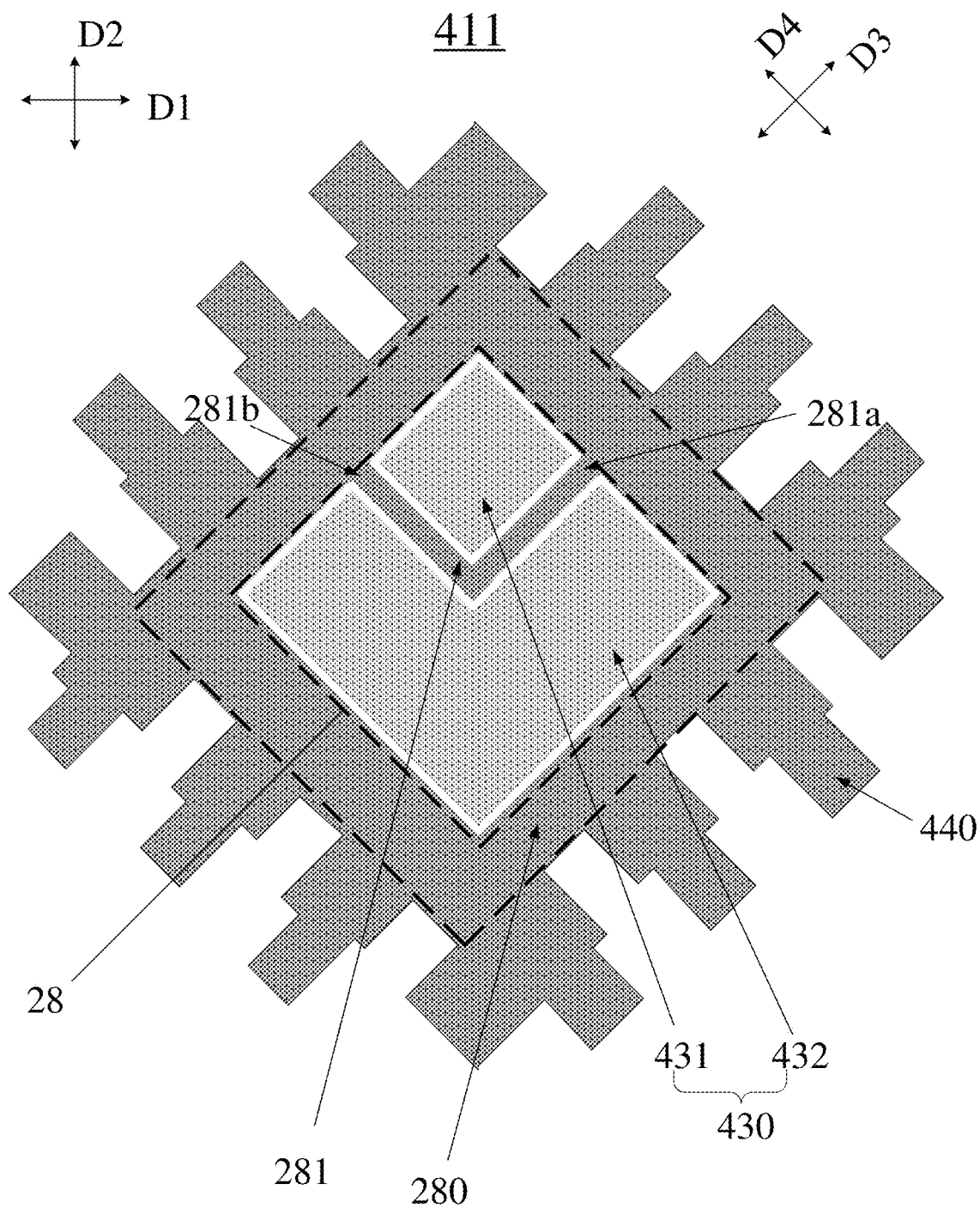
FIG. 8A is a first structural diagram of a dummy electrode embedded in a touch self-electrode provided by an embodiment of the present disclosure.

In at least one embodiment of the present disclosure, for example, in combination with FIG. 2 and FIG. 8A, the touch structure 40 includes a dummy electrode 430. The dummy electrode 430 is embedded in at least one touch sub-electrode of the plurality of touch sub-electrodes and is spaced apart from the touch sub-electrode where the dummy electrode 430 is located to insulate each other. The plurality of touch sub-electrodes are spaced apart from each other. For example, each touch sub-electrode is embedded with a dummy electrode 430, or some of the plurality of touch sub-electrodes are respectively embedded with a dummy electrode 430. In FIG. 2, for example, the at least one touch sub-electrode is the second touch sub-electrode 421. In other embodiments, for example, as shown in FIG. 8A, the at least one touch sub-electrode may be the first touch sub-electrode 411.

By providing the dummy electrode 430 spaced apart from the touch sub-electrode without electrical connection, the electrode area (effective area) of the touch electrode is reduced, and the capacitive load (self-capacitance) on the touch electrode is reduced, so that the load on the touch electrode is reduced and the touch sensitivity is improved. For example, the dummy electrode 430 is in a floating state, that is, it is not electrically connected to other structures or does not receive any electrical signals. However, in the dummy electrode 430 shown in FIG. 2, there is no metal line of the touch sub-electrode, so the touch signal amount in the region provided with the dummy electrode 430 is small, which leads to the decline of the touch accuracy of the region and affects the touch performance of the electronic device adopting the touch structure, such as the display panel.

For example, in the touch structure provided by at least one embodiment of the present disclosure, as shown in FIG. 8A, taking one first touch sub-electrode 411 as an example, the first touch sub-electrode includes a strip-shaped channel 281 and a main body part 280 surrounding the dummy electrode 430 and the channel 281. The strip-shaped channel 281 passes through the dummy electrode, and both two ends 281*a*/281*b* in the extension direction of the strip-shaped channel 281 are connected with the main body part 280, the dummy electrode 430 includes a first part 431 and a second part 432 that are spaced apart by the strip-shaped channel 281. The first part 431 and the second part 432 are both spaced apart from the first touch sub-electrode 411 to be insulated from the first touch sub-electrode 411. In FIG. 8A, the white region surrounding the first part 431 and the second part 432 of the dummy electrode 430 represents the space between the first part 431 and the first touch sub-electrode 411, and the space between the second part 432 and the first touch sub-electrode 411. In the touch structure, because the channel 281 passes through the dummy electrode 430, the touch blind spot caused by the continuous arrangement of the dummy electrode can be avoided; at the same time, the channel 281 passing through the dummy electrode 430 forms an effective signal channel inside the dummy electrode to reduce the resistance of the touch electrode; moreover, the channel 281 passing through the dummy electrode 430 increases the touch signal amount of the region provided with the dummy electrode 430, and therefore the touch accuracy of the region is improved, and thus the touch performance of the electronic device using the touch structure, such as the display panel, is improved.

As shown in FIG. 8A, for example, the shape of the outer contour of the whole structure 28 constituted by the dummy electrode 430 and the strip-shaped channel 281 (that is, the plane shape of the whole structure 28 constituted by the dummy electrode 430 and the strip-shaped channel 281) is a first polygon; for example, the first polygon is a regular polygon, such as a rectangle, a square, a parallelogram, a regular hexagon, and so on. Of course, the shape of the first polygon is not limited to the types listed above. The shape of the whole structure 28 constituted by the dummy electrode 430 and the strip-shaped channel 281 being polygon means that the jag of edges of the polygon are ignored, and the edges are allowed to be jagged, each edge of the first polygon is not required to be a strict straight line segment. For example, in some other embodiments, the shape of the outer contour of the whole structure 28 constituted by the dummy electrode 430 and the strip-shaped channel 281 may be other shapes such as a circle, which is not limited by the embodiments of the present disclosure.

For example, in some embodiments, as shown in FIG. 8A, the two ends 281*a*/281*b* of the channel 281 are respectively close to the two adjacent edges of the first polygon.

Figure 8B:
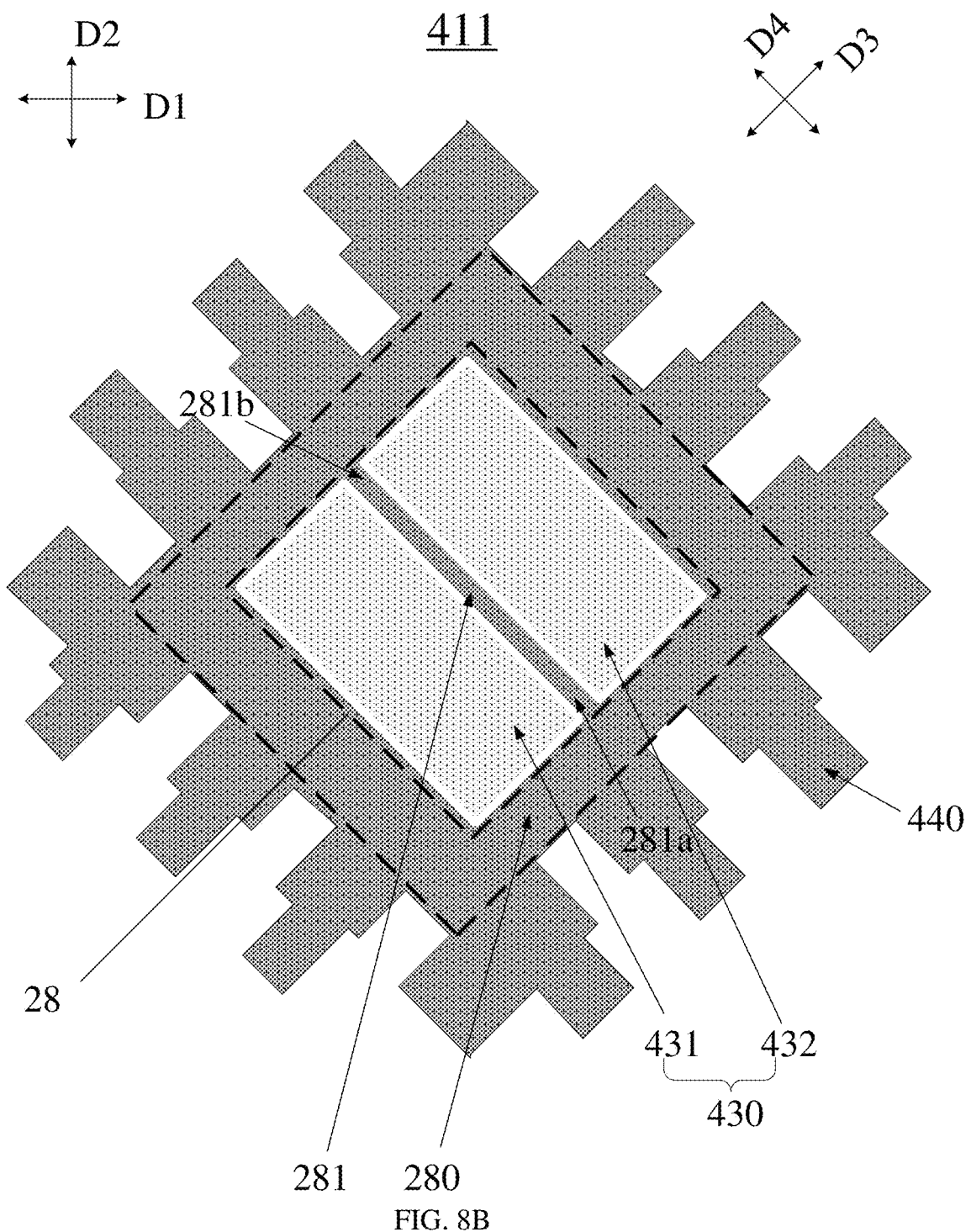
FIG. 8B is a second structural diagram of a dummy electrode embedded in a touch self-electrode provided by an embodiment of the present disclosure.

Alternatively, in some embodiments, as shown in FIG. 8B, the two ends 281*a*/281*b* of the channel 281 are respectively close to the two opposite edges of the first polygon. In this way, the channel 281 passes through the dummy electrode 430 more comprehensively, achieving a better technical effect of improving the touch accuracy of the region provided with the dummy electrode 430. Other features of the first touch sub-electrode shown in FIG. 8B that are not mentioned are the same as those in FIG. 8A, please refer to the descriptions of FIG. 8A.

Figure 8C:
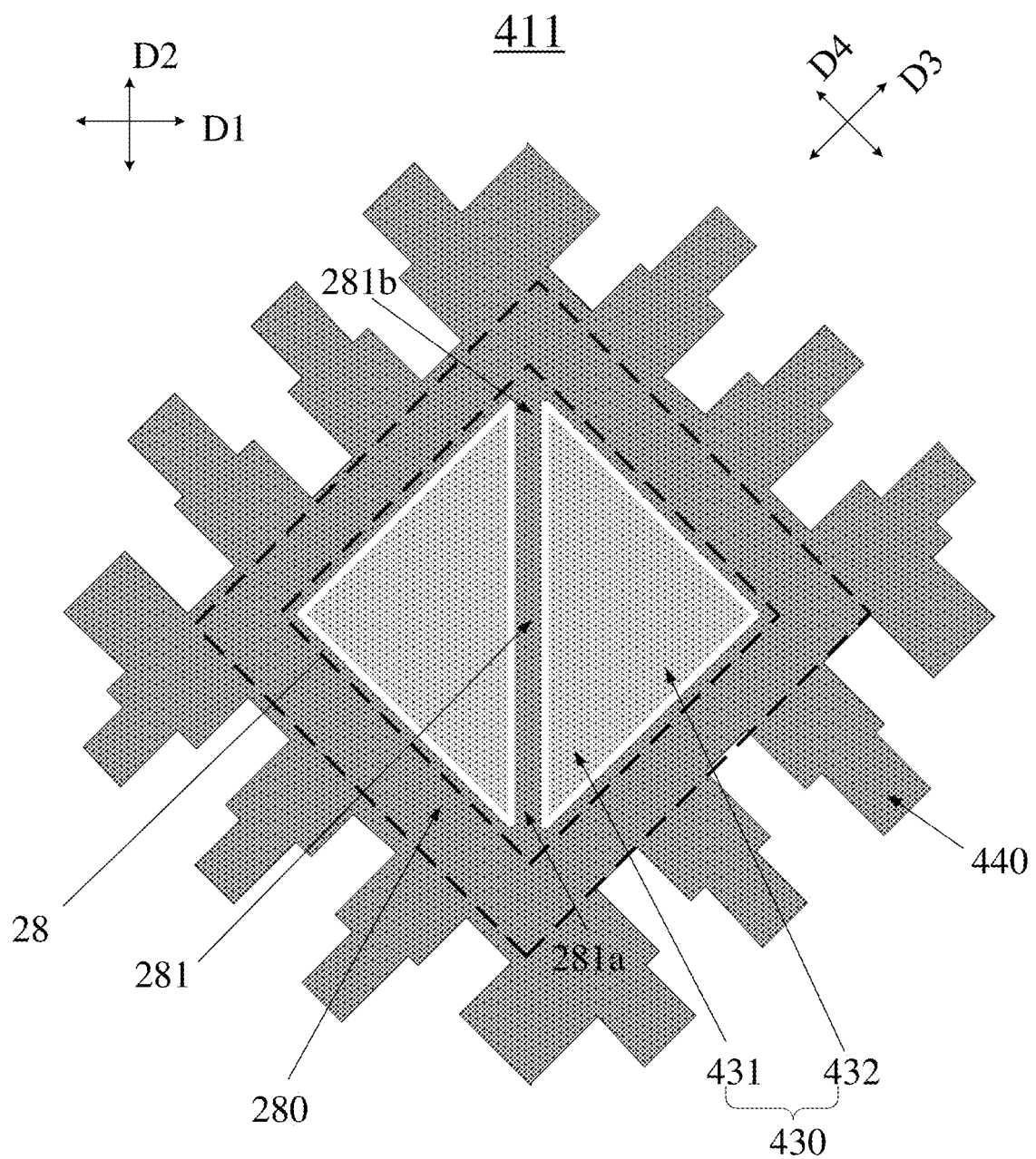
FIG. 8C is a third structural diagram of a dummy electrode embedded in a touch self-electrode provided by an embodiment of the present disclosure.

Alternatively, in some embodiments, as shown in FIG. 8C, two ends 281*a*/281*b* of the channel 281 are respectively close to two non-adjacent vertices of the first polygon. Other features of the first touch sub-electrode shown in FIG. 8C that are not mentioned are the same as those in FIG. 8A, please refer to the descriptions of FIG. 8A.

For example, as shown in FIG. 8A, the shape of the outer contour of the main body part 280 is a second polygon, and the second polygon and the first polygon are similar polygons. That is, the number of edges of the second polygon and the first polygon are the same, and the corresponding angles are basically the same, and the corresponding edges are basically proportional. In this way, the shape of the whole structure 28 constituted by the dummy electrode 430 and all the channels can be consistent with the shape of the outer contour of the main body part 280, so that the touch performance of the entire touch structure has better uniformity, and it is convenient for patterning and reduces the mask manufacturing cost.

For example, as shown in FIG. 8A, the shape of the outer contour of the whole structure 28 constituted by the dummy electrode 430 and all channels is the first polygon, such as a rectangle, and the channel 281 is parallel to two edges of the first polygon, that is, the rectangle.

For example, the strip-shaped channel 281 is in a straight strip shape as a whole, for example, it is in a strip shape extending along a straight line as a whole. In the extension direction of the straight strip, the width of the straight strip may be consistent, for example, as shown in FIG. 8I, it may be partially consistent, for example, as shown in FIG. 8G. In other embodiments, at least part of the strip-shaped channel is a curved strip-shaped channel, for example, the entire channel is a curved strip-shaped channel, or at least one channel is a curved strip-shaped channel in the following case that there are a plurality of channels. Alternatively, in some embodiments, at least some of the strip-shaped channels are in a fold-line shape, for example, the entire channel is in a fold-line shape, or in the following case that there are a plurality of channels, at least one channel is in a fold-line shape.

Figure 8D:
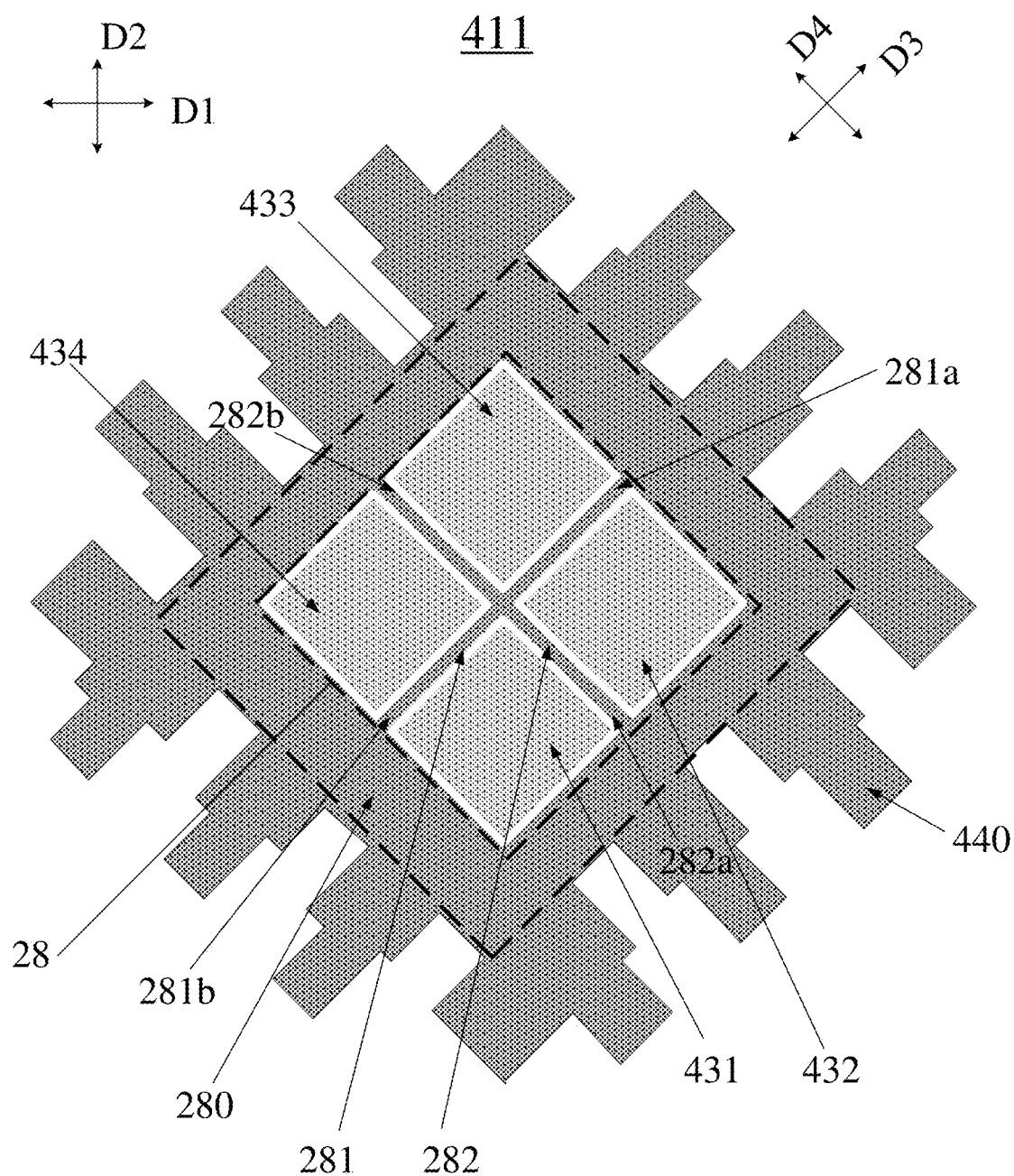
FIG. 8D is a fourth structural diagram of a dummy electrode embedded in a touch self-electrode provided by an embodiment of the present disclosure.

In some embodiments, for example, as shown in FIG. 8D, one first touch sub-electrode 411 includes a plurality of strip-shaped channels, and the plurality of strip-shaped channels includes a strip-shaped first channel 281 and a strip-shaped second channel 282. The strip-shaped first channel 281 extends substantially along the first extension direction (for example, the third direction D3); the strip-shaped second channel 282 extends substantially along the second extension direction (for example, the fourth direction D4) and intersects with the first channel 281. That is, both the extension direction of the first channel 281 and the extension direction of the second channel 282 intersect with the arrangement direction of the first touch sub-electrode 411 and the arrangement direction of the second touch sub-electrode 421. The dummy electrode 430 includes four parts spaced apart from each other by the first channel 281 and the second channel 282, which are a first part 281, a second part 282, a third part 283 and a fourth part 284, respectively. It should be noted that different parts of a channel may not be located on one straight line, and the whole channel may not be a straight line with uniform width. Compared with the case that one first touch sub-electrode 411 includes one strip-shaped channel, the case that one first touch sub-electrode 411 includes the first channel 281 and the second channel 282 that intersect each other can further increase the amount of touch signals of the region provided with the dummy electrode 430 in multiple directions, improve the touch accuracy of the region, and thus improve the touch performance of the electronic device adopting the touch structure, such as the display panel.

For example, the first channel 281 and the second channel 282 that intersect each other are in a shape of a Chinese character "+", and both the first extension direction and the second extension direction respectively has an included angle of 45 degrees with both the first direction D1 (the arrangement direction of the first touch sub-electrode 411) and the second direction D2 (the arrangement direction of the second touch sub-electrode 421), so that the region provided with the dummy electrode 430 has a relatively uniform touch accuracy. For example, the two ends 281a/281b of the first channel 281 are respectively close to two opposite edges of the first polygon (rectangle), and the two ends 282a/282b of the second channel 282 are respectively close to the other two opposite edges of the first polygon (rectangle); the sizes and shapes of the first part 281, the second part 282, the third part 283 and the fourth part 284 are the same as each other, so as to further make the region provided with the dummy electrode 430 have more uniform touch accuracy. Other features of the first touch sub-electrode shown in FIG. 8D that are not mentioned are the same as those in FIG. 8A, please refer to the descriptions of FIG. 8A.

Figure 8E:
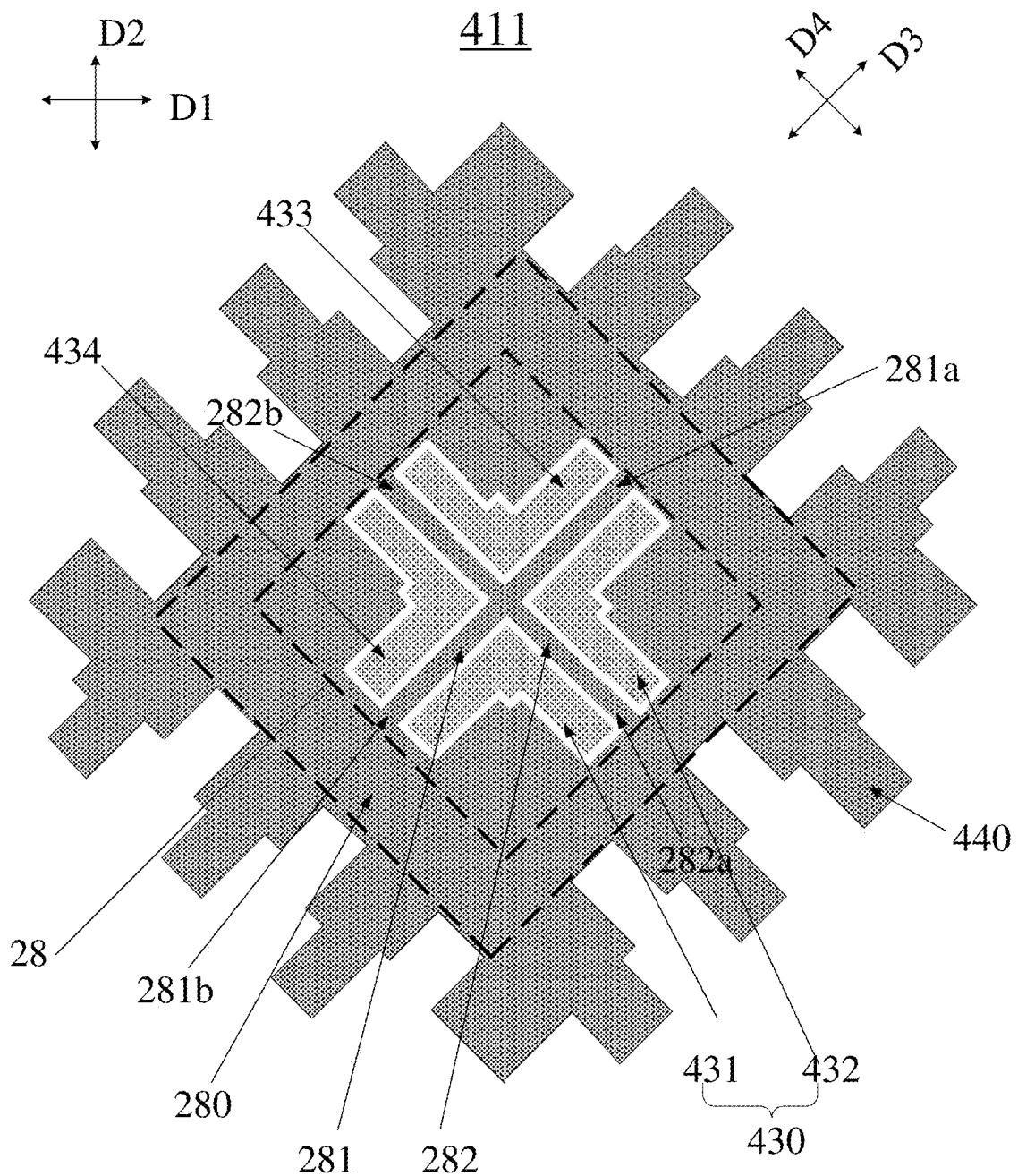
FIG. 8E is a fifth structural diagram of a dummy electrode embedded in a touch self-electrode provided by an embodiment of the present disclosure.

For example, in FIG. 8D, the shapes of the first part 281, the second part 282, the third part 283, and the fourth part 284 are all rectangles, such as squares. For example, as shown in FIG. 8E, the shape of the overall outer contour of the whole structure constituted by the dummy electrode 430 and the strip-shaped channel is irregular; all the shapes of the first part 281, the second part 282, the third part 283 and the fourth part 284 include at least two strip-shaped parts respectively extending in different directions, for example, all the shapes of the at least two strip-shaped parts are irregular.

For example, in other embodiments, at least one first touch sub-electrode 411 includes a plurality of strip-shaped channels, and the plurality of strip-shaped channels include: a plurality of strip-shaped first channels and a plurality of strip-shaped second channels, and the plurality of strip-shaped first channels extend substantially along the first extension direction and are spaced apart from each other; the plurality of strip-shaped second channels extend substantially along the second extension direction and are spaced apart from each other, and each of the plurality of strip-shaped second channels intersects each of the plurality of strip-shaped first channels. The dummy electrode includes a plurality of parts separated from each other by the plurality of strip-shaped first channels and the plurality of strip-shaped second channels.

Figure 8F:
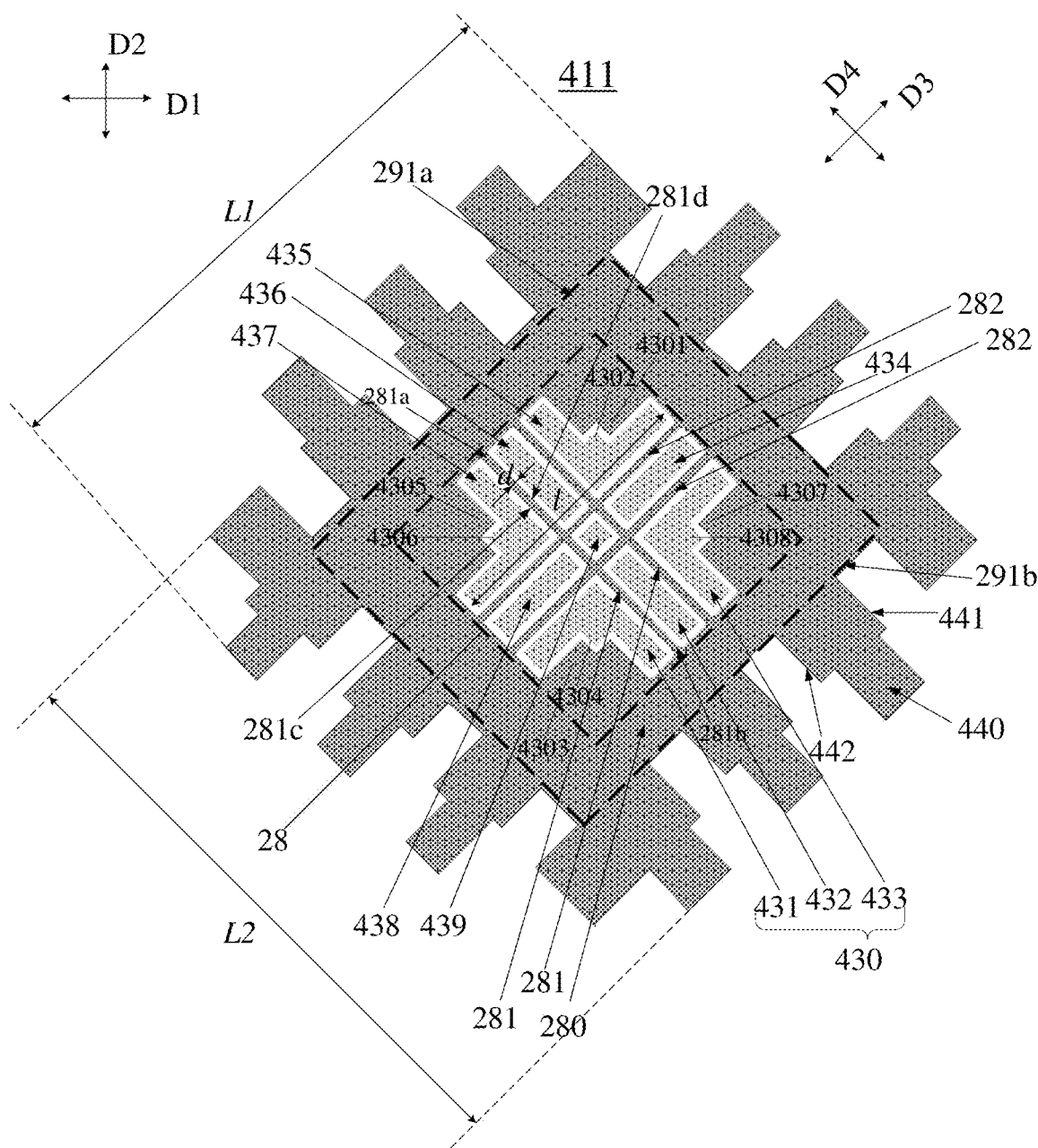
FIG. 8F is a sixth structural diagram of a dummy electrode embedded in a touch self-electrode provided by an embodiment of the present disclosure.
Figure 8G:
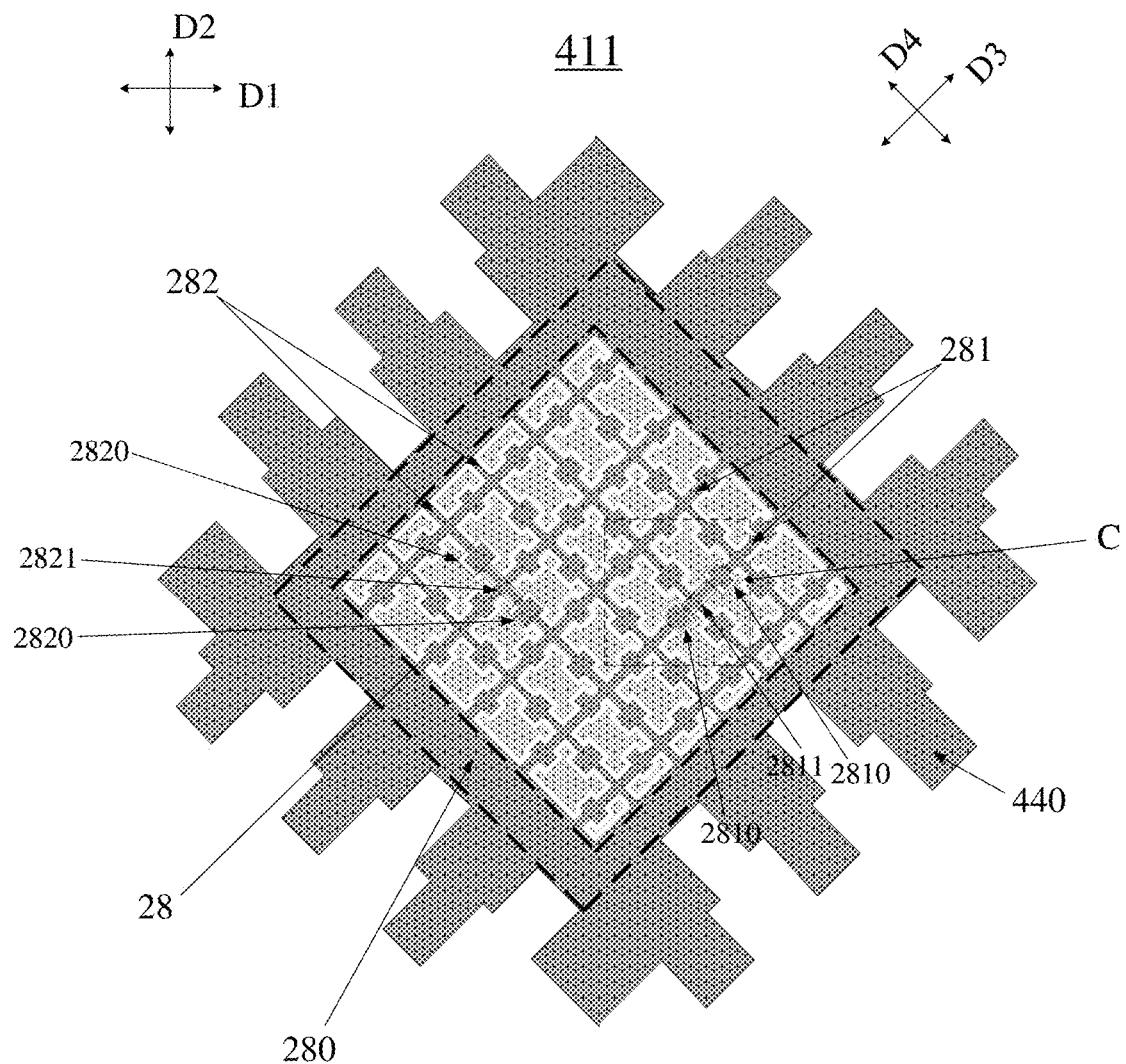
FIG. 8G is a seventh structural diagram of a dummy electrode embedded in a touch self-electrode provided by an embodiment of the present disclosure.

Exemplarily, as shown in FIG. 8F, for example, at least one first touch sub-electrode 411 includes two strip-shaped first channels 281 and two strip-shaped second channels 282, that is, the plurality of strip-shaped first channels includes two first channels 281, and the plurality of strip-shaped second channels include two second channels 282. The dummy electrode 430 includes at least nine parts separated from each other by two first channels 281 and two second channels 282, and the at least nine parts are a first part 431, a second part 432, a third part 433, a fourth part 434, a fifth part 435, a sixth part 436, a seventh part 437, an eighth part 438 and a ninth part 439, respectively.

For example, as shown in FIG. 8F, the ratio l/L1 of the maximum size of the region crossed by the entire dummy electrode 430 (including, for example, the first part to the ninth part in this embodiment) to the maximum size of the first touch sub-electrode 411 where the dummy electrode is located in the same direction is greater than or equal to 0.4 and less than or equal to 0.6. The test shows that if the value of l/L1 is too large, too much space is occupied and the effective touch area is reduced; and if the value of l/L1 is too small, the load on the touch electrode cannot be effectively reduced and the touch sensitivity cannot be effectively improved, and in the case that the value of l/L1 is greater than or equal to 0.4 and less than or equal to 0.6, the best effect of improving the touch accuracy and reducing the load on the touch electrode can be achieved. For example, the outer contour of the main body part 280 of the first touch sub-electrode 411 is rectangular. The outer contour of the main body part 280 includes a first edge 291a and a second edge 291b that intersect each other. The first edge 291a and the second edge 291b respectively extend along the third direction D3 and the fourth direction D4. The third direction D3 and the fourth direction D4 are different, for example, they are orthogonal. For example, the third direction D3 is different from the first direction D1 or the second direction D2; and the fourth direction D4 is different from the first direction D1 or the second direction D2.

For example, the third direction D3 has an angle of 45 degrees with both the first direction D1 and the second direction D2, and the fourth direction D4 has an angle of 45 degrees with both the first direction D1 and the second direction D2.

For example, the same direction in the above description "maximum size . . . in the same direction" is the third direction D3, or the same direction may also be the fourth direction D4. For example, the maximum size l in the third direction D3 of the region crossed by the entire dummy electrode 430 and the maximum size L1 in the third direction D3 of the first touch sub-electrode 411 where the dummy electrode is located are respectively equal to the maximum size in the fourth direction D4 of the region crossed by the entire dummy electrode 430 and the maximum size L2 in the fourth direction D4 of the first touch sub-electrode 411 where the dummy electrode is located. In this case, for example, the shape of the outer contour of the main body part 280 is square, so as to obtain uniform touch accuracy in the third direction D3 and the fourth direction D4, thereby improving the touch accuracy uniformity of the entire touch structure.

For example, the ratio of the minimum width d of each channel (for example, each first channel 281) to the maximum size l of the region crossed by the entire dummy electrode 430 (for example, including the first part to the ninth part in this embodiment) is greater than or equal to 0.03 and less than or equal to 0.1. For example, the width of each second channel 282 is substantially uniform, and the minimum width of the second channel 282 is substantially a fixed value. For another example, in other embodiments, for at least one second channel 282, the width of the second channel 282 is inconsistent along the extension direction of the second channel 282, and the minimum width of one second channel 282 is the minimum of its multiple different widths.

It should be noted that the direction of the width or the width direction of the channel at a certain position is perpendicular to the extension direction of the channel at this position.

For example, in some embodiments, l=1411 μm, d=78 μm, L1=L2=3308 μm. Of course, the embodiments of the present disclosure do not limit the specific values of the above sizes, which can be designed according to specific needs.

For example, for each touch sub-electrode, the effective area accounts for 52%-64% of the total area of the touch sub-electrode, that is, the area of the dummy electrode 430 accounts for 36%-48% of the total area of the touch sub-electrode. If the proportion of the area of the dummy electrode 430 is too large, the resistance of the touch electrode would be increased. If the proportion of the area of the dummy electrode 430 is too small, the touch performance of the touch structure in the weak grounding state would not be effectively improved.

For example, as shown in FIGS. 8A-8F, one first touch sub-electrode 411 further includes a plurality of interdigital structures 440 connected to the main body part 280, and the plurality of interdigital structures 440 are distributed around the main body part 280 and each interdigital structure protrudes from the main body part 280 in a direction away from the main body part 280. As shown in FIG. 8F, the extension direction of each channel is parallel to the extension direction of a part of the interdigital structures 440 in the plurality of interdigital structures 440, and the part of the interdigital structures respectively protrude from the two edges of the outer contour of the main body part 280 close to the two ends of the respective channel to facilitate patterning the first touch sub-electrode 411 and the dummy electrode 430, and the patterns of the formed touch sub-pixels and dummy electrode are regular, which is conducive to improving the uniformity of the touch performance of the entire touch structure. For example, one first channel 281 is taken as an example here, and the same is suitable for at least one second channel 282. The extension direction of one first channel 281 in FIG. 8F is parallel to the extension direction of a part of interdigital structures 440 in the plurality of interdigital structures 440, the part of interdigital structures 440 respectively protrude from two edges 291a/291b of the outer contour of the main body part 280 respectively close to the two ends 281a/281b of the first channel 281. Of course, the interdigital structures 440 may be provided on each edge of the outer contour of the main body part 280, or may be provided only on a part of the edges of the outer contour of the main body part 280. Alternatively, in other embodiments, the extension direction of at least one channel of one first touch sub-electrode 411 may not be parallel to the extension direction of the at least part of interdigital structures 440, which is not limited in the present disclosure.

For example, as shown in FIG. 8F, in the extension direction of one first channel 281, the two ends 281a/281b of the strip-shaped channel 281 at least partially overlap with the interdigital structures 440 respectively protruding from the two edges 291a/291b of the main body part 280 respectively close to the two ends 281a/281b of the first channel 281 (i.e., the two ends 281a/281b and the interdigital structures 440 respectively protruding from the two edges 291a/291b have parts directly opposite to each other), and edges 281c/281d of the first channel 281 along the extension direction of the first channel 281 are parallel to the edges 441/442 of the at least part of interdigital structures 440. The edges 281c and 281d of the first channel 281 along the extension direction of the first channel 281 are opposite to each other, and the edges 441 and 442 of the one interdigital structure 440 are opposite to each other.

In some embodiments, for example, as shown in FIG. 8F, the shape of the overall outer contour of the whole structure constituted by the dummy electrode 430, the plurality of first channels 281 and the plurality of second channels 282 is an irregular polygon, so as to avoid the overall pattern of the dummy electrode 430 being a regular pattern, avoid that the shape of the overall outer contour of the above-mentioned whole structure is the same as the shape of the display pixel unit of the display panel adopting the touch control structure, and facilitate the elimination of moire. The first end and the second end of the outer contour of the dummy electrode 430 that are opposite to each other in the second direction D2 are respectively opposite to two second connection electrodes adjacent in the second direction D2 (refer to FIG. 2), and respectively have a first groove 4301 and a second groove 4303; the first groove 4301 is recessed toward the second end of the outer contour of the dummy electrode 430, and the second groove 4303 is recessed toward the first end of the outer contour of the dummy electrode 430. The third end and the fourth end of the outer contour of the dummy electrode 430 that are opposite each other in the first direction D1 are respectively opposite to the first connection electrode (refer to FIG. 2), and respectively have a third groove 4305 and a fourth groove 4307; the third groove 4305 is recessed toward the fourth end, and the fourth groove 4307 is recessed toward the third end. For example, the outer contour of the dummy electrode 430 includes a first protrusion 4302 in the first groove 4301, a second protrusion 4304 in the second groove 4303, a third protrusion 4306 in the third groove 4305, and a fourth protrusion 4308 in the fourth groove 4307. The first protrusion 4302 protrudes in a direction away from the second end of the outer contour of the dummy electrode 430, and the second protrusion 4304 protrudes in a direction away from the first end of the outer contour of the dummy electrode 430; the third protrusion 4306 protrudes in a direction away from the fourth end, and the fourth protrusion 4308 protrudes in a direction away from the third end. The groove and protrusion design of the outer contour of the dummy electrode 430 can obtain a better technical effect of eliminating the moire.

In other embodiments, for example, as shown in FIG. 8G, at least one touch sub-electrode includes a plurality of the strip-shaped channels, and the plurality of strip-shaped channels include a plurality of strip-shaped first channels 281 and a plurality of strip-shaped second channels 282. The plurality of strip-shaped first channels 281 extend substantially along the first extension direction (for example, the third direction D3) and are spaced apart from each other. The plurality of strip-shaped second channels 282 extend substantially along the second extension direction (for example, the fourth direction D4) and are paced apart from each other, and each of the plurality of strip-shaped second channels 282 intersects each of the plurality of strip-shaped first channels 281; the dummy electrode 430 includes a plurality of parts separated from each other by the plurality of strip-shaped first channels 281 and the plurality of strip-shaped second channels 282.

Figure 8H:
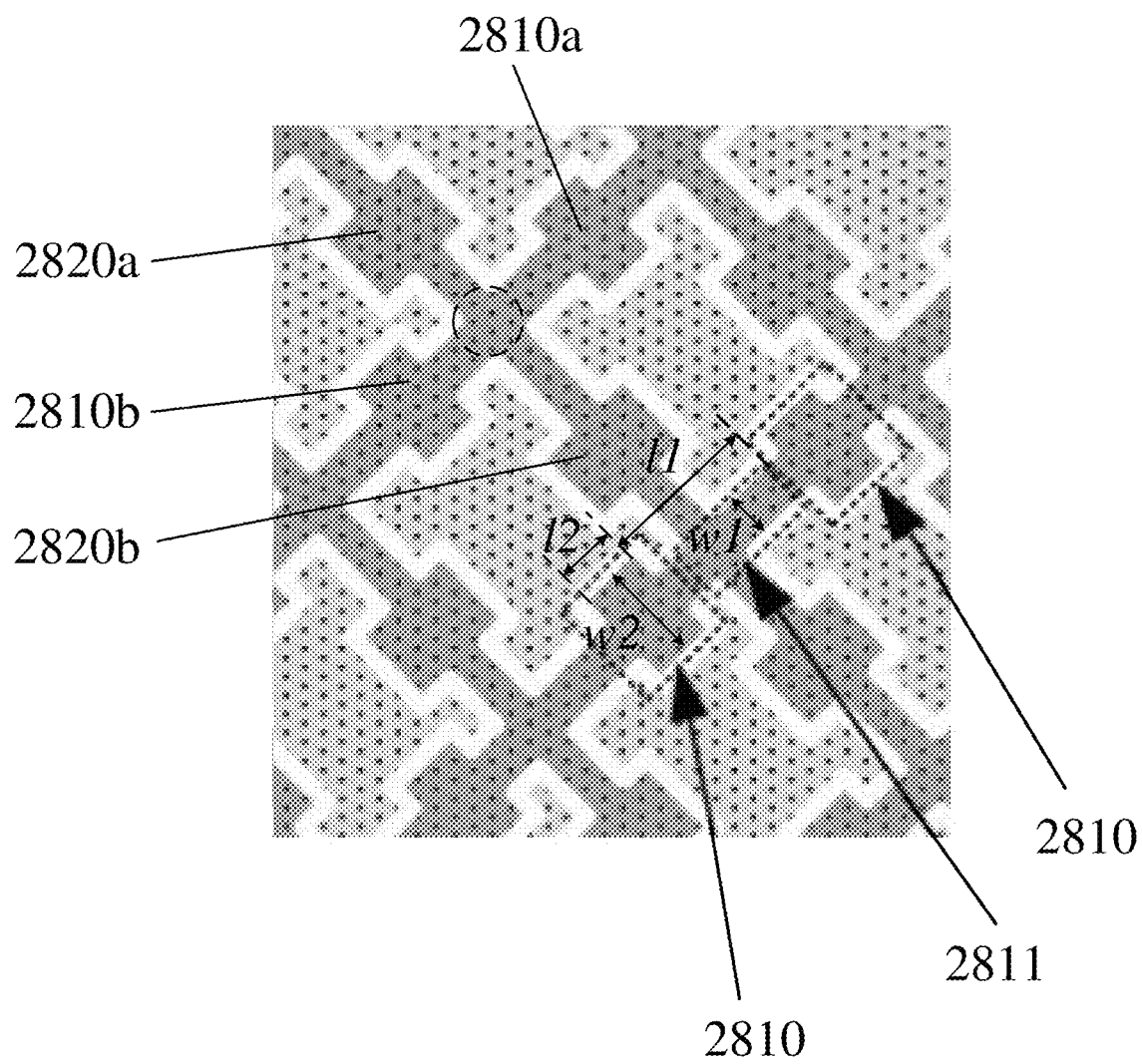
FIG. 8H is an enlarged schematic diagram of a part C in FIG. 8G.
Figure 8I:
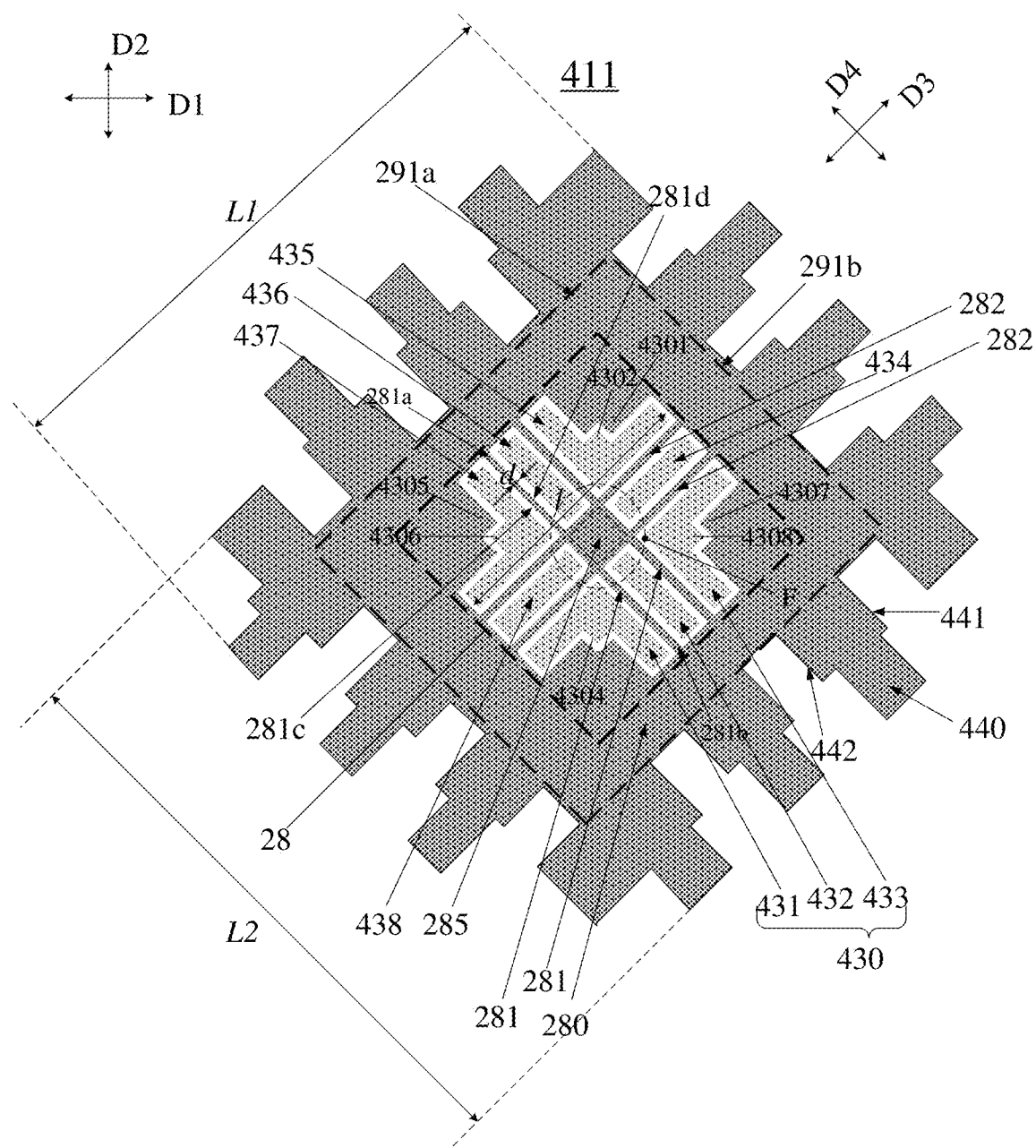
FIG. 8I is an eighth structural diagram of a dummy electrode embedded in a touch self-electrode provided by an embodiment of the present disclosure.

In combination with FIG. 8G and FIG. 8H, one first channel 281 includes a plurality of narrow parts 2811 and a plurality of wide parts 2810 alternately arranged and sequentially connected in the extension direction of the one first channel 281, and the width w1 of each narrow part 2811 in the direction perpendicular to the extension direction of the first channel 281 is less than the width w2 of each wide part 2810 in the direction perpendicular to the extension direction of the first channel 281, to avoid the possible shadow elimination problem caused by the entire dummy electrode 430 being disconnected by the continuous channel with the same width. One second channel 282 includes a plurality of narrow parts 2821 and a plurality of wide parts 2820 alternately arranged and sequentially connected in the extension direction of the one second channel 282, and the width of each narrow part 2821 in the direction perpendicular to the extension direction of the second channel 282 is less than the width of each wide part 2820 in the direction perpendicular to the extension direction of the second channel 282, to avoid the possible shadow elimination problem caused by the entire dummy electrode 430 being disconnected by the continuous channel with the same width. It should be noted that the width w1 here refers to the average width of the narrow part 2811, and the width w2 refers to the average width of the wide part 2810. Similarly, this is suitable for the narrow part of the second channel 282 and the wide part of the second channel 282.

It should be noted that the feature like "the plurality of narrow parts and the plurality of wide parts of one first channel 281 are alternately arranged" means that the plurality of narrow parts include a first narrow part, a second narrow part and a third narrow part, and the plurality of wide parts include a first wide part and a second wide part; the first wide part and the second wide part are respectively located on two sides of the first narrow part and both are adjacent to the first narrow part, the second narrow part is located on the side of the first wide part away from the first narrow part and adjacent to the first wide part, and the third narrow part is located on the side of the second wide part away from the first narrow part and adjacent to the second wide part. The same is suitable for the alternating arrangement of the plurality of narrow parts and the plurality of wide parts of the second channel 282.

For example, the narrow part 2811 of the first channel 281 intersects with the narrow part 2821 of the second channel 282. In this way, the size of the channel at the intersection of the first channel 281 and the second channel 282 cannot be too large, so as to avoid the phenomenon that the channel is too wide at the intersection and is too narrow at the narrow part, and avoid uneven touch accuracy in the entire region where the dummy electrode 430 is arranged.

For example, as shown in FIG. 8G and FIG. 8H, the narrow part 2811 of the first channel 281 and the narrow part 2821 of the second channel 282 have an intersection (that is, the position indicated by the dotted circle in FIG. 8H). The first channel 281 includes a first wide part 2810a and a second wide part 2810b respectively located on two sides of the intersection and adjacent to the intersection, the second channel 282 includes a third wide part 2820a and a fourth wide part 2820b located on two sides of the intersection and adjacent to the intersection; the distances respectively from the first wide part 2810a, the second wide part 2810b, the third wide part 2820a and the fourth wide part 2820b to the intersection are equal, so as to improve uniformity and reliability of the touch accuracy of the entire region where the dummy electrode 430 is arranged, and enable the entire touch structure to have more uniform and stable touch performance.

For example, for the first channel 281, the ratio of the length l1 of the narrow part 2811 in the extension direction of the first channel 281 to the width w/of the narrow part 2811 is greater than the ratio of the length l2 of the wide part 2810 in the extension direction of the first channel 281 to the width w2 of the wide part 2810. Similarly, for the second channel 282, the ratio of the length of the narrow part 2821 in the extension direction of the second channel 282 to the width of the narrow part 2821 is greater than the ratio of the length of the wide part 2820 in the extension direction of the second channel 282 to the width of the wide part 2820.

For example, for the first channel 281, the length of the narrow part 2811 is equal to or not equal to the length of the wide part 2810. In these two cases, the above conditions for the length-width ratio of the narrow part and the wide part of the first channel 281 can be satisfied; similarly, for example, for the second channel 282, the length of the narrow part 2821 is equal to or not equal to the length of the wide part 2820. In these two cases, the above conditions for the length-width ratio of the narrow part and the wide part of the second channel 282 can be satisfied.

For example, as shown in FIG. 8G and FIG. 8H, for the first channel 281, the plurality of wide parts 2810 are arranged at equal intervals, and the lengths of the plurality of narrow parts 2811 are equal to each other; for the second channel 282, the plurality of wide parts 2820 are arranged at equal intervals, and the lengths of the plurality of narrow parts 2821 are equal to each other.

For example, as shown in FIG. 2, the touch structure 40 provided by the embodiments of the present disclosure includes a first electrode layer and a second electrode layer. An insulation layer is arranged between the first electrode layer and the second electrode layer; the plurality of touch sub-electrodes include a plurality of first touch sub-electrodes 411 and a plurality of second touch sub-electrodes 421, and the touch structure 40 further includes a plurality of first connection electrodes 412 and a plurality of second connection electrodes (not shown in FIG. 2, the position of the plurality of second connection electrodes is the same as the position of the second connection electrodes in the previous embodiment); the plurality of first touch sub-electrodes 411 and the plurality of first connection electrodes 412 are all located in the first electrode layer and arranged along the first direction D1, the plurality of first touch sub-electrodes 411 and the plurality of first connection electrodes 412 are alternately distributed one by one and electrically connected in sequence, to form a first touch electrode 410 extending along the first direction D1; the plurality of second touch sub-electrodes 421 are located in the first electrode layer, and are arranged in sequence along the second direction D2 and spaced apart from each other, the first direction D1 intersects the second direction D2, and each of the plurality of first touch sub-electrodes 411 and each of the plurality of second touch sub-electrodes 421 are spaced apart from each other; the plurality of second connection electrodes are located in the second electrode layer and are spaced apart from each other. Each of the plurality of second connection electrodes is electrically connected with the adjacent second touch sub-electrodes through vias in the insulation layer, so as to electrically connect the adjacent second touch sub-electrodes 421 to form a second touch electrode 421 extending in the second direction D2. The dummy electrode 430 is embedded in the first touch sub-electrode 411 and/or in the second touch sub-electrode 421. For example, the dummy electrode 430 may be any one dummy electrode of the above embodiments. Moreover, it should be noted that the first touch sub-electrode 411 shown in FIGS. 8A-8G may be in the touch structure 40 provided by any one of the above embodiments.

Figure 8J:
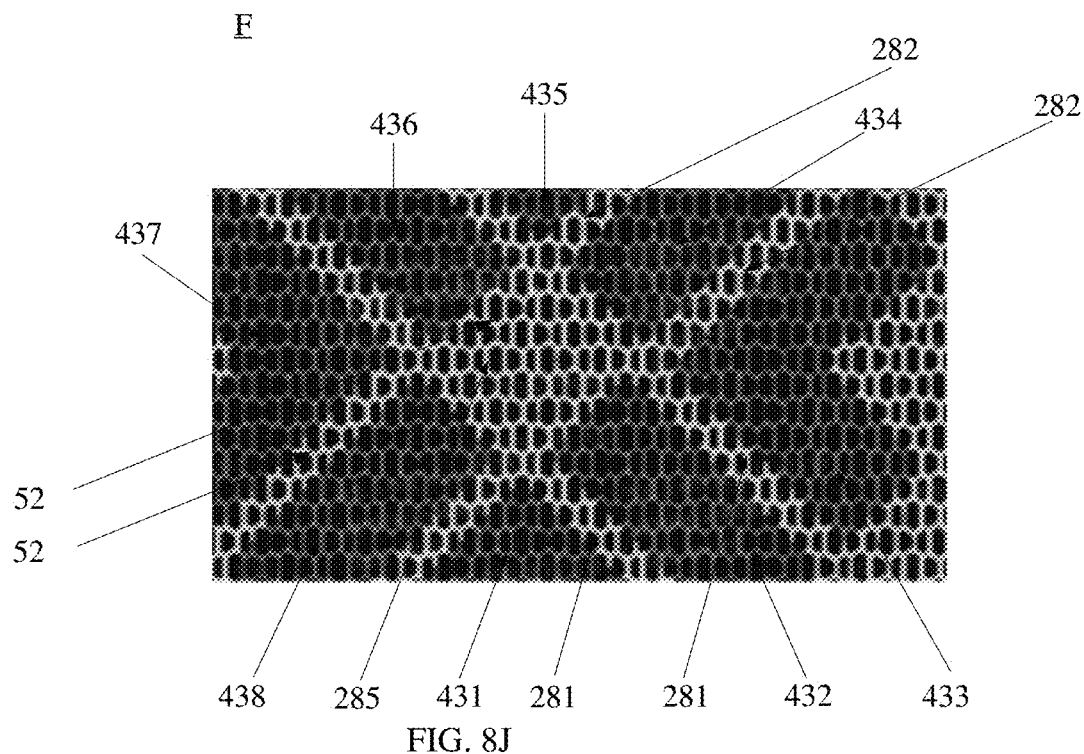
FIG. 8J is an enlarged schematic diagram of a part F in FIG. 8I.

FIG. 8I is an eighth structural diagram of a dummy electrode embedded in a touch self-electrode provided by an embodiment of the present disclosure, and FIG. 8J is an enlarged schematic diagram of a part F in FIG. 8I. The difference between the embodiment shown in FIG. 8I and the embodiment shown in FIG. 8F is that, as shown in FIG. 8I, at least one touch sub-electrode includes a communication part 285, and the plurality of strip-shaped channels 281/282 are electrically connected to each other through the communication part 285, the plurality of parts of the dummy electrode, such as the first part 431, the second part 432, the third part 433, the fourth part 434, the fifth part 435, the sixth part 436, the seventh part 437, and the eighth part 438, surround the communication part 285. In this way, compared with the case that the communication part is not provided, the communication between the plurality of channels 281/282 is better, which is conducive to improving the accuracy and reliability of touch control.

Figure 9A:
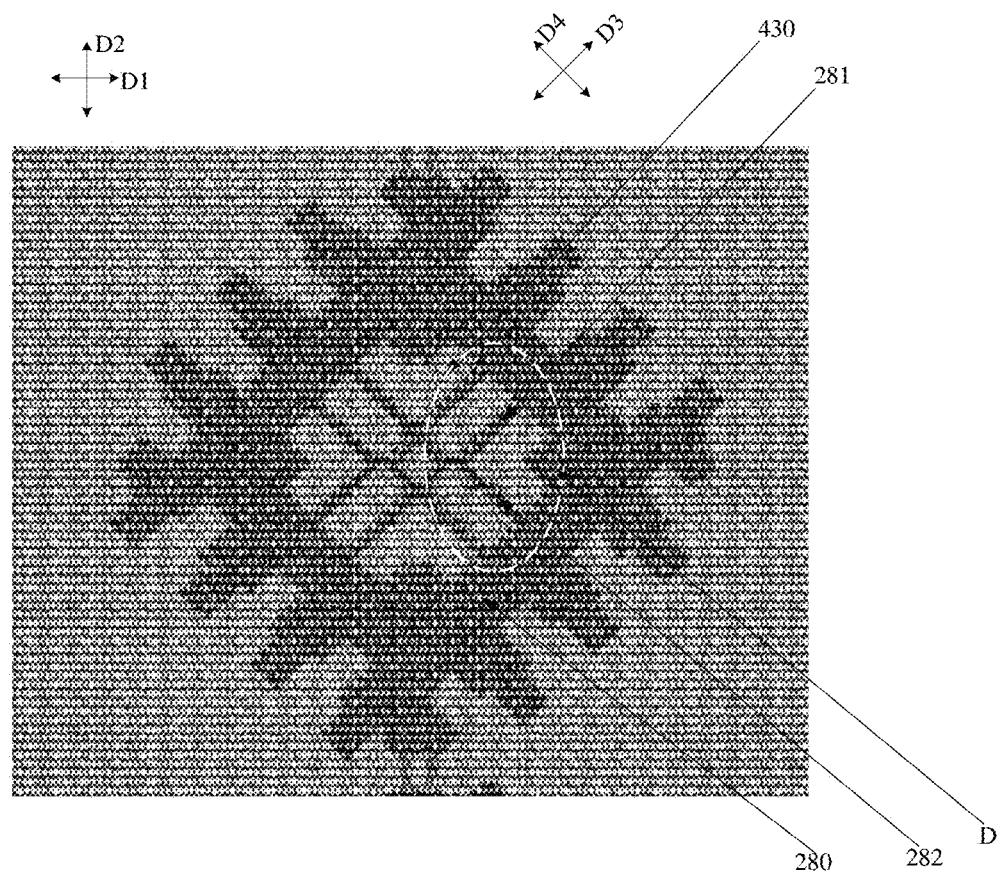
FIG. 9A is a schematic diagram of a dummy electrode and a channel located in a first grid layer.

In some embodiments, for example, as shown in FIG. 9A, the first electrode layer and the second electrode layer are respectively the above first metal grid layer and the second metal grid layer. Thus, the plurality of touch sub-electrodes and the dummy electrode 430 are located in the first metal grid layer, that is, the plurality of touch sub-electrodes and the dummy electrode are located in the same metal grid layer. Each part of the main body part 280, each channel 281/282 and the dummy electrode 430 respectively includes a plurality of first metal grids 52. For example, each of the plurality of parts of the dummy electrode 430 that are separated from each other by the channels includes a plurality of first metal grids 52 connected with each other.

For example, as shown in FIG. 8I, the communication part 285 further includes a plurality of first metal grids 52. For example, the first metal grids 52 of the plurality of strip-shaped channels 281/282 and the first metal grids 52 of the communication part 285 are connected with each other, so that the plurality of strip-shaped channels 281/282 are electrically connected with each other through the communication part 285.

Figure 9B:
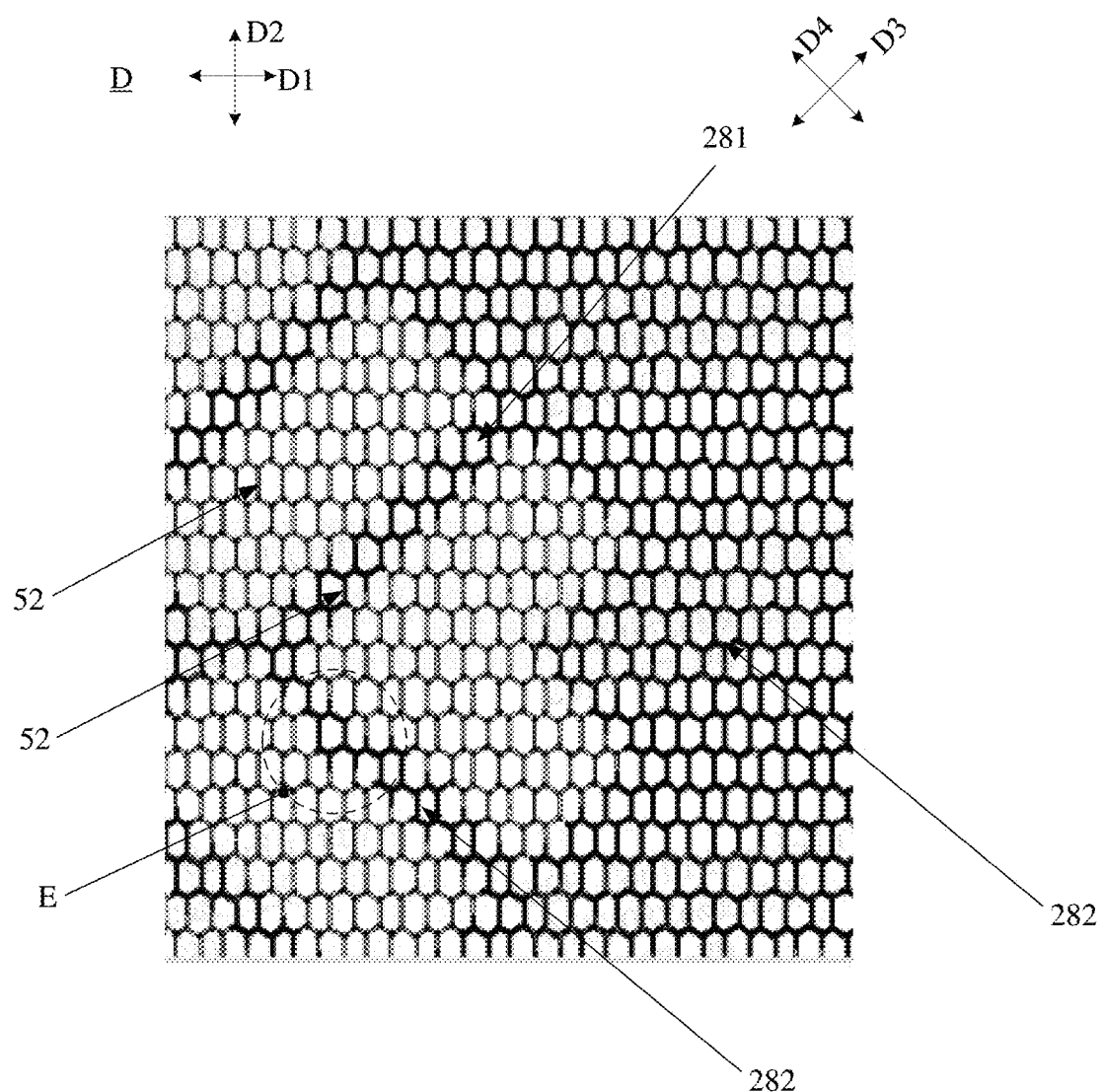
FIG. 9B is an enlarged schematic diagram of a part D in FIG. 9A.
Figure 9C:
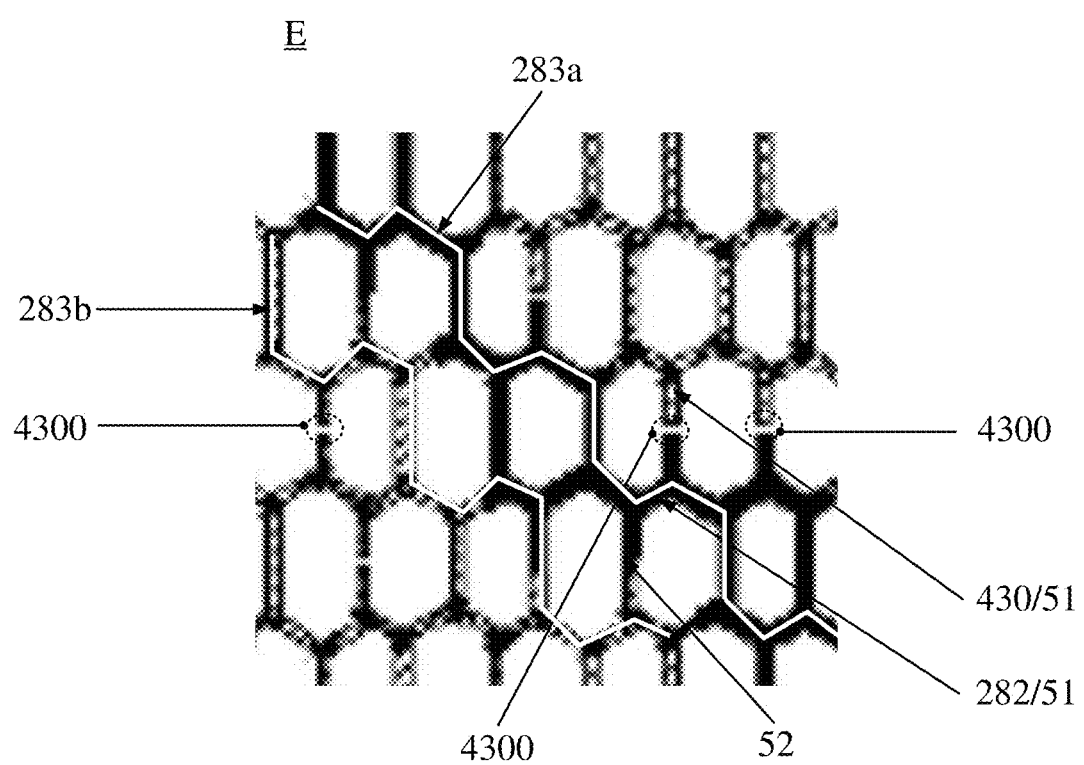
FIG. 9C is a further enlarged schematic diagram of a part E in FIG. 9B.

For example, as shown in FIG. 9A, in at least one touch sub-electrode embedded with the dummy electrode 430, each part of the dummy electrode 430 has a boundary region with the first touch sub-electrode 411. Schematically, the boundary region is a white region surrounding each part of the dummy electrode 430 in FIGS. 8A-8H. FIG. 9B is an enlarged schematic diagram of a part D in FIG. 9A, and FIG. 9C is an enlarged schematic diagram of a part E in FIG. 9B. In combination with FIG. 9B and FIG. 9C, the plurality of first metal lines 52 located in the boundary region respectively include a plurality of openings 4300. Each of the plurality of openings 4300 separates the first metal line 52 into two metal segments. One of the two metal segments belongs to the channel 282 of the first touch sub-electrode 411 (taking the second channel 282 as an example), and the other of the two metal segments belongs to the dummy electrode 430, thus, the dummy electrode 430 is insulated from the channel 282 of the first touch sub-electrode 411. FIG. 9C illustrates the enlargement of the second channel 282 as an example, the same is suitable for the first channel 281. In the boundary region between each part of the dummy electrode 430 and the main body part 280 of the first touch sub-electrode 411, each part of the dummy electrode 430 is separated from the main body part 280 through a similar plurality of openings, so as to insulate them.

For example, each space 4300 is located at the midpoint of the first metal line segment (i.e., one side of the first grid disconnected by the space 4300), so that the position of the space is more regular to reduce the patterning difficulty, which is very important to improve the product qualification rate and save the mask cost.

For example, as shown in FIG. 9C, each first channel 281 and each second channel 282 include at least two conductor lines composed of a plurality of first metal lines 51 connected with each other. For example, the two conductor lines are a first conducting line 283a and a second conducting line 283b, respectively. Both the first conducting line 283a and the second conducting line 283b pass through the dummy electrode 430 and are respectively connected with the main body part 280 of the first touch sub-electrode 411 at two ends thereof in the respective extension direction, so as to ensure that each first channel 281 and each second channel 282 can provide at least two electrical signal transmission channels, to solve the problem that the signal transmission in the first channel 281 or the second channel 282 is affected when a single signal transmission channel is disconnected, and ensure the reliability of signal transmission.

For example, as shown in FIG. 9B and FIG. 9C, each first channel 281 and each second channel 282 include at least one first metal grid 52 arranged in their width direction, the width direction of the first channel 281 is perpendicular to the extension direction of the first channel 281, and the width direction of the second channel 282 is perpendicular to the extension direction of the second channel 282.

For example, each channel 281/282 includes a plurality of series connected metal grids arranged along the respective extension direction of the each channel 281/282; alternatively, each channel 281/282 includes a plurality of metal grids arranged along the respective extension direction of the each channel 281/282 and a metal connection line connecting at least two adjacent metal grids.

Figure 9D:
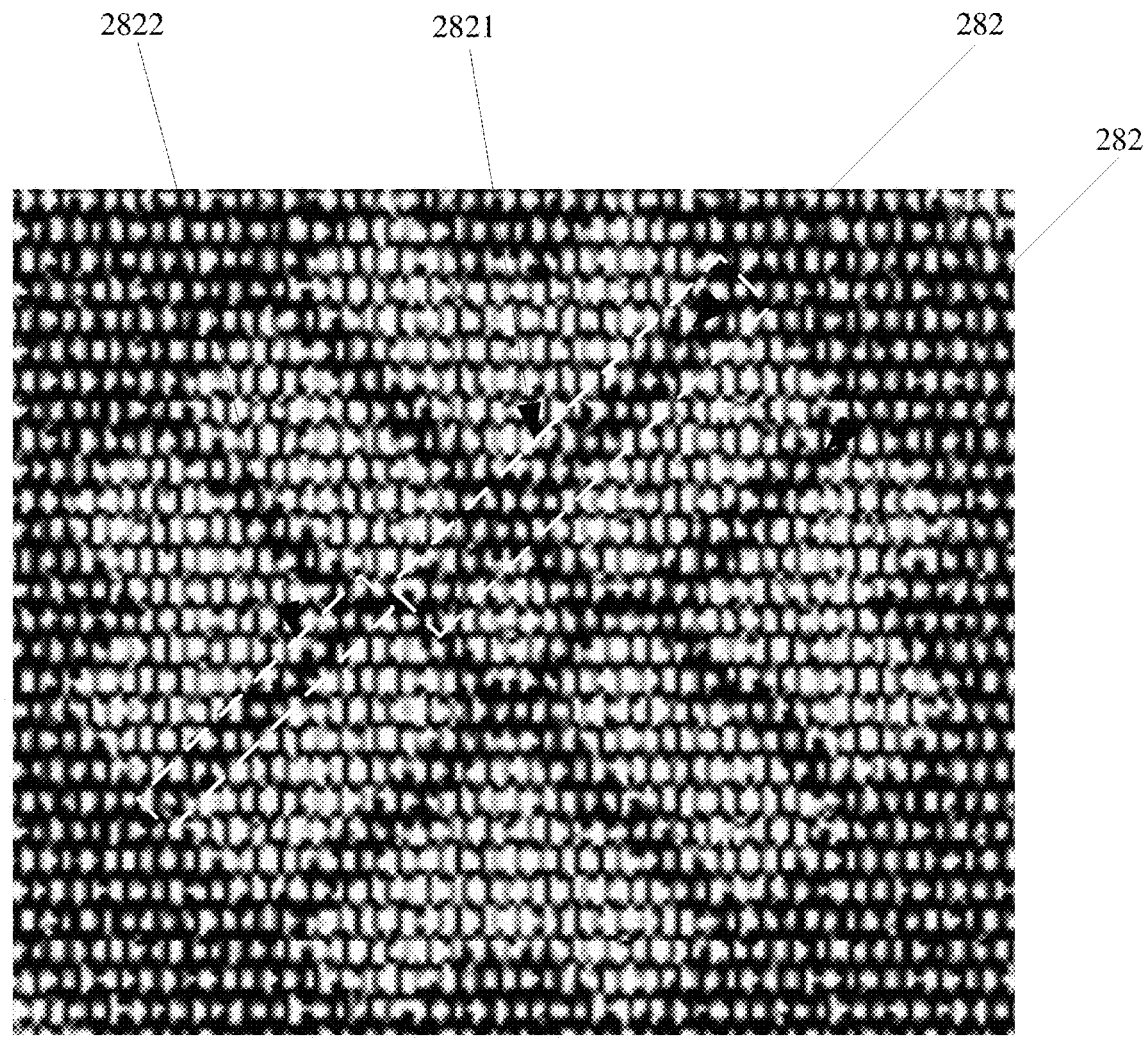
FIG. 9D is an enlarged schematic diagram of a part including a dummy electrode in FIG. 9A.

FIG. 9D is an enlarged schematic diagram of a part including a dummy electrode in FIG. 9A. As shown in FIG. 9D, for example, at least one strip-shaped channel 282 includes a first segment 2821 and a second segment 2822 arranged along the extension direction of the at least one strip-shaped channel 282. The first segment 2821 and the second segment 2822 are substantially parallel to each other, that is, the first segment 2821 and the second segment 2822 are not on the same straight line, and the first segment 2821 and the second segment 2822 are electrically connected through the above-mentioned first metal connection line 51.

The embodiments of the disclosure further provide a touch panel, which includes any of the above touch structures.

Figure 10:
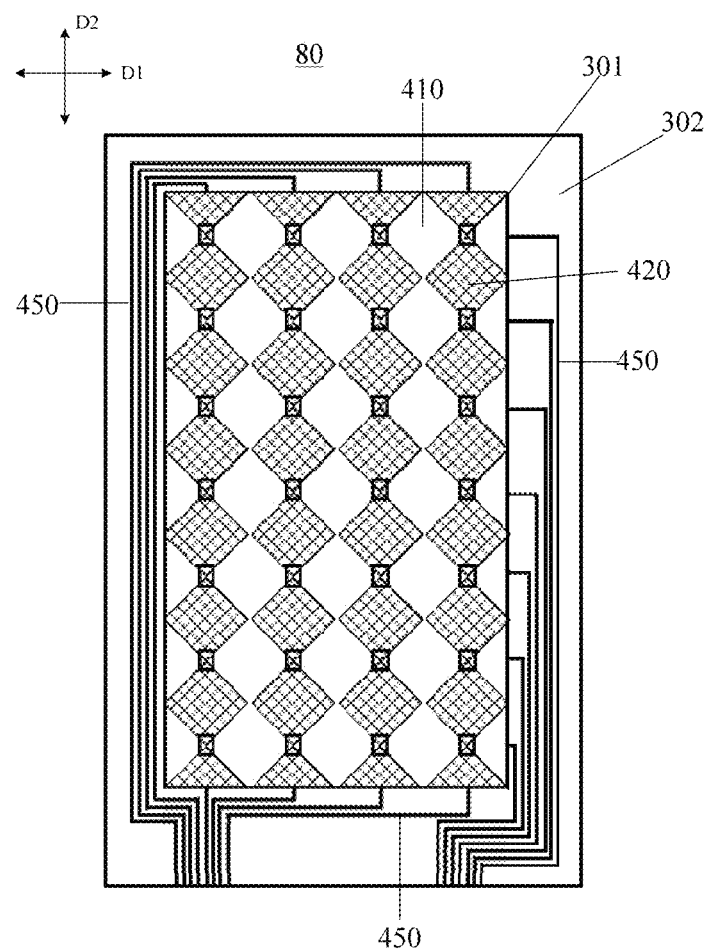
FIG. 10 is a schematic diagram of a touch display panel provided by at least one embodiment of the present disclosure.

FIG. 10 is a schematic diagram of a touch panel provided by at least one embodiment of the present disclosure. As shown in FIG. 10, the touch panel 80 includes a touch region 301 and a non-touch region 302 outside the touch region 301, and the touch structure 40 is located in the touch region 301. For example, the first touch electrode 410 extends along the width direction of the rectangle, and the second touch electrode 420 extends along the length direction of the rectangle. For clarity, the structures of the first touch electrode and the second touch electrode are not shown in detail in the figure. In other embodiments, the first touch electrode 410 may extend along the length direction of the rectangle, and the second touch electrode 420 may extend along the width direction of the rectangle.

For example, as shown in FIG. 10, the touch panel 80 further includes a plurality of signal lines 450 located in the non-touch region 302. Each first touch electrode 410 and each second touch electrode 420 are electrically connected to a signal line 450, respectively, and connected to a touch controller or a touch integrated circuit (not shown in the figure) through the signal line. For example, the first touch electrode 410 is a touch driving electrode and the second touch electrode 420 is a touch sensing electrode. However, the embodiments of the present disclosure are not limited in this aspect.

The touch integrated circuit is, for example, a touch chip, which is used to provide a touch driving signal to the second touch electrode 420 in the touch panel 80, receive a touch sensing signal from the first touch electrode 410 and process the touch sensing signal, for example, provide the processed data/signal to the system controller to realize the touch sensing function.

For example, as shown in FIG. 10, ends of the plurality of signal lines 450 connected with the touch integrated circuit may be arranged on the same side of the touch region 301 (for example, the lower side in FIG. 10), which can facilitate the connection with the touch integrated circuit.

For example, as shown in FIG. 10, because the second touch electrode 420 is longer than the first touch electrode 410 and has a larger load, in order to improve the signal transmission speed, one signal line 450 can be provided at each of the two ends of one first touch electrode 410. During operation, the touch integrated circuit simultaneously inputs a touch drive signal from two directions to one second touch electrode 420 through two signal lines 450 (bilateral drive), so that the speed of signal loading on the second touch electrode 420 is increased, and the detection speed can be improved.

For example, the material of the first metal grid layer 50 or the second metal grid layer 60 includes metal materials such as aluminum, molybdenum, copper and silver, or alloy materials of these metal materials, such as silver palladium copper alloy (APC) materials.

For example, the width (size along the length direction of the metal line) of each space is 5.2 microns.

For example, the material of the insulation layer 70 may be an inorganic insulation material, for example, the inorganic insulation material may be a transparent material. For example, the inorganic insulation material is an oxide of silicon, a nitride of silicon or a nitrogen oxide of silicon, such as silicon oxide, silicon nitride or silicon oxynitride, or an insulation material such as aluminum oxide and titanium nitride including a metal nitrogen oxide.

For example, the material of the insulation layer 70 may be an organic insulation material to obtain good bending resistance. For example, the organic insulation material is a transparent material. For example, the organic insulation material is OCA optical adhesive. For example, the organic insulation material may include polyimide (PI), acrylate, epoxy resin, polymethylmethacrylate (PMMA), etc.

Figure 11A:
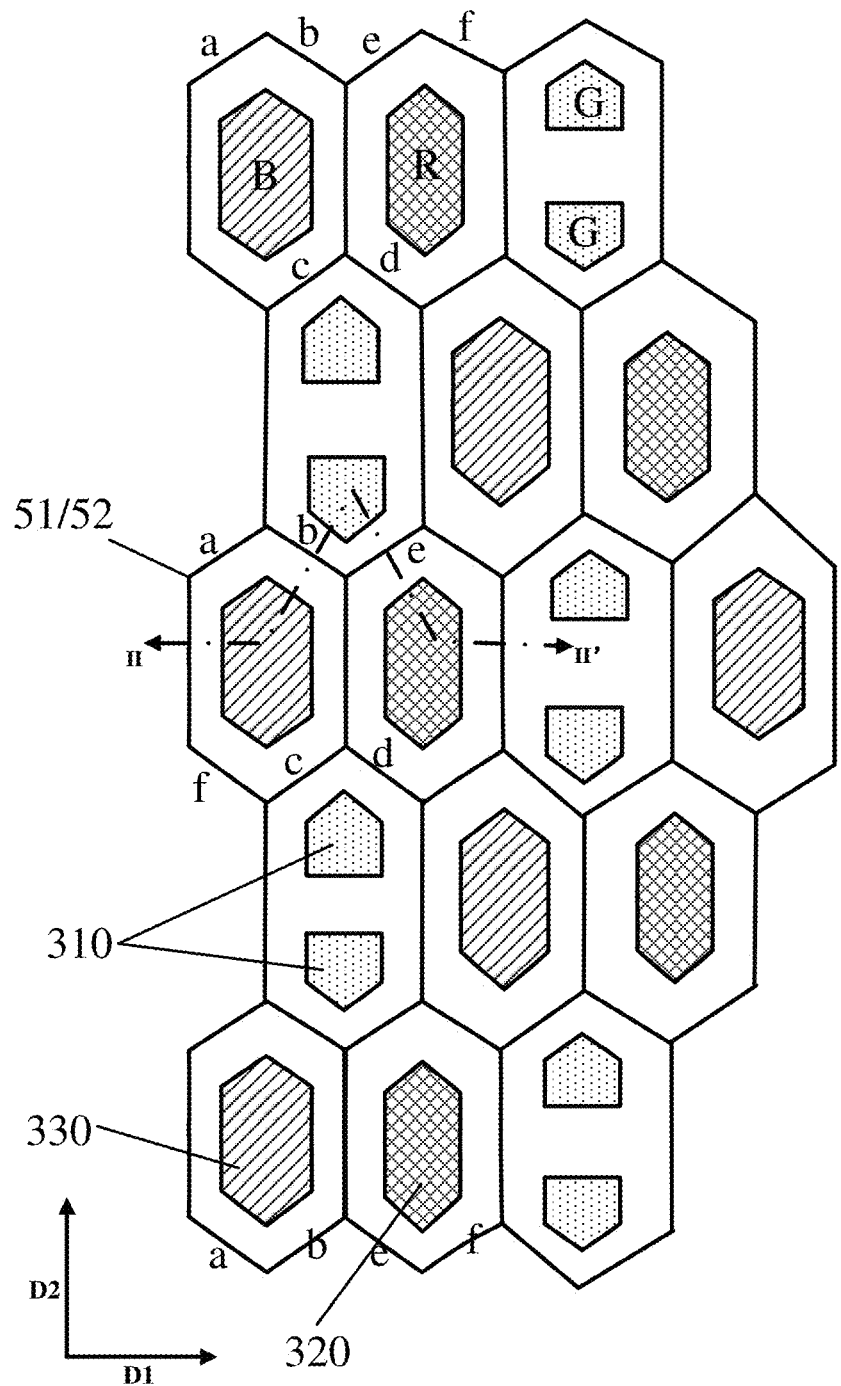
FIG. 11A is a schematic planar diagram of a touch display panel provided by at least one embodiment of the present disclosure.
Figure 11B:
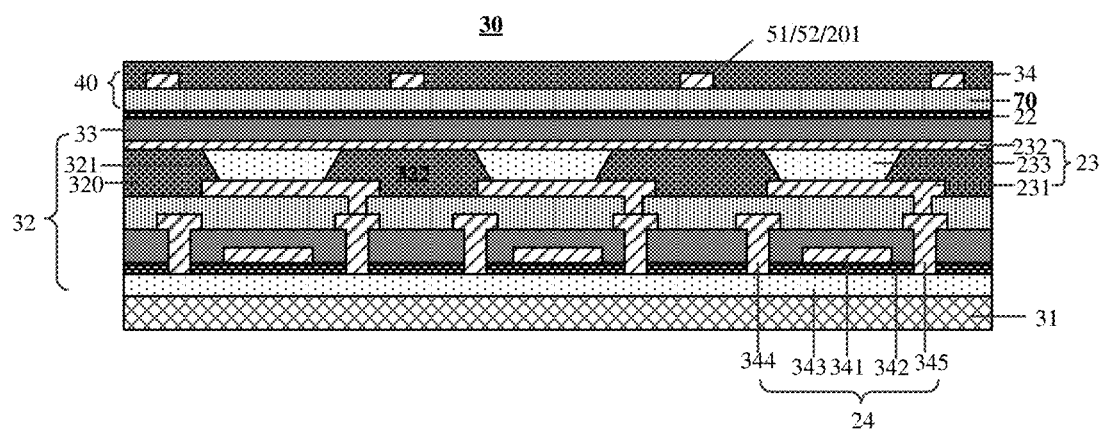
FIG. 11B is a cross-sectional diagram taken along a section line in FIG. 11A.

FIG. 11A is a schematic planar diagram of a touch display panel 30 provided by at least one embodiment of the present disclosure; and FIG. 11B is a cross-sectional diagram taken along a section line in FIG. 11A.

Referring to FIG. 11A and FIG. 11B, the touch display panel 30 includes a base substrate 31, a display structure 32 and the touch structure 40 that are sequentially stacked on the base substrate 31. The touch structure 40 is located on the side of the display structure 32 away from the base substrate 31 and closer to the user during use.

For example, in this embodiment, as an example, the display panel is an OLED display panel. Of course, in other embodiments, the display panel may be a liquid crystal display panel, such as an on-cell or in-cell touch display panel. The embodiments of the present disclosure do not limit the specific type of the display panel adopting the touch structure provided by the embodiments of the present disclosure.

For example, the display structure 32 includes a plurality of sub-pixels arranged in an array, for example, the pixel array is arranged along the first direction D1 and the second direction D2. For example, the touch display panel is an OLED display panel, and the plurality of sub-pixels include a green sub-pixel (G), a red sub-pixel (R), and a blue sub-pixel (B). Each sub-pixel includes a light-emitting element 23 and a pixel driving circuit that drives the light-emitting element 23 to emit light. The embodiments of the present disclosure do not limit the type and specific composition of the pixel driving circuit. For example, the pixel driving circuit may be a current driving type or a voltage driving type, may be a 2T1C (i.e., two transistors and a capacitor, the two transistors include a driving transistor and a data writing transistor) driving circuit, and may further include a compensation circuit (compensation transistor), a light-emitting control circuit (light-emitting control transistor), a reset circuit (reset transistor), and the like on the basis of the 2T1C driving circuit.

For clarity, FIG. 11B shows only the first transistor 24 in the pixel driving circuit that is directly electrically connected to the light-emitting element 23. The first transistor 24 may be a driving transistor configured to operate in a saturated state and control the magnitude of the current that drives the light-emitting element 23 to emit light. For another example, the first transistor 24 may be a light-emitting control transistor for controlling whether a current driving the light-emitting element 23 to emit light flows. The embodiments of the present disclosure do not limit the specific type of the first transistor.

For example, the light-emitting element 23 is an organic light-emitting diode, which includes a first electrode 231, a light-emitting layer 233, and a second electrode 232. One of the first electrode 231 and the second electrode 232 is an anode and the other is a cathode. For example, the first electrode 231 is an anode and the second electrode 232 is a cathode. For example, the light-emitting layer 233 is an organic light-emitting layer or a quantum dot light-emitting layer. For example, the light-emitting element 23 may include, in addition to the light-emitting layer 233, an auxiliary function layer such as a hole injection layer, a hole transport layer, an electron injection layer, and an electron transport layer. For example, the light-emitting element 23 is a top emitting structure, the first electrode 231 is reflective and the second electrode 232 is transmissive or semi-transmissive. For example, the first electrode 231 adopts a high work function material to act as an anode, for example, an ITO/Ag/ITO stacked structure; the second electrode 232 adopts a low work function material to act as a cathode, such as a semi-transmissive metal or metal alloy material, such as an Ag/Mg alloy material.

The first transistor 24 includes a gate electrode 341, a gate insulation layer 342, an active layer 343, a first electrode 344 and a second electrode 345, the second electrode 345 is electrically connected to the first electrode 231 of the light-emitting element 23. The embodiments of the present disclosure do not limit the type, material and structure of the first transistor 24, for example, it may be a top gate type, a bottom gate type, etc., the active layer 343 of the first transistor 24 may be amorphous silicon, polycrystalline silicon (low-temperature polycrystalline silicon and high-temperature polycrystalline silicon), oxide semiconductor (for example, indium gallium tin oxide (IGZO)), etc., and the first transistor 24 may be in N-type or P-type.

The transistors adopted in the embodiments of the present disclosure may be thin film transistors, field effect transistors or other switching devices with the same characteristics. The embodiments of the present disclosure are illustrated by taking the thin film transistor as an example. The source electrode and drain electrode of the transistor used here may be symmetrical in structure, so there is no difference in structure between the source electrode and the drain electrode. In the embodiments of the present disclosure, in order to distinguish the two electrodes of the transistor other than the gate electrode, it is directly described that one electrode is the first electrode and the other is the second electrode.

As shown in FIG. 11A and FIG. 11B, the display structure 32 further includes a pixel definition layer 320, the pixel definition layer 320 is arranged on the first electrode 231 of the light-emitting element 23, in which a plurality of openings 321 are formed and the first electrodes 231 of the plurality of sub-pixels are exposed respectively, thereby defining the pixel opening region of each sub-pixel, and the light-emitting layer of the sub-pixel is formed in the pixel opening region, the second electrode 232 is formed as a common electrode (that is, shared by a plurality of sub-pixels). FIG. 11A illustrates a pixel opening region 310 of a green sub-pixel, a pixel opening region 320 of a red sub-pixel, and a pixel opening region 330 of a blue sub-pixel.

FIG. 11B does not show the patterns in the second touch electrode layer 402. For example, the second touch electrode layer 402 is located on the side of the first touch electrode layer 401 close to the base substrate 31.

The orthographic projections of the plurality of first metal lines 51 in the first touch electrode layer 401 and the plurality of second metal lines 61 in the second touch electrode layer 402 on the base substrate 31 are located outside the orthographic projections of the pixel opening regions of the plurality of sub-pixels on the base substrate 31, that is, located inside the orthographic projections of the pixel separation regions between the pixel opening regions on the base substrate 31, the pixel separation regions are the non-opening regions 322 of the pixel definition layer 320. The pixel separation region is used to separate the pixel opening regions of the plurality of sub-pixels and separate the light-emitting layer of each sub-pixel to prevent color mixing.

For example, the grids of the first metal grid 52 or the second metal grid 62 covers at least one pixel opening region. For example, the grid openings of the first metal grid 52 or the second metal grid 62 covers the pixel opening regions 310 of the two green sub-pixels, which are arranged in pairs and arranged side by side in the second direction D2.

As shown in FIG. 11B, the display structure 32 further includes an encapsulation layer 33 between the light-emitting element 23 and the touch structure 20. The encapsulation layer 33 is configured to seal the light-emitting element 23 to prevent external moisture and oxygen from penetrating the light-emitting element and the driving circuit, resulting in damage to devices such as the light-emitting element 23. For example, the encapsulation layer 33 may be a single-layer structure or a multi-layer structure, for example, the encapsulation layer 33 includes an organic film, an inorganic film, or a multi-layer structure including an organic film and an inorganic film alternately stacked.

For example, as shown in FIG. 11B, the touch display panel 30 further includes a buffer layer 22 between the display structure 32 and the touch structure 20. For example, the buffer layer 22 is formed on the encapsulation layer 33 to improve the adhesion between the touch structure 40 and the display structure 32. For example, the buffer layer 22 is an inorganic insulation layer. For example, the material of the buffer layer 22 may be silicon nitride, silicon oxide or nitrogen oxide of silicon. For example, the buffer layer 22 may include a structure in which a silicon oxide layer and a silicon nitride layer are alternately stacked.

For example, lengths of different edges of the first metal grid 52 of the first touch electrode layer 401 are different, and similarly, lengths of edges of different second metal grids 62 of the second touch electrode layer 402 are different. For example, the sum of the lengths of the second metal lines of the second metal grid 62 overlapping with the first metal lines 51 is the smallest. For example, the edges of the marked edges a, b, c, d, e, and f in FIG. 11A represent the first metal lines 51 overlapped with the second metal line. When the number of the first metal lines 51 overlapped with the second metal line is equal, the sum of the lengths of these first metal lines 51 overlapped with the second metal line in the embodiments of the present disclosure is the smallest.

At least one embodiment of the present disclosure further provides an electronic device, the electronic device includes the touch display panel 30. For example, the electronic device is a display device, such as an OLED display device or a liquid crystal display device.

For example, the electronic device can be any product or component with a display function and a touch control function, such as a display, an OLED panel, an OLED TV, an electronic paper, a mobile phone, a tablet computer, a notebook computer, a digital photo frame, a navigator, etc.

What have been described above are only specific implementations of the present disclosure, the protection scope of the present disclosure is not limited thereto. The protection scope of the present disclosure should be based on the protection scope of the claims.

What is claimed is:

1. A touch structure, comprising a first metal grid layer and a second metal grid layer, wherein an insulation layer is between the first metal grid layer and the second metal grid layer, the first metal grid layer comprises a plurality of first metal grids defined by a plurality of first metal lines, and the second metal grid layer comprises a plurality of second metal grids defined by a plurality of second metal lines, shapes of each of the plurality of first metal grids and each of the second metal grids are both polygons;

the first metal grid layer comprises a plurality of first touch sub-electrodes and a plurality of first connection electrodes arranged along a first direction, the plurality of first touch sub-electrodes and the plurality of first connection electrodes are alternately distributed one by one and are electrically connected in sequence to constitute a first touch electrode extending along the first direction; the first metal grid layer further comprises a plurality of second touch sub-electrodes arranged in sequence along the second direction and spaced apart from each other, and the first direction intersects the second direction; each of the plurality of first touch sub-electrodes and each of the second touch sub-electrodes are spaced apart from each other, and respectively comprise a plurality of the first metal grids;

the second metal grid layer comprises a plurality of second connection electrodes spaced apart from each other, each of the plurality of second connection electrodes is electrically connected with adjacent second touch sub-electrodes through a plurality of vias in the insulation layer, so as to electrically connect the adjacent second touch sub electrodes to form a second touch electrode extending in the second direction;

each of the plurality of second connection electrodes comprises:

a first metal grid row, comprising a plurality of the second metal grids arranged along the first direction;

a second metal grid row, adjacent to and connected with the first metal grid row, arranged in the second direction with the first metal grid row, and comprising at least one second metal grid among the plurality of second metal grids arranged along the first direction, wherein a count of the at least one second metal grid in the second metal grid row is less than or equal to a count of the second metal grids in the first metal grid row, and all the second metal lines of the at least one second metal grid in the second metal grid row close to the first metal grid row are sharing second metal lines shared with the second metal grid in the first metal grid row; and the count of the second metal grids in the first metal grid row is 2, and the count of the at least one second metal grid in the second metal grid row is 1.

2. The touch structure according to claim 1, wherein the first metal grid row is electrically connected with the second touch sub-electrode adjacent to the first metal grid row, and orthographic projections of the sharing second metal lines shared with the second metal grid in the first metal grid row on the first metal grid layer overlap with the first metal lines.

3. The touch structure according to claim 1, wherein the plurality of vias comprise a first via, and the first metal grid row is electrically connected with one of two second touch sub-electrodes adjacent to the second connection electrode in which the first metal grid row is located through the first via.

4. The touch structure according to claim 3, wherein orthographic projections of a plurality of second metal lines of the second metal grids of the first metal grid row on the first metal grid layer respectively overlap with a plurality of first metal lines of the first metal grids of the second touch sub-electrode, so that the second metal grids of the first metal grid row has a plurality of vertices overlapped with the first metal grids of the second touch sub-electrode, and the plurality of vertices comprise a plurality of connection vertices, the first via is correspondingly arranged at the plurality of connection vertices.

5. The touch structure according to claim 4, wherein the shapes of each of the plurality of first metal grids and each of the second metal grids are both hexagons;

the plurality of second metal lines of the second metal grids of the first metal grid row respectively overlap with four first metal lines of an edge first metal grid of a second touch sub-electrode adjacent to the first metal grid row in a direction perpendicular to the second metal grid layer, so that the edge first metal grid has five vertices overlapped with the second metal grids of the first metal grid row, and the edge first metal grid is the first metal grid at an edge of the second touch sub-electrode adjacent to the first metal grid row;

the four first metal lines sequentially connect the five vertices to be in a W shape, the four first metal lines respectively intersect both the first direction and the second direction, and at least one of the five vertices is the connection vertex.

6. The touch structure according to claim 5, wherein the plurality of the second metal grids of the first metal grid row are first edge second metal grids at a first edge of the second connection electrode, and are located at a first end of the second connection electrode in the second direction, and are electrically connected with the edge first metal grid of the second touch sub-electrode adjacent to the first metal grid row.

7. The touch structure according to claim 3, wherein each of the plurality of second connection electrodes further comprises:

a third metal grid row, on a side of the second metal grid row away from the first metal grid row, and comprising a plurality of the second metal grids arranged along the first direction; and a fourth metal grid row, on a side of the third metal grid row close to the second metal grid row, adjacent to and connected with the third metal grid row, and comprising at least one second metal grid among the plurality of second metal grids arranged along the first direction, wherein a count of the at least one second metal grid in the fourth metal grid row is less than or equal to a count of the second metal grids in the third metal grid row, and all the second metal lines of the at least one second metal grid in the fourth metal grid row close to the third metal grid row are sharing second metal lines shared with the second metal grid in the third metal grid row, the second metal grid of the third metal grid row is a second edge second metal grid of the second connection electrode at a second edge of the second connection electrode, is located at a second end of the second connection electrode in the second direction, and is electrically connected with the edge first metal grid of the second touch sub-electrode adjacent to the third metal grid row, and the second end is opposite to the first end in the second direction;

the plurality of vias comprise a second via, and the third metal grid row is electrically connected with other one of the two second touch sub-electrodes adjacent to the second connection electrode in which the third metal grid row is located through the second via.

8. The touch structure according to claim 7, wherein orthographic projections of the sharing second metal lines shared with the second metal grid in the third metal grid row on the first metal grid layer do not overlap with the first metal lines, or the orthographic projections of the sharing second metal lines shared with the second metal grid in the third metal grid row on the first metal grid layer overlap with the first metal lines.

9. The touch structure according to claim 7, wherein the count of the second metal grids in the third metal grid row is 2, and the count of the at least one second metal grid in the fourth metal grid row is 1.

10. The touch structure according to claim 7, wherein the second connection electrode further comprises at least one intermediate metal grid row between the second metal grid row and the fourth metal grid row, each row of the at least one intermediate metal grid row comprises at least one second metal grid among the plurality of second metal grids.

11. The touch structure according to claim 10, wherein a count of the at least one second metal grid in each row of the at least one intermediate metal grid row is 1.

12. The touch structure according to claim 3, wherein each of the plurality of second connection electrodes further comprises:

a third metal grid row, on a side of the second metal grid row away from the first metal grid row, adjacent to the second metal grid row, and comprising a plurality of the second metal grids arranged along the first direction, wherein the count of the at least one second metal grid in the second metal grid row is less than or equal to a count of the second metal grids in the third metal grid row, and all second metal lines of the at least one second metal grid in the second metal grid row close to the third metal grid row are sharing second metal lines shared with the second metal grid in the third metal grid row, the second metal grids of the third metal grid row is a second edge second metal grid of the second connection electrode at a second edge of the second connection electrode, is located at a second end of the second connection electrode in the second direction, and is electrically connected with an edge first metal grid of the second touch sub-electrode adjacent to the third metal grid row, the second end is opposite to the first end in the second direction, and the edge first metal grid is the first metal grid at an edge of the second touch sub-electrode adjacent to the third metal grid row;

the plurality of vias comprise a second via, and the third metal grid row is electrically connected with other one of the two second touch sub-electrodes adjacent to the second connection electrode in which the third metal grid row is located through the second via.

13. The touch structure according to claim 1, wherein a pattern of each of the plurality of second connection electrodes is symmetrical with respect to a symmetry axis extending along the first direction.

14. A touch structure, comprising a first metal grid layer and a second metal grid layer, wherein an insulation layer is between the first metal grid layer and the second metal grid layer, the first metal grid layer comprises a plurality of first metal grids defined by a plurality of first metal lines, and the second metal grid layer comprises a plurality of second metal grids defined by a plurality of second metal lines, shapes of each of the plurality of first metal grids and each of the second metal grids are both polygons;

the first metal grid layer comprises a plurality of first touch sub-electrodes and a plurality of first connection electrodes arranged along a first direction, the plurality of first touch sub-electrodes and the plurality of first connection electrodes are alternately distributed one by one and are electrically connected in sequence to constitute a first touch electrode extending along the first direction; the first metal grid layer further comprises a plurality of second touch sub-electrodes arranged in sequence along the second direction and spaced apart from each other, and the first direction intersects the second direction; each of the plurality of first touch sub-electrodes and each of the second touch sub-electrodes are spaced apart from each other, and respectively comprise a plurality of the first metal grids;

the second metal grid layer comprises a plurality of second connection electrodes spaced apart from each other, each of the plurality of second connection electrodes is electrically connected with adjacent second touch sub-electrodes through a plurality of vias in the insulation layer, so as to electrically connect the adjacent second touch sub electrodes to form a second touch electrode extending in the second direction;

each of the plurality of second connection electrodes comprises:

a first metal grid row, comprising a plurality of the second metal grids arranged along the first direction;

a second metal grid row, adjacent to and connected with the first metal grid row, arranged in the second direction with the first metal grid row, and comprising at least one second metal grid among the plurality of second metal grids arranged along the first direction, wherein a count of the at least one second metal grid in the second metal grid row is less than or equal to a count of the second metal grids in the first metal grid row, and all the second metal lines of the at least one second metal grid in the second metal grid row close to the first metal grid row are sharing second metal lines shared with the second metal grid in the first metal grid row; and each of the second metal grids comprises at least two vertical edges extending along the second direction, and orthographic projections of the at least two vertical edges on the first metal grid layer do not overlap with the first metal line.

15. A touch structure, comprising a first metal grid layer and a second metal grid layer, wherein an insulation layer is between the first metal grid layer and the second metal grid layer, the first metal grid layer comprises a plurality of first metal grids defined by a plurality of first metal lines, and the second metal grid layer comprises a plurality of second metal grids defined by a plurality of second metal lines, shapes of each of the plurality of first metal grids and each of the second metal grids are both polygons;

the first metal grid layer comprises a plurality of first touch sub-electrodes and a plurality of first connection electrodes arranged along a first direction, the plurality of first touch sub-electrodes and the plurality of first connection electrodes are alternately distributed one by one and are electrically connected in sequence to constitute a first touch electrode extending along the first direction; the first metal grid layer further comprises a plurality of second touch sub-electrodes arranged in sequence along the second direction and spaced apart from each other, and the first direction intersects the second direction; each of the plurality of first touch sub-electrodes and each of the second touch sub-electrodes are spaced apart from each other, and respectively comprise a plurality of the first metal grids;

the second metal grid layer comprises a plurality of second connection electrodes spaced apart from each other, each of the plurality of second connection electrodes is electrically connected with adjacent second touch sub-electrodes through a plurality of vias in the insulation layer, so as to electrically connect the adjacent second touch sub electrodes to form a second touch electrode extending in the second direction;

each of the plurality of second connection electrodes comprises:

a first metal grid row, comprising a plurality of the second metal grids arranged along the first direction;

a second metal grid row, adjacent to and connected with the first metal grid row, arranged in the second direction with the first metal grid row, and comprising at least one second metal grid among the plurality of second metal grids arranged along the first direction, wherein a count of the at least one second metal grid in the second metal grid row is less than or equal to a count of the second metal grids in the first metal grid row, and all the second metal lines of the at least one second metal grid in the second metal grid row close to the first metal grid row are sharing second metal lines shared with the second metal grid in the first metal grid row;

adjacent second touch sub-electrodes among the plurality of second touch sub-electrodes are electrically connected through two of the second connection electrodes, and the two of the second connection electrodes are spaced apart from each other; and an orthographic projection of each of the plurality of first connection electrodes on the second metal grid layer is in a gap between the two of the second connection electrodes connecting the adjacent second touch sub-electrodes.

16. The touch structure according to claim 15, wherein each of the plurality of first touch sub-electrodes is electrically connected with an adjacent first connection electrode through at least one first connection line constituted by a plurality of first metal lines connected end to end in sequence;

an orthographic projection of the first connection line on the second metal grid layer respectively overlaps with a plurality of second metal lines in the second connection electrode, and the first connection line at least partially overlaps with an orthographic projection of the sharing second metal line on the first metal grid layer.

17. The touch structure according to claim 1, wherein a plurality of the first metal lines located in a boundary region between adjacent first touch sub-electrode and the second touch sub-electrode respectively comprise a plurality of openings, each of the plurality of openings divides the first metal line into two first metal segments, one of the two first metal line segments belongs to the first touch sub-electrode and other one of the two first metal line segments belongs to the second touch sub-electrode, so that the adjacent first touch sub-electrode and the second touch sub-electrode are insulated from each other.

18. A touch display panel, comprising a base substrate, a display structure and the touch structure according to claim 1 that are stacked on the base substrate.

19. An electronic device, comprising the touch structure according to claim 1.

20. The touch structure according to claim 14, wherein each of the plurality of first touch sub-electrodes is electrically connected with an adjacent first connection electrode through at least one first connection line constituted by a plurality of first metal lines connected end to end in sequence;

a blank region is between two adjacent first connection lines, and an orthographic projection of the at least two vertical edges of each of the second metal grids on the first metal grid layer is located in the blank region, so that the orthographic projection of the at least two vertical edges of each of the second metal grids on the first metal grid layer does not overlap with the first metal line.

\* \* \* \* \*